US012293772B2

(12) United States Patent
Thiruvenkatanathan et al.

(10) Patent No.: US 12,293,772 B2
(45) Date of Patent: May 6, 2025

(54) METHOD FOR IDENTIFYING AN AUDIO SIGNAL

(71) Applicant: EARZZ LIMITED, Devon (GB)

(72) Inventors: Pradyumna Thiruvenkatanathan, London (GB); Guy Spyropoulos, London (GB); Anindya Moitra, London (GB)

(73) Assignee: EARZZ LIMITED, Devon (GB)

( * ) Notice: Subject to any disclaimer, the term of this patent is extended or adjusted under 35 U.S.C. 154(b) by 364 days.

(21) Appl. No.: 17/895,292

(22) Filed: Aug. 25, 2022

(65) Prior Publication Data

US 2023/0060936 A1 Mar. 2, 2023

(30) Foreign Application Priority Data

Aug. 27, 2021 (GB) ..................................... 2112306

(51) Int. Cl.
*G10L 25/21* (2013.01)
*G10L 25/18* (2013.01)
(Continued)

(52) U.S. Cl.
CPC .............. *G10L 25/21* (2013.01); *G10L 25/18* (2013.01); *G10L 25/24* (2013.01); *G10L 25/78* (2013.01);
(Continued)

(58) Field of Classification Search
CPC ......... G10L 25/21; G10L 25/18; G10L 25/24; G10L 25/78; G10L 25/51; H04R 3/00; H04R 2420/07; H04R 2430/03
See application file for complete search history.

(56) References Cited

U.S. PATENT DOCUMENTS 7,005,994 B2 2/2006 King
8,150,044 B2 4/2012 Goldstein et al.
(Continued)

FOREIGN PATENT DOCUMENTS

CN 109800700 A 5/2019
CN 110634473 A 12/2019
(Continued)

OTHER PUBLICATIONS

Joder et al, Temporal Integration for Audio Classification with Application to Musical Instrument Classification, Jan. 6, 2009, IEEE, pp. 174-186 (Year: 2009).*
(Continued)

*Primary Examiner* — Linda Wong
(74) *Attorney, Agent, or Firm* — NIXON & VANDERHYE P.C.

(57) ABSTRACT

A data processing system for identifying an audio signal includes an audio sensor, a receiver module, a signal recognition module, and a receiver device. The receiver module receives audio data from the audio sensor. The receiver module transmits the audio data to the signal recognition module. The signal recognition module calculates time-varying vector arrays of octave band energies, and/or of fractional octave band energies, and calculates time-varying vector arrays of Mel-Frequency Cepstral Coefficients (MFCC) values based on the received audio data. The signal recognition module generates audio feature image data based on the vector arrays. The signal recognition module includes binary classifier machine learning models and inference models to identify the audio signal based on the generated audio feature image data. The signal recognition module transmits a notification message to the receiver device.

19 Claims, 34 Drawing Sheets

(51) Int. Cl.

| | |
|---|---|
| ***G10L 25/24*** | (2013.01) |
| ***G10L 25/78*** | (2013.01) |
| ***H04R 3/00*** | (2006.01) |

(52) U.S. Cl.

CPC ........... *H04R 3/00* (2013.01); *H04R 2420/07* (2013.01); *H04R 2430/03* (2013.01)

(56) References Cited

U.S. PATENT DOCUMENTS

| | | | | |
|---|---|---|---|---|
| D716,772 | S | 11/2014 | Cavero et al. | |
| 8,971,555 | B2 | 3/2015 | Koss et al. | |
| 9,286,911 | B2 | 3/2016 | Mitchell | |
| 9,538,959 | B2 | 1/2017 | Messenger et al. | |
| 9,813,810 | B1 | 11/2017 | Nongpiur | |
| 10,224,019 | B2 | 3/2019 | Mitchell et al. | |
| 10,885,930 | B2 | 1/2021 | Gross | |
| 11,978,473 | B1 * | 5/2024 | Samuels | G10L 25/51 |
| 2006/0227237 | A1 | 10/2006 | Kienzle et al. | |
| 2008/0071136 | A1 * | 3/2008 | Oohashi | G10H 7/00 600/27 |
| 2010/0119099 | A1 | 5/2010 | Haupt et al. | |
| 2010/0138427 | A1 * | 6/2010 | Van De Par | G06F 16/639 707/E17.014 |
| 2010/0198760 | A1 * | 8/2010 | Maddage | G06F 16/683 707/723 |
| 2012/0044050 | A1 | 2/2012 | Vig et al. | |
| 2012/0160078 | A1 * | 6/2012 | Lyon | G10H 1/0008 84/609 |
| 2014/0142929 | A1 | 5/2014 | Seide et al. | |
| 2016/0196345 | A1 * | 7/2016 | Kreifeldt | G06F 16/637 707/738 |
| 2017/0358283 | A1 * | 12/2017 | Neuhauser | G10L 25/81 |
| 2019/0043477 | A1 * | 2/2019 | Bang | G10L 15/20 |
| 2019/0332916 | A1 | 10/2019 | Anderson et al. | |
| 2020/0152227 | A1 | 5/2020 | Xiang et al. | |

FOREIGN PATENT DOCUMENTS

| | | | |
|---|---|---|---|
| CN | 110753288 A | | 2/2020 |
| CN | 111276159 A | | 6/2020 |
| CN | 113191178 A | | 7/2021 |
| EP | 2406787 | | 5/2014 |
| KR | 10-1622900 B1 | | 5/2016 |
| WO | WO 2007/028628 | | 3/2007 |
| WO | WO 2020/081161 | | 4/2020 |

OTHER PUBLICATIONS

Essid et al, Instrument recognition in polyphonic music based on automatic taxonomies, Dec. 19, 2005, IEEE, pp. 68-80 (Year: 2005).*

Delgado-Contreras, Juan Rubén et al., "Feature Selection for Place Classification through Environmental Sounds," *Procedia Computer Science*, vol. 37, 2014, pp. 40-47. Available at https://reader.elsevier.com/reader/sd/pii/S1877050914009752?token=64EF4F7B116207ECB7E30F2B035FF607CD4810AE2C60601986265D074E9F1AA7DDEBF86D3447E9673ECF21344152B3E7&originRegion=eu-west-1&originCreation=20210816104102.

Great Britain Search Report dated Feb. 15, 2022 issued in Great Britain Patent Application No. 2112306.2, 8 pp.

Extended European Search Report dated Jan. 3, 2023 issued in European Patent Application No. 22192221.4, 10 pp.

Joder, Cyril et al., "Temporal Integration for Audio Classification With Application to Musical Instrument Classification", IEEE Transactions on Audio, Speech and Language Processing, IEEE, US, vol. 17, No. 1, Jan. 1, 2009 (Jan. 1, 2009), pp. 174-186, XP011241211, ISSN: 1558-7916, DOI: 10.1109/TASL.2008.2007613.

Situnayake, Daniel, "Make the Most of Limited Datasets Using Audio Data Augmentation", Oct. 27, 2020 (Oct. 27, 2020), XP093009322, Retrieved from the Internet: URL:https://web.archive.org/web/20201027061530/https://www.edgeimpulse.com/blog/make-the-most-of-limited-datasets-usingaudio-data-augmentation [retrieved on Dec. 19, 2022], 6 pp.

* cited by examiner

FEATURE IMAGE COMPUTED WITH MFCC AND OCTAVE BAND ENERGY VECTORS

Production Database

| User | Device | Sound Selection | Device Notification Selection | Time/Date of events when detected |
|---|---|---|---|---|
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | |

Training Database

| Feedback type | Positive Prediction Label | Feature Image | Feedback |
|---|---|---|---|
| Training | PL1 | file | 1 |
| Training | PL4 | file | 1 |
| Training | PL4 | file | 1 |
| Training | PL2 | file | 1 |
| Training | PL2 | file | 1 |
| User Feedback | PL1 | file | 1 |
| User Feedback | L4 | file | 0 |
| User Feedback | PL2 | file | 1 |

FIG. 26

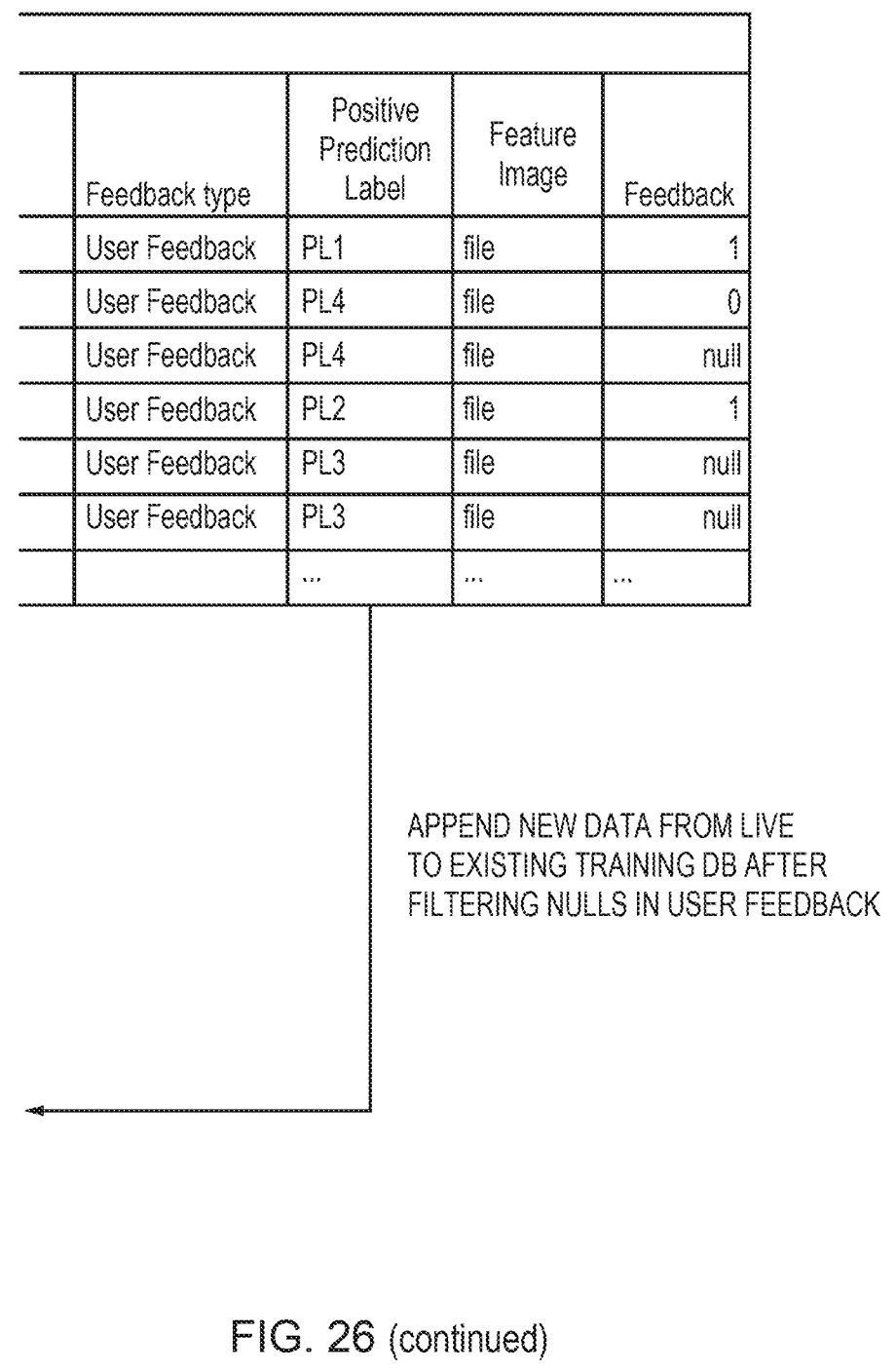

| Feedback type | Positive Prediction Label | Feature Image | Feedback |
|---|---|---|---|
| User Feedback | PL1 | file | 1 |
| User Feedback | PL4 | file | 0 |
| User Feedback | PL4 | file | null |
| User Feedback | PL2 | file | 1 |
| User Feedback | PL3 | file | null |
| User Feedback | PL3 | file | null |
| | ... | ... | ... |

APPEND NEW DATA FROM LIVE
TO EXISTING TRAINING DB AFTER
FILTERING NULLS IN USER FEEDBACK

FIG. 26 (continued)

METHOD FOR IDENTIFYING AN AUDIO SIGNAL

CROSS-REFERENCES TO RELATED APPLICATIONS

This application claims priority of Great Britain Patent Application No. 2112306.2 filed Aug. 27, 2021, the entire contents of which are hereby incorporated by reference in this application.

BACKGROUND

The described embodiments relate to a method and system for identifying audio signals, such as non-speech audio signals. In particular, but not exclusively, the described embodiments relate to a system for monitoring non-speech audio data having at least one wireless audio sensor, a receiver module, an audio signal recognition module, and at least one mobile notification application for non-specific monitoring and identification of audio signals in an ambient sound environment based on a generation of images.

Monitoring and alerting devices are common in households because of the convenience they offer. For instance, smart audio monitors are used by parents to help them hear their baby's activities while they are out of immediate hearing distance of their infant(s). Conventional systems for monitoring an ambient audio environment rely on either specific audio sensors capable of monitoring a particular audio signal for which they are designed, or simply transmit received audio to a user such that the user must determine a sound type or source of any captured audio.

As conventional monitoring systems serve dedicated functions, monitoring devices are built for use purely to relay audio signals for monitoring particular activities or events. Conventional devices do not offer interoperability and thus cannot be used for multiple sound monitoring purposes. That is a single conventional device cannot be utilised for the monitoring of multiple sound types. Even conventional smart monitoring system which interface with a user's smart device do not permit such functionality. This consequently results in a requirement for users to purchase multiple monitors and similar devices to obtain the convenience they desire. Consumption of such products thus becomes expensive for a regular household customer who may desire monitoring of multiple types of sound, whilst also making it difficult for a customer to use all of these devices simultaneously as each product typically requires use of its own hardware or smart device application.

There thus exists a need for a monitoring system that can not only integrate with smart devices, but also seamlessly serve a number of these monitoring applications simultaneously, all using a single monitoring device or a set of connected monitoring devices.

SUMMARY

It is an aim of the described embodiments to at least partly mitigate one or more of the above-mentioned problems.

It is an aim of certain embodiments to provide an audio monitoring system which is capable of monitoring and/or identifying and/or recognising multiple different types of sound which may be present in an ambient sound environment, such as non-speech sounds.

It is an aim of certain embodiments to provide an audio monitoring system which requires only one, or one set of, receiver module(s), one sound recognition module and one notification application with which a user or a set of designated users can interface. The notification application may be executed on a mobile device.

It is an aim of certain embodiments to provide an audio monitoring system which is capable of recognising different types of sound types which may originate from different sources, such as non-speech sounds.

It is an aim of certain embodiments to provide an audio monitoring system which utilises image features to identify signatures of particular sound types.

It is an aim of certain embodiments to provide a machine learning model and/or inference logic capable of learning to identify different sound types based on characteristics or signatures present in audio feature images.

According to the described embodiments, there is provided a computer-implemented method for identifying at least one audio signal, the method comprising the steps of:

- receiving audio data at a receiver module from at least one audio sensor; and processing the audio data using a signal recognition module;
- wherein processing the audio data using the signal recognition module comprises:
- based on the received audio data, determining at least one of:
  - one or more time-varying vector arrays of octave band energies, and one or more time-varying vector arrays of fractional octave band energies;
- generating audio feature image data based on at least one of:
  - the one or more time-varying vector arrays of octave band energies, and the one or more time-varying vector arrays of fractional octave band energies; and
- identifying at least one audio signal using a first model based on the audio feature image data.

By generating the audio feature image data from the dynamic, time-varying octave band energy vectors and/or the fractional octave band energy vectors computed from the audio data, and then identifying the audio signal type using the audio feature image data, the described embodiments achieve enhanced levels of accuracy in being able to capture the dynamic variations in sound characteristics for and thereby detect and classify different types of sound using a limited set of training data. In particular it has been found that less training data is required to train the first machine learning model which receives the audio feature image data as input, compared to training an alternative model which may receive the raw audio data or a set of static instantaneous audio feature values computed directly from the time or frequency or cepstral domains of the captured audio signals as a direct input.

At least one of the one or more vector arrays of octave band energies and the one or more vector arrays of fractional octave band energies may be determined by:

- generating a plurality of data segments based on the received audio data;
- for each data segment, determining at least one of:
  - one or more octave bands; and
  - one or more fractional octave bands;
- and
- determining at least one of:
  - an average power value for each of the one or more octave bands; and an average power value for each of the one or more fractional octave bands.

The method may comprise the step of determining one or more time-varying vector arrays of Mel-Frequency Cepstral Coefficients (MFCC) values based on the received audio data, and the audio feature image data may be generated based on the one or more vector arrays of MFCC values, and at least one of:

the one or more vector arrays of octave band energies, and the one or more vector arrays of fractional octave band energies.

The one or more vector arrays of MFCC values may be determined by:

generating a plurality of data segments based on the received audio data;

for each data segment, performing a Fourier transform of the received audio data to obtain a frequency spectrum representation of the audio data;

filtering the frequency spectrum representation of the audio data using one or more Mel filter groups;

determining an energy value for the filtered frequency spectrum representation of the audio data; and performing a cosine transform of the filtered frequency spectrum representation of the audio data to generate the one or more vector arrays of MFCC values.

The method may comprise the step of determining a first order derivative of the one or more vector arrays of MFCC values, and the audio feature image data may be generated based on the one or more vector arrays of MFCC values, the first order derivative of the vector arrays of MFCC values, and at least one of:

the one or more vector arrays of octave band energies, and the one or more vector arrays of fractional octave band energies.

The method may comprise the step of determining a second or higher order derivative of the one or more vector arrays of MFCC values, and the audio feature image data may be generated based on the one or more vector arrays of MFCC values, the first order derivative of the vector arrays of MFCC values, the second or higher order derivative of the vector arrays of MFCC values, and at least one of:

the one or more vector arrays of octave band energies, and the one or more vector arrays of fractional octave band energies.

The method may comprise the step of identifying an audible sound event based on the received audio data, and the one or more time-varying vector arrays may be determined responsive to the audible sound event being identified. The audible sound event may comprise at least one of an amplitude value of the received audio data exceeding a pre-defined threshold, or an anomaly in the received audio data.

The first model may comprise one or more binary classifier models, each binary classifier model being configured to identify a different type of audio signal. The method may comprise the steps of:

receiving user selection data indicating one or more types of audio signal of interest; and selecting one or more of the binary classifier models based on the user selection data;

the at least one audio signal being identified using the selected one or more binary classifier model based on the audio feature image data.

The method may comprise the steps of:

receiving user-defined label data;

associating the audio feature image data with the user-defined label data; and updating the signal recognition module based on the audio feature image data and the associated user-defined label data to train the first model.

The method may comprise the steps of:

generating a set of synthetic training data based on synthetic image data and historical image data; and training the first model using the synthetic training data.

This additional training data enhances the accuracy of the updated trained model.

The method may comprise the step of transmitting the audio data from the receiver module to the signal recognition module. The receiver module may comprise an application on one of a first computational device and a first mobile device, the signal recognition module may be located remotely from the receiver module, at least one of the first computational device and the first mobile device may be connected to the signal recognition module by a wireless communication connection.

The method may comprise the step of responsive to identifying the at least one audio signal, transmitting one or more notification messages from the signal recognition module to one or more receivers to notify that the at least one audio signal has been identified. The receiver may comprise an application on one of a second computational device and a second mobile device, at least one of the second computational device and the second mobile device may be connected to the signal recognition module by a wireless communication connection. The method may comprise the steps of:

the receiver determining if the identified at least one audio signal satisfies at least one user-defined criterion; and the receiver generating an alert responsive to determining that the identified at least one audio signal satisfies the at least one user-defined criterion.

The receiver may include a notification application program to notify information in relation to the identified audio signal to one or more users. The notification application program may notify a user depending on preconfigured notification settings selected by the user. The notification application may or may not alert the user depending on whether the sound identified is of interest to the user.

The receiver module may be provided in the form of an application installed on a mobile device, the signal recognition module may be provided on a server in the cloud, and the receiver may be provided in the form of an application installed on another mobile device.

The method may comprise the step of identifying a source of the identified audio signal.

The described embodiments also provide in another aspect a data processing system for identifying at least one audio signal, the system comprising:

a receiver module to receive audio data from at least one audio sensor; and a signal recognition module to process the audio data;

wherein the signal recognition module is configured to:

based on the received audio data, determine at least one of:

one or more time-varying vector arrays of octave band energies; and one or more time-varying vector arrays of fractional octave band energies;

generate audio feature image data based on at least one of:

the one or more time-varying vector arrays of octave band energies; and the one or more time-varying vector arrays of fractional octave band energies; and identify at least one audio signal using a first model based on the audio feature image data.

In a further aspect of the described embodiments there is provided a computer program product stored on a non-transitory computer readable storage medium, the computer program product comprising computer program code capable of causing a computer system to perform a method of the described embodiments when the computer program product is run on a computer system.

According to another aspect of the described embodiments there is provided a computer-implemented method for identifying at least one audio signal, comprising:

receiving audio data at a receiver module from at least one audio sensor; and processing the audio data using a signal recognition module;

wherein processing the audio data using the signal recognition module comprises:

extracting one or more feature vectors from the received audio data;

generating image data based on the extracted one or more feature vectors; and identifying at least one audio signal using a first model based on the image data.

Each feature vector may be dynamic and time-varying. In particular each feature vector may represent a dynamic variation of one or more audio signal characteristics of the received audio data with respect to a time parameter.

By generating the image data from dynamic, time-varying feature vectors computed from the audio data, and then identifying the audio signal type using the image data, the described embodiments achieve enhanced levels of accuracy in being able to capture the dynamic variations in sound characteristics for and thereby detect and classify different types of sound using a limited set of training data. In particular it has been found that less training data is required to train the first machine learning model which receives the image data as input, compared to training an alternative model which may receive the raw audio data or a set of static instantaneous audio feature values computed directly from the time or frequency or cepstral domains of the captured audio signals as a direct input.

Aptly generating the image data based on the extracted one or more feature vectors further comprises concatenating the extracted one or more feature vectors into a time-varying matrix representation. The described embodiments use an array of dynamic time-varying feature vectors computed for each feature type and then concatenates these feature vectors into an image. In particular the described embodiments do not merely use a static feature extracted from an audio frame for algorithm training and prediction. Instead by extracting the feature vectors to generate the image, the described embodiments may capture variations in the audio signal patterns over time within each frame, which would not be possible with a static feature.

Aptly processing the audio data using the signal recognition module further comprising extracting one or more pattern signatures from the time-varying matrix representation using an image recognition model; wherein the at least one audio signal is identified using the first model based on the extracted one or more pattern signatures. Aptly the audio signal is identified by correlating one or more of the extracted pattern signatures with a set of at least one pre-trained image pattern signatures.

Aptly the audio data is an audio data package comprising a portion of audio data captured within a particular time interval. Aptly further comprising, prior to generating the image data, processing the audio data to remove at least some noise signals from the audio data.

Aptly further comprising training the first model using a plurality of predetermined image pattern signatures, the predetermined image pattern signatures being associated with known audio signals. Aptly a first group of the predetermined image features is associated with a first audio source, the first group of predetermined image features being representative of the first audio source. Aptly further comprising generating a set of synthetic training data by layering synthetic image features on to a set of actual historical image data.

By generating the synthetic training data from the actual historical audio data, the overall quantity of data available to train the first model is increased. This additional training data enhances the accuracy of the updated trained model.

Aptly a first group of image feature characteristics comprise at least one variable parameter, the variable parameter being noise, and/or the variable parameter being a time interval.

Aptly generating the image data based on the extracted one or more feature vectors further comprising extracting one or more audible signals from the received audio data; for each extracted audible signal, determining a plurality of time subsets; for each time subset, determining a set of feature vectors; and rendering the set of feature vectors graphically by plotting the feature amplitudes relative to time. Aptly generating the image data based on the extracted one or more feature vectors further comprising detecting one or more audible signals from the received audio data, and determining a set of time-varying vector arrays of Mel-Frequency Cepstral Coefficients (MFCC) values for the detected one or more audible signals; and/or determining a set of time-varying vector arrays of $1/3^{rd}$ octave band energies for the detected one or more audible signals. Aptly further comprising generating the image data by combining the vector arrays of the MFCC values, and a first order derivative of the vector arrays of the MFCC values, and a second order derivative of the vector arrays of the MFCC values, and the set of vector arrays of $1/3^{rd}$ octave band energies. Aptly generating the image data based on the extracted one or more feature vectors further comprises dividing the audio data into a plurality of shorter time-windows; for each time-window, performing a Fourier transform of the audio data to determine a frequency spectrum; adding at least one Mel filter group to the frequency spectrum; performing a discrete cosine transform of the filtered frequency spectrum to obtain a set of MFCCs; determining time-varying vector arrays from the set of MFCCs, first order derivative delta values and second order derivative delta-delta values of the set of MFCCs; determining a set of octave band energy vectors by processing the audio data for each time window with a plurality of 1/3 octave band pass filters; and generating a feature matrix to represent the image data based on the set of time-varying MFCCs, the delta values, the delta-delta values, and the set of octave band energy vectors. Aptly further comprising dividing the audio data into a plurality of overlapping time-windows, each of the overlapping time-windows representing a shorter time interval than the overall time interval of the audio data.

Aptly further comprising transmitting the audio data from the receiver module to the signal recognition module. Aptly the receiver module comprises an application on a first computational device and/or first mobile device, the signal recognition module being located remotely from the receiver module, the first computational device and/or first mobile device being connected to the signal recognition module via a wireless connection. Aptly further comprising, responsive to identifying the audio signal, transmitting a notification from the signal recognition module to a receiver that the audio signal has been identified. Aptly the receiver comprises an application on a second computational device and/or second mobile device, the second computational device and/or second mobile device being connected to the signal recognition module via a wireless connection. Aptly further comprising determining if one or more audio features satisfies at least one user-defined criterion specified at the receiver prior to transmitting the notification.

The receiver may include a notification application program to notify information in relation to the identified audio signal to one or more users. The notification application program may notify a user depending on preconfigured notification settings selected by the user. The notification application may or may not alert the user depending on whether the sound identified is of interest to the user.

The receiver module may be provided in the form of an application installed on a mobile device, the signal recognition module may be provided on a server in the cloud, and the receiver may be provided in the form of an application installed on another mobile device.

Aptly further comprising identifying a source of the audio signal.

The described embodiments also provide in another aspect a data processing system for identifying at least one audio signal, comprising:

a receiver module to receive audio data from at least one audio sensor; and a signal recognition module to process the audio data; wherein the signal recognition module is configured to extract one or more feature vectors from the received audio data, generate image data based on the extracted one or more feature vectors, and identify at least one audio signal using a first model based on the image data.

In a further aspect of the described embodiments there is provided a computer-implemented method for monitoring at least one audio signal, comprising:

receiving audio data at one or more monitoring modules from at least one audio sensor;

transmitting the audio data from the monitoring module to a sound recognition module;

processing the audio data using the sound recognition module;

wherein processing the audio data using the sound recognition module comprises:

identifying at least one audio signal using a first model based on the audio data; and transmitting one or more notification messages from the sound recognition module to one or more receivers to notify that the audio signal has been identified.

The receiver may be provided in the form of a separate physical component part to the monitoring module. For example the receiver may be provided in the form of an application program on a $1^{st}$ mobile device, such as a smart phone or smart watch or tablet, and the monitoring module may be provided in the form of an application program on a $2^{nd}$ mobile device, such as a microphone unit. The notification message is received at the receiver mobile device which is independent of the monitoring module mobile device.

The described embodiments also provide in another aspect a computer-implemented method for training a signal recognition module, comprising:

receiving audio data from at least one audio sensor;

extracting one or more feature vectors from the received audio data;

generating image data based on the extracted one or more feature vectors;

receiving user-defined label data;

associating the image data with the user-defined label data;

storing the image data and the associated user-defined label data in a data store; and updating an image recognition model based on the image data and the associated user-defined label data.

In a further aspect of the described embodiments there is provided a computer program product comprising computer program code capable of causing a computer system to perform a method of the described embodiments when the computer program product is run on a computer system.

Certain embodiments provide a reduction of devices and applications required for monitoring multiple sound types in an ambient environment.

Certain embodiments provide a system that interfaces with a smart device application to detect, recognise and characterise a variety of sound types and sends a notification to the application. The sound types may be non-speech.

Certain embodiments provide a method of identifying sounds, such as non-speech sounds, characterising and/or recognising a variety of different sound types present in an ambient sound environment.

Certain embodiments provide an audio monitoring system which requires a reduced amount of training data to recognise a type of sound.

Certain embodiments provide a machine learning model for recognising sounds that is trainable by a consumer/customer.

Certain embodiments provide a robust method for identifying sound types based on characteristic signatures present in audio feature images. The sound types may be non-speech.

BRIEF DESCRIPTION OF THE DRAWINGS

Embodiments will now be described hereinafter, by way of example only, with reference to the accompanying drawings, in which:

FIG. 26 is a schematic illustration of training data of the audio monitoring system of FIG. 22.

DETAILED DESCRIPTION

Figure 1:
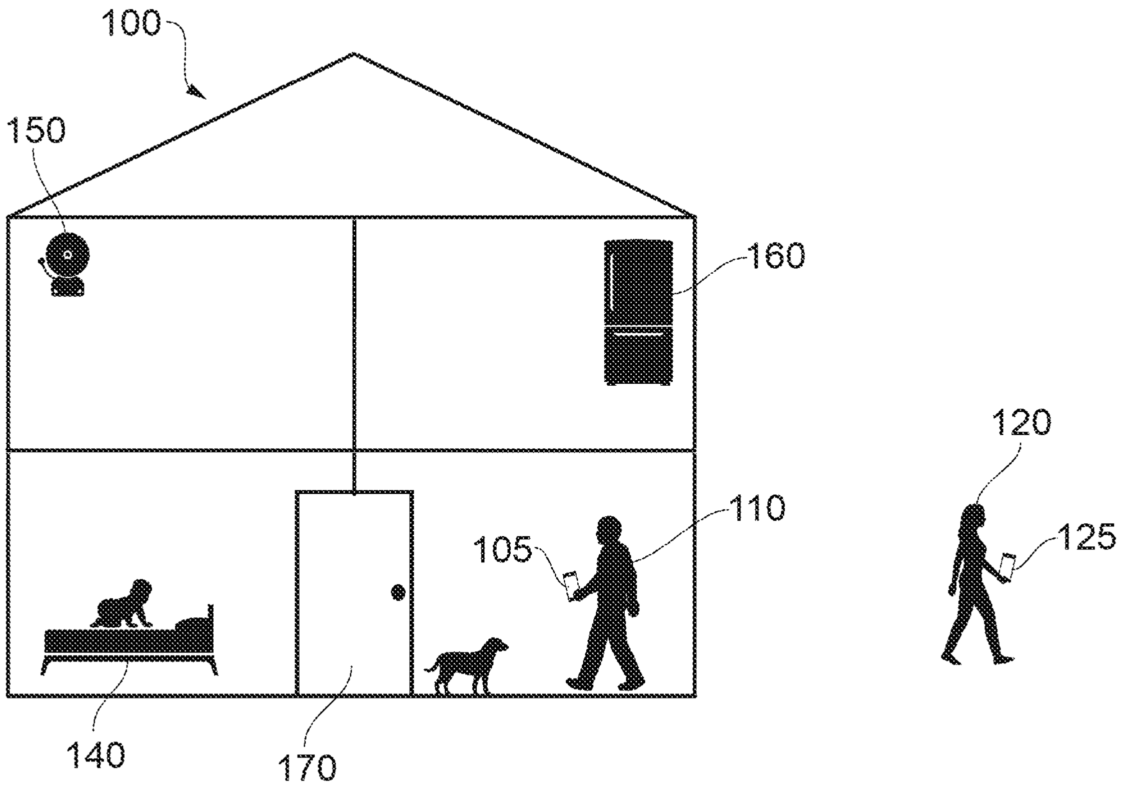
FIG. 1 illustrates an environment in which an audio monitoring system according to the described embodiments for identifying at least one audio signal may be utilised.

In the drawings like reference numerals refer to like parts.

Generally disclosed herein is a system according to the described embodiments for identifying an audio signal and/or identifying a source of the audio signal. The system comprises a plurality of audio sensors to sense audio data, a receiver module to receive the audio data from the sensors, a signal recognition module to process the audio data, and a receiver device for use by a user. In this case the audio data is provided in the form of an audio data package comprising a portion of audio data captured within a particular time interval.

The receiver module is provided in the form of an application on a computational device or mobile device. In this case the signal recognition module is located remotely from the receiver module. The receiver module transmits the audio data to the signal recognition module. The computational device or mobile device is connected to the signal recognition module via a wireless connection.

The signal recognition module removes any noise signals from the audio data. The signal recognition module then extracts a plurality of dynamic, time-varying feature vectors from the audio data, and concatenates the extracted feature vectors into a time-varying matrix representation to generates image data. Each feature vector may be dynamic and time-varying. In particular each feature vector may represent a dynamic variation of one or more audio signal characteristics of the received audio data with respect to a time parameter.

In further detail the signal recognition module extracts a plurality of audible signals from the audio data. For each extracted audible signal, the signal recognition module determines a plurality of time subsets. For each time subset, the signal recognition module determines a set of feature vectors, and renders the set of feature vectors graphically by plotting the feature amplitudes relative to time.

In another embodiment the signal recognition module detects a plurality of audible signals from the audio data, and determines a set of vector arrays of Mel-Frequency Cepstral Coefficients (MFCC) values for the detected audible signals. The signal recognition module determines a set of vector arrays of $1/3^{rd}$ octave band energies for the detected audible signals. The signal recognition module then generates the image data by combining the vector arrays of the MFCC values, and a first order derivative of the vector arrays of the MFCC values, and a second order derivative of the vector arrays of the MFCC values, and the set of vector arrays of $1/3^{rd}$ octave band energies.

In a further embodiment the signal recognition module divides the audio data into a plurality of shorter time-windows. For each time-window, the signal recognition module performs a Fourier transform of the audio data to determine a frequency spectrum, and adds a Mel filter group to the frequency spectrum. The signal recognition module performs a discrete cosine transform of the filtered frequency spectrum to obtain a set of MFCCs, and determines first order derivative delta values and second order derivative delta-delta values of the set of MFCCs. The signal recognition module then determines a set of octave band energy vectors by processing the audio data for each time window with a plurality of ⅓ octave band pass filters, and generates a feature matrix to represent the image data based on the set of MFCCs, the delta values, the delta-delta values, and the set of octave band energy vectors.

The signal recognition module extracts a plurality of pattern signatures from the time-varying matrix representation using an image recognition model, and identifies the audio signal using a first model based on the extracted pattern signatures. In this case the signal recognition module correlates the extracted pattern signatures with a set of pre-trained image pattern signatures. The first model may be trained using a plurality of predetermined image pattern signatures, with the predetermined image features being associated with known audio signals. A set of synthetic training data may be generated by layering synthetic image features on to a set of actual historical image data.

The receiver device comprises an application on a computational device or mobile device. The signal recognition module transmits a notification to the receiver device that the audio signal has been identified. The computational device or mobile device is connected to the signal recognition module via a wireless connection.

It will be appreciated that the receiver module may be provided as a separate component part to the audio sensor. Alternatively the receiver module may be integrated with the audio sensor as a single component part.

It will be appreciated that the receiver module may be provided as a separate component part to the signal recognition module. Alternatively the receiver module may be integrated with the signal recognition module as a single component part.

It will be appreciated that the receiver device may be provided as a separate component part to the signal recognition module. Alternatively the receiver device may be integrated with the signal recognition module as a single component part.

More specific details and more specific examples of the system according to the described embodiments are described below with reference to respective figures.

FIG. 1 illustrates an environment 100 in which an audio monitoring system according to the described embodiments may be utilised. The environment of FIG. 1 is a typical home environment. A user 110 is located in the home environment and has access to a smart/computational device 105. Optionally this is a mobile device. It will be appreciated that a further user 120 may be located outside the home environment with access to another smart/computational device 125. Optionally the user 110 or the further user 120 is associated with the environment 100. The home environment 100 includes many sources of audio signals or sounds of which the user 110 may desire to be notified. The environment 100 of FIG. 1 includes a baby 140, which may cry and the like, an alarm system 150, appliances which provide audio alerts 160 and a door 170 which may receive knocks when in response to a visitor and the like. It will be appreciated that any other suitable sources of audio sounds may be associated with the home environment 100, such as glass smashing sounds, appliance beeping sounds, dog barking sounds, cat meowing sounds, and the like.

Figure 2:
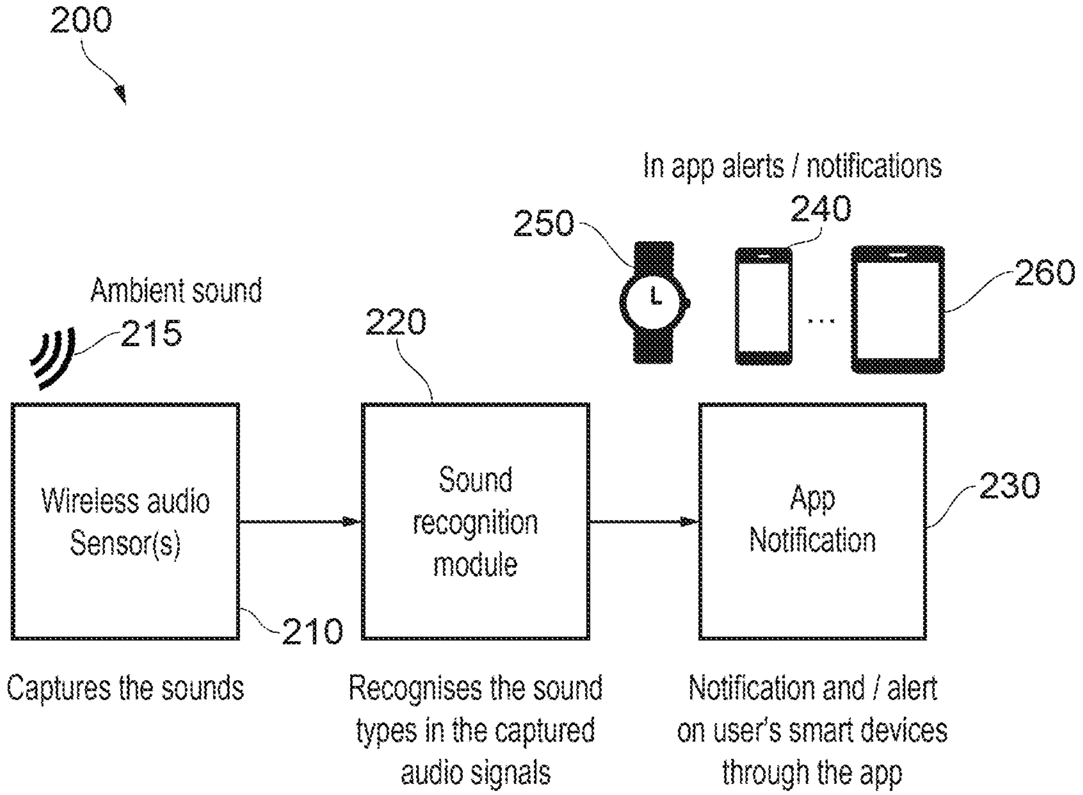
FIG. 2 illustrates a conceptual block diagram showing a high level component architecture for the wireless sensor based audio monitoring system according to the described embodiments.

FIG. 2 illustrates a conceptual block diagram showing the high level component architecture for a wireless sensor based audio monitoring system 200 according to the described embodiments. The audio monitoring system 200 includes a wireless audio sensor 210. It will be understood that the wireless audio sensor 210 may be connected to a receiver module. It will also be understood that the system 200 of FIG. 2 includes a single wireless audio sensor 210 however it will be understood that the system 200 may instead include a plurality of wireless audio sensors. The wireless audio sensor 210 captures ambient sound/sounds 215 and transmits the captured sound/sounds as audio data files to a receiver module, which in turn transmits the captured sound/sounds as audio data files to a sound/signal recognition module 220.

It will be appreciated that the receiver module may be provided as a separate component part to the signal recognition module 220. Alternatively the receiver module may be integrated with the signal recognition module 220 as a single component part.

The audio data files are an example of audio data. It will be understood that the ambient sound/sounds 215 include(s) one or more audio signals. It will be understood that the ambient sound/sounds 215 may include multiple audio signals. It will be understood that the ambient sound/sounds may include a large number of audio signals. Optionally, the receiver module may instead be a different audio sensor, for example a wired audio sensor.

The wireless audio sensor 210 of FIG. 2 includes at least one microphone that is capable of capturing ambient sound signals. The wireless audio sensor may also include an Analog to Digital Converter (ADC) unit should the default output of any microphone in the sensor 210 be analogue signals. The ADC thus digitises any such analogue signals. The wireless audio sensor 210 may also include a microcontroller or a microprocessor unit that repackages the digital signal into audio data files for transmission. The wireless audio sensor 210 also includes a wireless transceiver unit. The audio data files can thus be transmitted wirelessly via the processor interfacing with the wireless transceiver unit. The wireless transceiver unit is able to transmit the sound signals captured to a further processor unit that hosts the sound/signal recognition module 220/ sound classification module. It will be appreciated that the further processor is not located within the wireless audio sensor 210. Optionally the wireless audio sensor 210 may include the further processor. The wireless audio sensor 210 may additionally include an additional memory unit. The additional memory unit may provide redundancy should the microprocessor have insufficient memory built in. Optionally the wireless audio sensor includes a rechargeable battery. The rechargeable battery may include a wireless charging unit to power all the components in the wireless audio sensor 210. The rechargeable battery may include a wired charging unit to power all the components in the wireless audio sensor 210. Alternatively, the sensor 210 may be a wired audio sensor including a cable that is connectable to a mains power supply via a suitable plug, for example. The wireless audio sensor 210 may also include switch to assist the user in powering the sensor 210 on and off. The wireless audio sensor 210 may also optionally include display unit, for example a LCD or LED display unit, to enable users to interact with the wireless sensor unit for configuration and set up of the audio monitoring system and the like. For example, the display unit may display a remaining battery life of the sensor 210, may indicate an error message should a complication arise in the system, may indicate the current settings of the system. The display unit may optionally be a touch screen display unit allowing a user to select component settings, for example, selecting a sensitivity of the sensor 210 and the like.

The sound/signal recognition module 220 communicates with the wireless audio sensor 210 to programmatically receive one or more audio data files captured by the wireless audio sensor 210. It will be understood that the sound/signal recognition module 220 may instead communicate with a further receiver module which receives audio data files from the wireless audio sensor 210 and transmits the audio data files to the sound/signal recognition module 220. It will be understood that the sound/signal recognition module 220 includes one or more processors. Upon receipt of the audio data files, the sound/signal recognition module 220 processes the audio data files. In particular the sound/signal recognition module 220 remove any noise signals from the audio data. The sound/signal recognition module 220 then extracts feature vectors from the audio data, and classifies the extracted feature vectors based on a pre-defined classification schema. The sound/signal recognition module 220 generates image data based on the classified feature vectors, and extracts pattern signatures from the image data using an image recognition model. The sound/signal recognition module 220 identifies audible signals within the captured sound signals using a machine learning model based on the extracted pattern signatures by running inference logics to recognise any ‘known’ sound types within the captured audio signals. It will be appreciated that the sound/signal recognition module 220 may utilise a machine learning model to recognise any ‘known’ sound types. The ability of such a model to recognise any ‘known’ sound types may thus be responsive to training such a model using training data. Recognising any ‘known’ sound types may optionally include comparison or correlation of an identified audible signal with a library of predefined and/or predetermined 'known' sounds.

The system 200 also includes a notification application (app) 230. It will be understood that the app is an example of a data receiving module. The app 230 is installed on, and operates on, at least one of a user's devices. It will be understood that the user's devices may include at smart device such as a smartphone(s) 240 and/or a smart watch(es) 250 and/or a tablet(s) 260 and/or computer(s). It will be understood that a user device may be any kind of computational device enabling a connection to a signal recognition module 220. Alternatively, the signal recognition module 220 itself may reside on a user's device. The app 230 of FIG. 2 is installable on all of the user's computational devices and/or smart devices. The app thus enables the user to choose how, when and for which sounds they wish to be notified for responsive to successful identification of a 'known' sound type at the sound recognition module 220, and executes a notification program on the smart mobile device in line with the users' preferences. The user's preferences are optionally set by the user during configuration of the app 230. The app 230 optionally is installable and operable on a specific user device. The app 230 optionally is installable and/or operable on a specific selection of user devices.

It will be appreciated that the system of the described embodiments may be employed to transmit notifications to multiple user devices. The notifications being transmitted may be the same for each user device or alternatively the notification may be configured differently depending on the user device receiving the notification. A user may configure the system to transmit a notification when one type of audio signal has been identified, such as an alarm sound, and not to transmit a notification when another type of audio signal has been identified, such as a dog barking.

Figure 3:
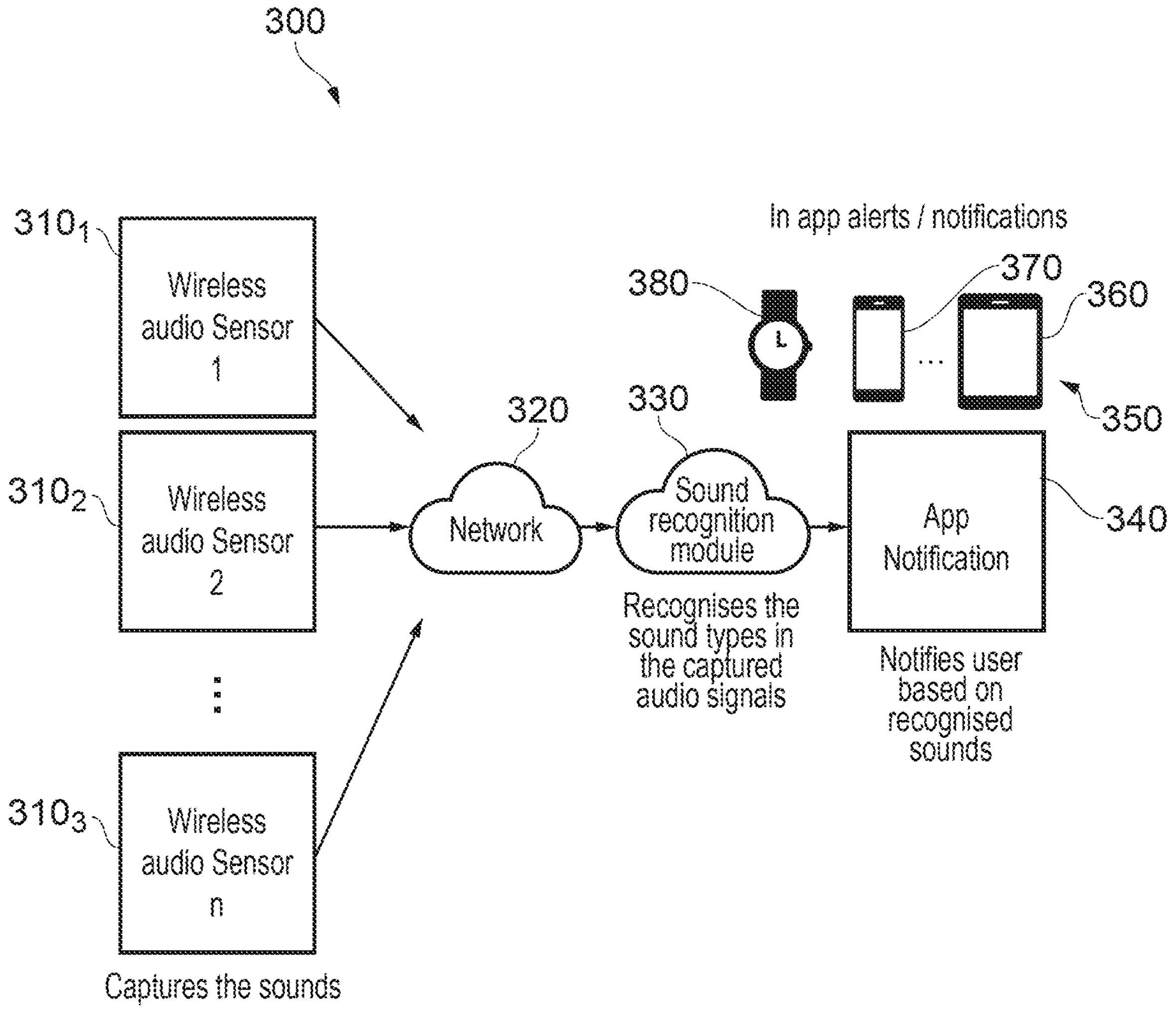
FIG. 3 illustrates a conceptual block diagram showing a high level component architecture for a further wireless sensor based audio monitoring system according to the described embodiments.

FIG. 3 illustrates a conceptual block diagram showing the high level component architecture for a further wireless sensor based audio monitoring system 300 according to the described embodiments. FIG. 3 illustrates implementation of the audio monitoring system 300 with multiple wireless audio sensors $\mathbf{310_1}$, $\mathbf{301_2}$, $\mathbf{310_3}$. It will be understood that each of the wireless audio sensors $\mathbf{310_1}$, $\mathbf{301_2}$, $\mathbf{310_3}$ may be the same as, or substantially similar to, the wireless audio sensor 210 of FIG. 2. Alternatively, some, or all, of the wireless audio sensors $\mathbf{310_1}$, $\mathbf{301_2}$, $\mathbf{310_3}$ may be different to the wireless audio sensor 210 of FIG. 2. It will be understood that the wireless audio sensors $\mathbf{310_1}$, $\mathbf{301_2}$, $\mathbf{310_3}$ are examples of receiver modules. Alternatively the wireless audio sensors $\mathbf{310_1}$, $\mathbf{301_2}$, $\mathbf{310_3}$ may transmit audio data to a separate receiver module.

As illustrated in FIG. 3, the multiple wireless audio sensors $\mathbf{310_1}$, $\mathbf{301_2}$, $\mathbf{310_3}$ communicate, via a network 320, with a single, network connected 'central' processor unit that hosts and runs a sound/signal recognition module 330. It will be appreciated that the sound recognition module 330 may be substantially the same as, or substantially similar to, the sound recognition module 220 of FIG. 2. Each of the wireless audio sensors communicate with the sound recognition module 330 hosted on the central processing server through a connection (e.g., network interface) to a network 320. The network 320 may for example be the internet. Alternatively, other networks may be utilised, for example local area networks and the like. The sound/signal recognition module 330 is configured to run an analysis program that receives the audio signals, as audio data files, captured by all of the wireless audio sensor(s) associated with a particular system, or that belong to a single user. The analysis program then runs data processing algorithms that preprocess the data using signal denoising methods, execute sound detection algorithms to determine the presence of an audio signal after denoising the data and run audio feature image computation to generate image data corresponding to the captured audio signals when audible signals are detected. Unwanted noise is thus reduced from the audio data files and image data which is representative of the audio signals of the audio data files are generated. The analysis program then executes inference models, on the image data, that have been trained from supervised machine learning models to automatically recognise different sound types present in the audio data captured by each of the sensors $\mathbf{310_1}$, $\mathbf{301_2}$, $\mathbf{310_3}$. The analysis program subsequently prepares a notification message containing information relating to the audio sensors and the types of 'known' sounds recognised by each sensor, if any. Optionally the notification also includes meta data information such as the time and/or date and/or location information for each sensor and wirelessly transmits the notification message to the user's smart device app installed on one or more of the user's computational/smart devices.

The system 300 of FIG. 3 also includes a notification application (app) 340. The app 340 may be substantially the same, or substantially similar to the app 230 of FIG. 2. It will be understood that the app 340 is an example of a data receiver module. The app 340 resides/is installed on, and operates on, one or more computational/smart devices 350 for example a tablet 360 and/or a smart phone 370 and/or a smart watch 380.

Optionally, the three component blocks illustrated in FIG. 3: the wireless audio sensor(s) $\mathbf{310_1}$, $\mathbf{301_2}$, $\mathbf{310_3}$, the sound/signal recognition module 330, and the app 340 establish data communication through a wireless data communication protocol. That is to say that the wireless audio sensors $\mathbf{310_1}$, $\mathbf{301_2}$, $\mathbf{310_3}$ each optionally establish data communication with the sound recognition module 330 through a wireless data communication protocol. Similarly, the sound recognition module 330 optionally establishes a data communication with the app 340 through a wireless data communication protocol. Wireless data communication between the wireless audio sensors $\mathbf{310_1}$, $\mathbf{301_2}$, $\mathbf{310_3}$ and the central processor unit hosting the sound recognition 330 module may be achieved using a variety of custom or standard wireless protocols for example IEEE 802.15.4, Wi-Fi, ZigBee, 6LoWPAN, Thread, Z-Wave, Bluetooth Smart, ISA100.11a, WirelessHART, MiWi, and the like. Optionally a client-server network architecture may be employed to facilitate data communication of audio data files between the wireless audio sensors $\mathbf{310_1}$, $\mathbf{301_2}$, $\mathbf{310_3}$ and the central processing unit in which the sound recognition module 330 resides.

A wireless communication protocol, as per the above paragraph, may, for example, be established through a web communication protocol that ensures fast and reliable bidirectional communication between the smart/computational device 350, or devices, and further/central processor unit, in which the sound recognition module 330 resides, through the internet. The web communication protocol may be implemented, for example, by utilising web sockets that allows for bidirectional, full duplex communication between a user's smart/computational device(s) 350 upon which the app operates, and the further/central processor unit upon which the sound recognition module 330 operates. It will be appreciated that other communication protocols and transfer control protocols (TCP) methods, such as establishing one or more TCP sockets or running request-response half duplex protocols such as HTTP or RESTful HTTP for example, can also be utilised.

Figure 4:
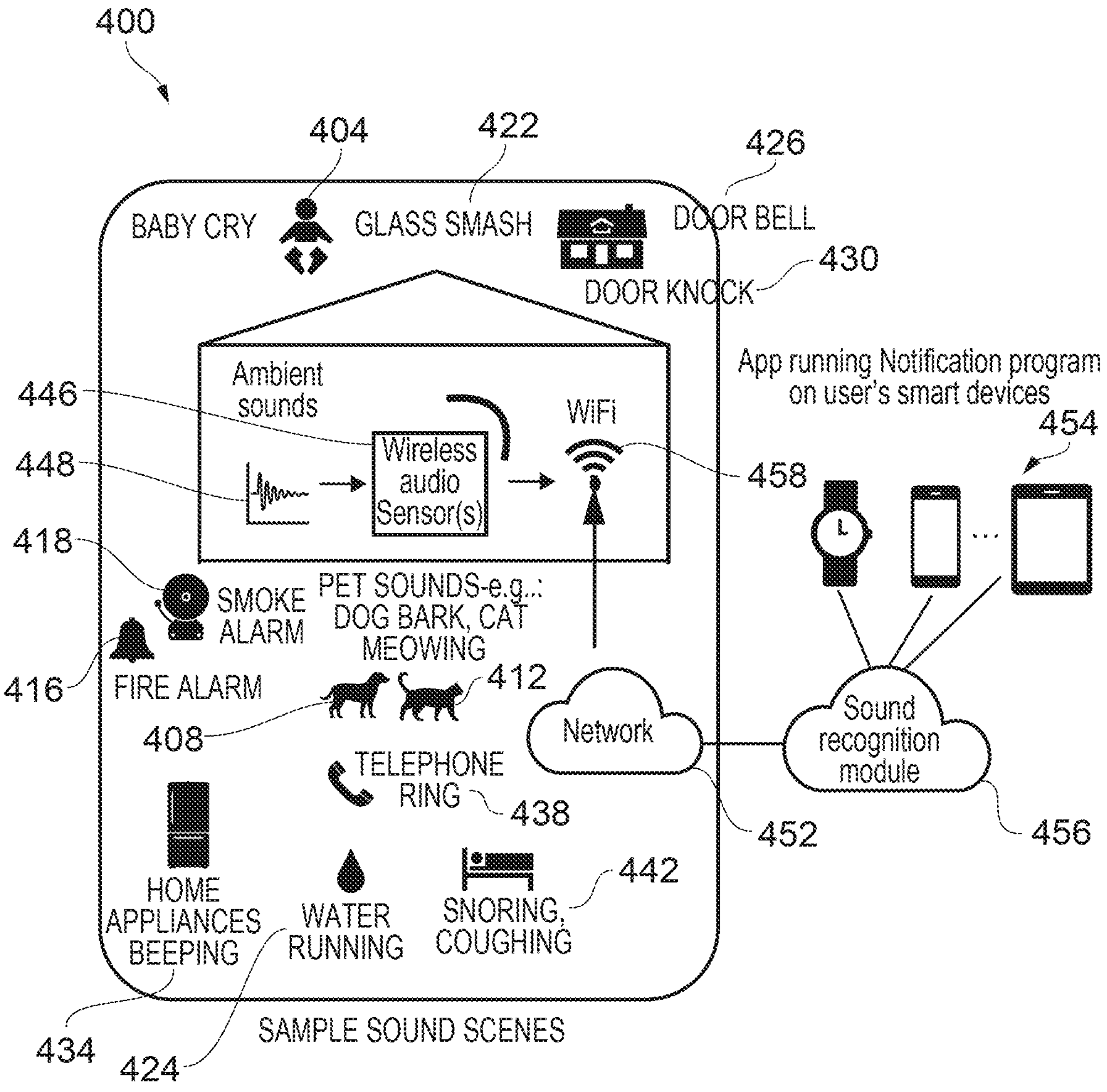
FIG. 4 illustrates the wireless sensor based audio monitoring system according to the described embodiments of FIG. 3 in use in a home environment.

FIG. 4 illustrates a wireless sensor based audio monitoring system according to the described embodiments in use in a home environment 400. FIG. 4 illustrates a variety of audio/sounds/sound scenes which may be relevant/commonplace in a home setting. That is to say that FIG. 4 illustrates a visual representation of some sample sound scenes in a home environment where the wireless audio monitoring system can be used. As shown in FIG. 4, a home environment may include audio sounds in the form of a baby crying 404, a dog barking 408, a cat meowing 412, a fire alarm ringing 416, a smoke alarm ringing 418, a glass breaking 422, water running 424, a door bell ringing, a door knock 430, home appliances beeping 434, a telephone ringing 438, a person snoring and/or coughing 442, and the like. It will be appreciated that a variety of other sounds may be present in a home environment. It will be appreciated that any number of the aforementioned sounds, or any other suitable sounds, may be present in the ambient sound environment of the home environment simultaneously. It will be understood that the aforementioned sounds are examples of audio signals.

In the system of FIG. 4, a single wireless audio sensor 446 is capable of monitoring ambient sounds 448, which may include any of the aforementioned audio signals or any other suitable audio signals. The single wireless audio sensor 446 can be used for multiple monitoring applications by monitoring such ambient sounds 448 when the sensor 446 is connected, via a network 452, with a network interfaced sound/signal recognition module 456 capable of distinctly identifying the sound types/sound source of the audio signals present in the ambient sounds and capable of sending notification messages via a notification application, that optionally is a smart device app installed and operating on one or more computational/smart devices 454, when a sound of interest is, or a number of sounds of interest are, detected by the sensor 446. That is to say that the same wireless audio sensor can be used to monitor a variety of desired audio signals present in the ambient sound environment of the home environment.

Optionally the wireless audio sensor 446 and the network 452 are interfaced via a home WiFi connection 458.

It will be appreciated that FIG. 4 illustrates a non-limiting visual representation of some sound types that may be present in a home environment. It will be understood that other types of sounds may be present in a home environment. It will be understood that the audio monitoring system 400 is usable to monitor any other suitable sound, non-verbal or otherwise.

It will be appreciated that the wireless audio sensor 446, the sound recognition module 456 and the notification application of FIG. 4 may be substantially the same as, or substantially similar to those described in relation to FIGS. 2 and 3.

Figure 5:
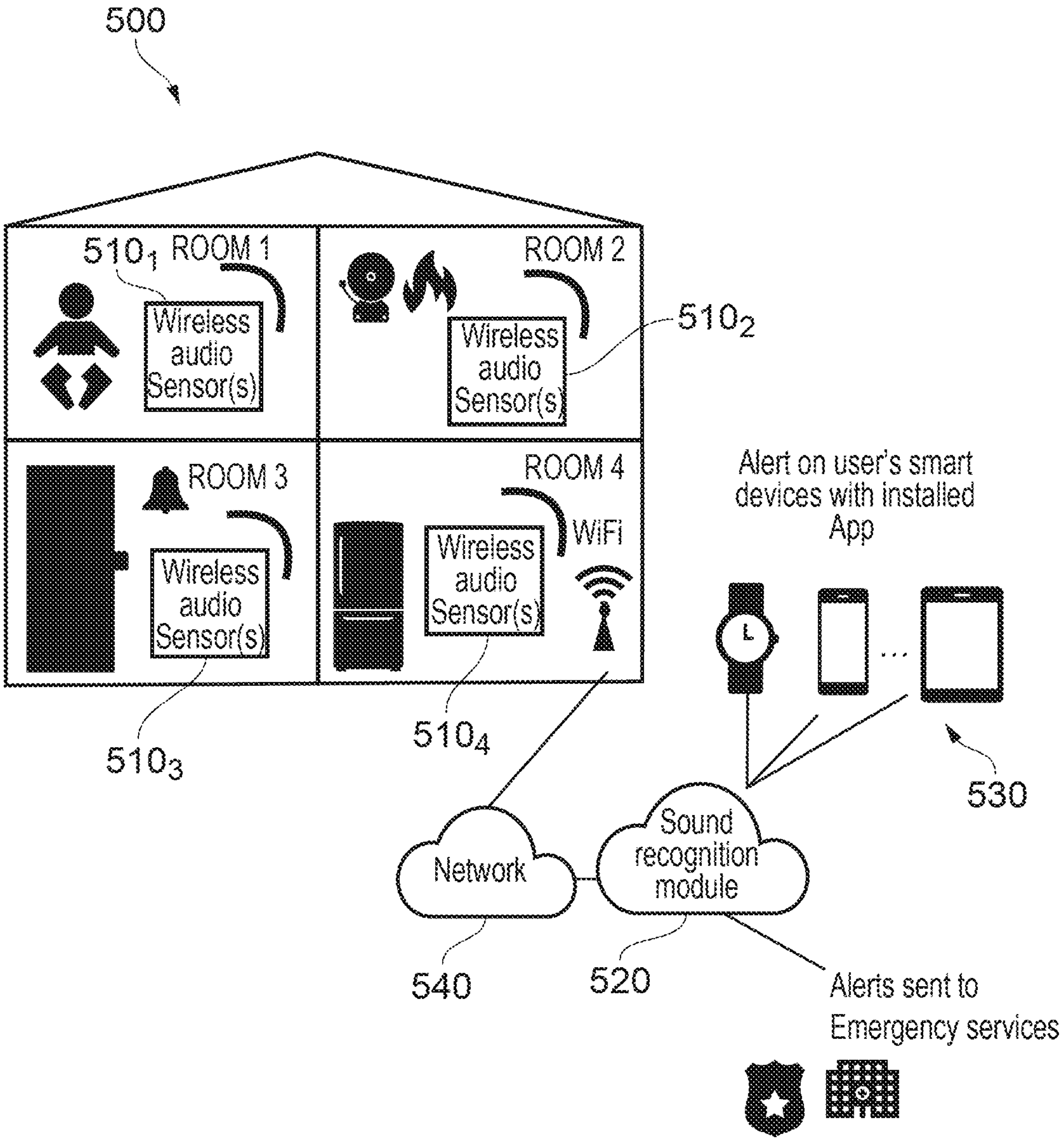
FIG. 5 illustrates a further wireless sensor based audio monitoring system according to the described embodiments in use in a home environment.

FIG. 5 illustrates a further wireless sensor based audio monitoring system according to the described embodiments in use in a home environment 500. The system of FIG. 5 includes multiple wireless audio sensors 5101, 5102, 5103, 5104 arranged within the home environment 500 to monitor multiple sounds in different rooms of the house. It will be appreciated that the sounds are ambient sounds which include audio signals. Each of the wireless audio sensors 5101, 5102, 5103, 5104 is configured to wirelessly transmit the sounds to a central sound recognition module 520 that recognises and classifies the different sounds and sends notifications based on the captured and identified sounds to a user through a smart/computational device application 530 in real time.

As shown in FIG. 5, multiple wireless audio sensors 5101, 5102, 5103, 5104 are each placed in a different location within the house. In the system of FIG. 5 the sensors are placed in different rooms. However it will be appreciated that sensors can be placed in any suitable location within a house, or even outside of a house. In the system of FIG. 5, one sensor 5101 is arranged to monitor a baby, a further sensor 5102 is arranged to monitor a fire alarm, a still further sensor 5103 is arranged to monitor a door and an alarm, for example a smoke alarm or a burglar alarm, and a final sensor 5104 is arranged to monitor household appliances. It will be appreciated that any number of sensors can instead be utilised to monitor any number of audio sounds. Each of the sensors are connected through a network interface to a cloud hosted sound/signal recognition module 520. Each of the sensors is thus connected to the sound/signal recognition module via a network 540. Responsive to the sensors capturing sound/audio signals, the sound recognition module is configured to recognise different sound signals, which may originate in different locations within the home, and send real time notification messages to one or more of the user's smart devices 530 on which the notification app is installed and operatable.

FIG. 5 additionally illustrates the system configured to send alerts/notifications to emergency services from the signal recognition module if specific sounds are captured, for example that of a fire alarm or a smoke alarm of glass smashing/shattering. Optionally such configuration is achieved by a user via the notification application residing on the smart/computational device(s). Alerts may be provided to emergency services via standard notification messages such as text message or through automated voice calls and the like. Such notification preferences may be configured by the user through the smart device app.

It will be appreciated that the wireless audio sensors 5101, 5102, 5103, 5104, the sound recognition module 520 and the notification application of FIG. 5 may be substantially the same as, or substantially similar to those described in relation to FIGS. 2, 3 and 4.

Figure 6:
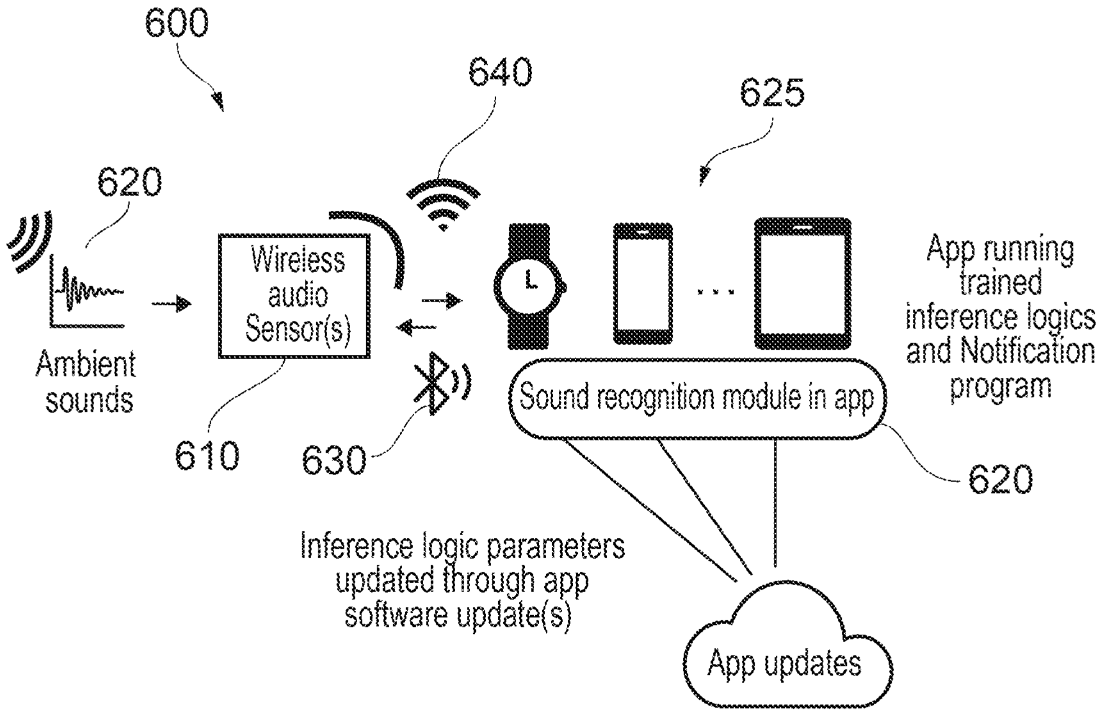
FIG. 6 illustrates a still further wireless sensor based audio monitoring system according to the described embodiments.

FIG. 6 illustrates a still further wireless sensor based audio monitoring system 600 according to the described embodiments. The system of FIG. 6 is substantially similar to the systems described with reference to FIGS. 2, 3, 4 and 5.

The system illustrated in FIG. 6 includes a single wireless audio sensor 610, however it will be appreciated that any number of sensors may instead be utilised. The sensor 610 captures audio signals that are ambient sounds 620. Optionally the audio signals are present within the ambient sounds. The system of FIG. 6 includes a sound/signal recognition module. The sound/signal recognition module of FIG. 6 however is embedded and executed within a mobile device notification application (app) instead of a central processing unit, such as a central cloud processing server, as illustrated in the systems of FIGS. 2, 3, 4 and 5. It will be appreciated that the app resides and operates on at least one computational/smart device 625. The system of FIG. 6 thus enables real time sound classification/recognition/identification in the absence of an active internet connection. As illustrated in FIG. 6 the wireless audio sensor and the sound recognition module are connected via a Bluetooth connection. Alternatively, any other suitable wireless data communication protocol can be utilised. Such wireless data communication protocols enable real time transmission of audio data files, based on captured audio signals, from the wireless audio sensors directly to the connected smart device app. In such an implementation, the app is also configured to execute the analysis program of the sound recognition module to classify/recognise/identify the sounds and send notifications within the smart device if sounds of interest to the user are captured. Alternatively, other standard wireless communication protocols like WLAN (Wi-Fi) 640, ZigBee etc., may also be used for data communication between the wireless audio sensor(s) and the smart devices. It will be appreciated that the app and the sensor may optionally be connected by more than one wireless communication protocol, for example Wi-Fi 640 and Bluetooth 630.

Figure 7:
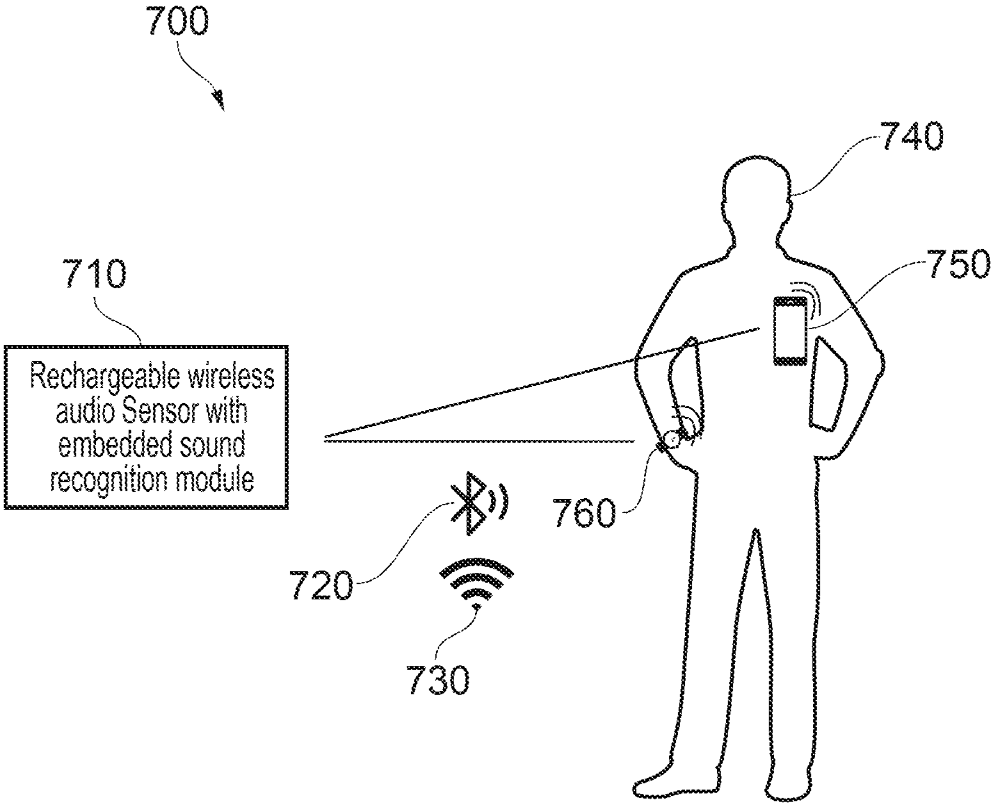
FIG. 7 illustrates another wireless sensor based audio monitoring system according to the described embodiments.

FIG. 7 illustrates an alternative wireless sensor based audio monitoring system 700 according to the described embodiments. It will be understood that the system 700 of FIG. 7 is substantially similar to the systems illustrated in FIGS. 2, 3, 4, 5 and 6. The system 700 of FIG. 7 includes a wireless audio sensor 710. Optionally the system 700 of FIG. 7 includes more than one wireless audio sensor. The wireless audio sensor 710 is rechargeable and therefore includes a battery.

The system 700 of FIG. 7 however differs from the systems illustrated in FIGS. 2, 3, 4, 5 and 6 in that a sound/signal recognition module is embedded in the wireless audio sensor 710 (or optionally sensors). The wireless audio sensor 710 is thus configured to capture ambient sounds, process the captured audio signals, for example running signal preprocessing, sound identification and sound recognition inference logics, within the sensor 710 via the embedded sound recognition module. Via the embedded sound recognition module, the sensor 710 is configured to send notification messages, via a wireless connection 720, 730, directly to a notification application residing on a user's 740 computational/smart device 750. The user of FIG. 7 has two devices, a smart phone 750 and a smart watch 760 each of which contain the application.

As illustrated in FIG. 7, the system 700 operates without a need for a central processing server to host the sound recognition module to run trained inference logics and/or other audio data processing methods. Such data processing methods are operable on the sensor 710 itself. In the system of FIG. 7 700, the wireless audio sensor 710 thus performs the following tasks. The sensor 710 captures at least one ambient audio signal via an inbuilt microphone. Optionally the sensor may include multiple microphones to better isolate signals of interest. The sensor 710 then packages the captured audio signals into audio data files. The audio data files may be transmitted to the sound/signal recognition module within the sensor 710. The sound/signal recognition module is executed within the sensor 710 in order to process the audio data file and to identify/recognise any known sound signals. The above steps are achieved in real time and all within the sensor 710. The sensor 710, via the embedded sound recognition module, subsequently transmits notification messages for all of, or any desired, sounds/sound signals directly to the notification application residing on one, a select few, or all of a user's smart/computational devices. The notification messages are transmitted over a wireless connection, for example Wi-Fi 730 or Bluetooth 720.

It will be appreciated that the analysis program/software pertaining to the sound recognition module is executed on a microcontroller or microprocessor unit within the sensor 710 instead of a central processing server. This allows for faster sound classification/recognition without a need for active wireless communication between the wireless audio sensor(s) and a network connected processing server to host and run the sound recognition module.

It will be understood that the wireless audio sensor(s) 710 of FIG. 7 includes at least one microphone that is capable of capturing the ambient sound signals, an Analog to Digital Converter (ADC) unit to digitise any analog audio signals provided by the microphone(s) and a microcontroller unit or a microprocessor unit. It will be understood that the microcontroller or microprocessor of the sensor 710 not only repackages the digital signal to write out audio data files, but also executes the analysis program/software of the sound recognition module and subsequently wirelessly transmits notification messages containing information pertaining to sound classification by interfacing to a wireless transceiver unit. Optionally, the wireless audio sensor 710 also hosts an additional memory for redundancy should the microprocessor or microcontroller unit contain insufficient built-in memory to hold sufficient audio data. It will be understood that the sensor additionally includes a wireless transceiver to transmit the notification messages directly to the smart/computational device which hosts and executes the notification app.

Optionally, the sensor includes a rechargeable battery with a wireless or a wired charging unit to power all the components in the wireless audio sensor, and a switch to assist the user in powering the sensor on and off. Optionally, the wireless sensor unit also includes an LCD or LED display unit, optionally being a touch screen display unit, to facilitate a user's interaction with the wireless sensor unit for configuration and set up of the audio monitoring system 700. The display unit may also be used to display recognised sounds on sensor.

Figure 8:
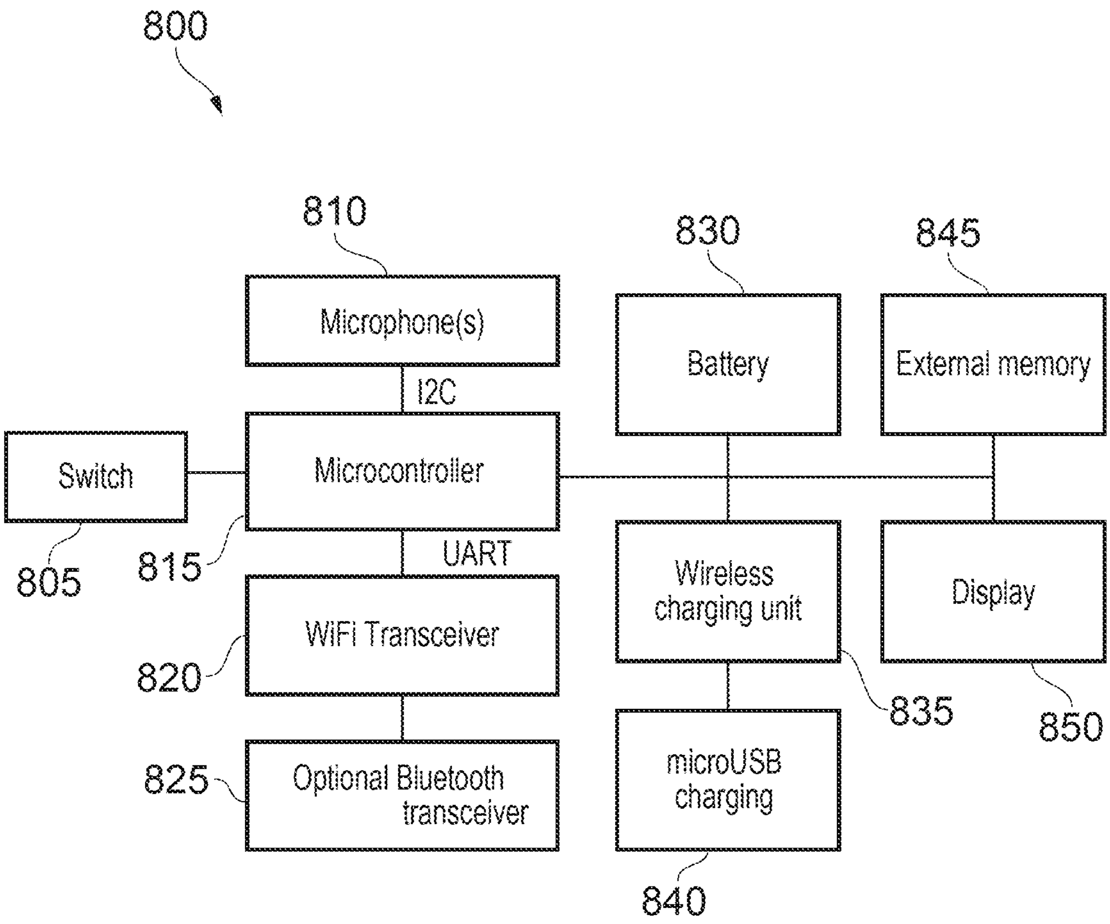
FIG. 8 illustrates an architectural schematic block diagram of components of a wireless audio sensor part of the audio monitoring system according to the described embodiments.

FIG. 8 illustrates an architectural schematic diagram or block diagram of components of a wireless audio sensor 800. The wireless audio sensor 800 may be employed with any of the audio monitoring systems according to the described embodiments. It will be appreciated that the sensor 800 of FIG. 8 may illustrate the components of any of the wireless audio sensors of FIG. 2, 3, 4, 5, 6 or 7. The wireless audio sensor 800 of FIG. 8 includes a switch 805 such that a user can power the sensor 800 on and off. Of course, any other suitable mechanism for powering the sensor 800 on/off could instead be utilised. Optionally the sensor 800 does not include a switch. The sensor also includes a microphone 810. Optionally the sensor 800 includes more than one microphone. It will be understood that the microphone 810 allows for the capture of audio signals in an ambient sound environment. The sensor 800 also includes a microcontroller 815. The microcontroller 815 allows for the arrangement of the captured audio signals into audio data files. Optionally the microcontroller 815 also includes a signal recognition module for processing of the audio data files. The sensor 800 also includes a WiFi transceiver 820 which facilities transmission of the audio data files, or processed audio data to further components of an audio monitoring system. Optionally the sensor 800 also includes a Bluetooth transceiver 825 which facilitates transmission of the audio data files, or processed audio data files, to further components of the audio monitoring system.

The sensor 800 of FIG. 8 also includes a battery 830 which provides power to the components of the sensor 800. The sensor 800 of FIG. 8 includes a wireless charging unit 835 for providing charge to the battery 830. The sensor 800 of FIG. 8 also includes a microUSB charging component 840 for providing charge to the battery 830. It will be understood that a sensor 800 may only include a microUSB charging component or a wireless charging unit. The wireless charging unit 835 of FIG. 8 also includes an external memory 845 onto which audio data files can be stored should the microprocessor memory have insufficient storage space. The sensor further includes a display 850.

It will be understood that the wireless audio sensor 800 once installed, switched on and connected to a sound/signal recognition module performs the following tasks repeatedly. The sensor 800 captures ambient sounds and/or audio signals for a defined time period. The time period is optionally between 0.5 and 4 seconds. The sensor 800 then, via the microcontroller 815, writes the audio signals captured into a digital audio data file at the end of the configured time period and transmits the digital audio files to the sound recognition module for sound classification. This approach of capturing sounds for a certain time duration and transmitting the audio files for sound recognition makes the sensor 800 suitable for readily capturing non-verbal/non-speech sounds. It will be understood that the sensor 800 may instead be configured to capture verbal sounds.

It will be appreciated that a user may configure the system to transmit a notification when one type of audio signal has been identified, such as an alarm sound, and not to transmit a notification when another type of audio signal has been identified, such as a dog barking.

Utilisation of a particular time period in which sounds are repeatedly captured is particularly suited to the capture, and subsequent recognition, of non-verbal sounds. Phonemic or verbal sounds may require sounds to be transmitted continuously without any lapses. This is less so the case for the recognition of non-speech sounds. Furthermore, as each audio signal file, which is captured over a given time period, is processed independent of the previous sound file it, speech sounds are actively decoupled. This allows for more robust prediction of instantaneous non-speech sounds. This also negates the need to store previously received sound files consequently saving storage costs. Optionally, the wireless audio sensor 800 may also be designed to include a motion sensor that can be used to enable better user interaction.

Figure 9:
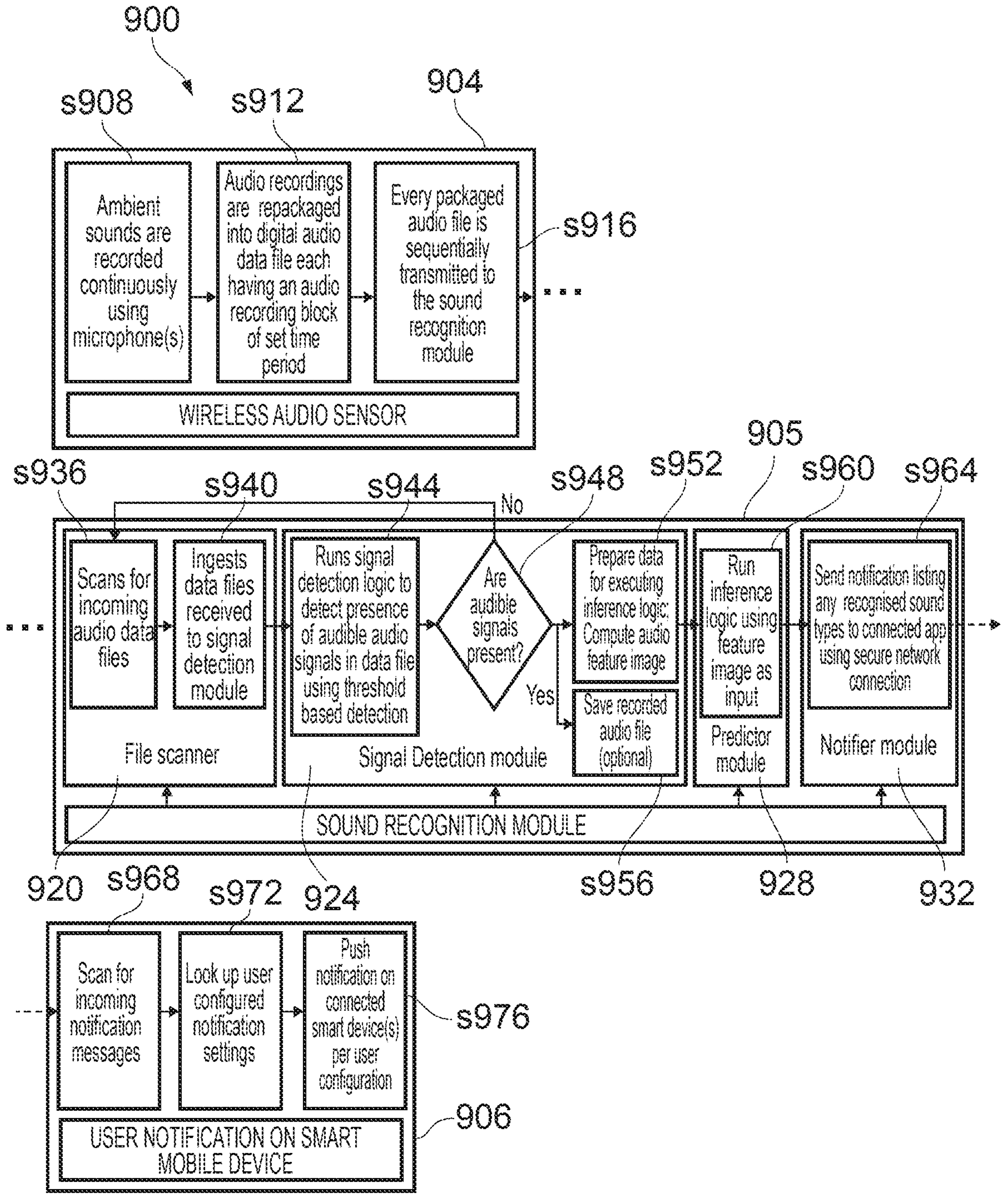
FIG. 9 illustrates a functional block diagram showing the steps executed in components of the audio monitoring system according to the described embodiments.

FIG. 9 illustrates a functional block diagram 900 showing the steps executed in each component of an audio monitoring system according to the described embodiments. It will be understood that the function block diagram illustrated in FIG. 9 may illustrate the operational mechanism of any of the audio monitoring systems of FIGS. 2, 3, 4, 5, 6 and 7. The system illustrated in FIG. 9 includes three main components, a wireless audio monitoring sensor 904, a sound/signal recognition module 905 and a user notification application on a smart mobile device 906. It will be appreciated that the sensor 904 may be the sensor described in FIG. 8. It will be appreciated that the user notification on a smart mobile device may be a notification application. Referring now to the sensor 904, at a first step s908 ambient sounds are recorded. In the system 900 of FIG. 9 sounds are recorded continuously. It will be appreciated that sounds may instead be recorded intermittently. It will be appreciated that sounds may be captured over particular time intervals.

At a next step s912, the audio recordings are repackaged into respective digital audio files each having an audio recording block of a set time period. The repackaging may include digitising any captured sound in analogue format, separating a continuously captured audio stream into discrete audio data files for a given time period which may be user defined, embedding metadata into the file and the like. At a next step s916, every packaged audio file is sequentially transmitted to the sound/signal recognition module 905. It will be appreciated that the transmission of the audio files may occur via a wireless connection, for example a WiFi connection or Bluetooth connection and the like.

The sound/signal recognition module 905 includes 4 sub-components/sub-units, a file scanner 920, a signal detection module, 924, a predictor module 928 and a notifier module 932. It will be appreciated that the sub-components may reside on a single physical component, for example a processor. The sound recognition module may include any other suitable sub-components. At a first step s936 the file scanner 920 of the sound recognition module scans for incoming audio data files. At a next step s940 the file scanner or the signal detection module ingests data files received to the signal detection module. The file scanner thus allows for the identification and receipt of any audio data files provided by the sensor 904.

At a next step s944, the signal detection module 924 of the sound recognition module runs signal detection logic to detect any presence of audible audio data signals in any data files received by the file scanner 920 using threshold based detection. Such threshold based detection may, for example, include detecting the alleged presence of a predetermined number of audio signals, detecting a signal that comprises a predetermined characteristic (amplitude, for example) that has a predetermined gain/level above a background noise signal. At a next step s948, the signal detection module determines if audio signals are present in an audio data file based on the signal detection logic output. If no audible signals are present the system reverts back to the initial file scanner step s936 of searching for incoming audio data files. It will be appreciated that the file scanner may continuously be searching for incoming audio data files. If, however, audible signals are deemed to be present, the signal detection module proceeds to a further step s952 and a still further step s956.

At the further step s952, the signal detection module prepares data for executing interference logic in order to recognise/classify sounds present in the audio data file, and subsequently computes an image data. It will be appreciated that the audio data file received by the sound recognition module may be an uncompressed audio data file. The signal detection module thus executes various data preparation algorithms including data processing models to 'denoise' the data. It will be understood that denoising the data may include removing any components of the recorded audio file that are known to be unrelated to the audio signals of interest (the audio signals to be classified), such as electronic noise and/or any audio features caused by background noise in the captured audio data. The signal detection module may also employ statistical data normalisation methods using standard normalisation techniques, for example 'Z score computations' and the like. Aptly preparing the audio data files also includes first extracting any audible sound signals present in the captured audio data, computing and selecting set of statistical audio features within smaller time subsets of the audible signals detected.

Following data preparation, the signal detection module computes an image data based on the prepared audio data file. The audio data file is processed to compute a time-windowed multi dimensional feature image. It will be appreciated that generation of such audio image helps account for any time variabilities in the characteristics of captured sound signals and thus helps effectively capture variabilities with time in sound 'signatures' and/or features. Generation of image data also provides a visual representation of sound signatures and/or features that relate to particular types of sound, such as sound originating for particular source such as a baby crying, an alarm and the like, enabling implementation of faster and more robust feature selection methods and consequently improved sound recognition and classification in further processing. Aptly generating image data from audio data files includes first extracting any audible sound signals present in the captured audio data, computing a select set of statistical audio feature vectors from values of features computed within smaller time subsets of the audible signals detected and subsequently rendering the computed values of the feature vectors graphically by plotting the feature amplitudes against time for each of the audible sound subsets.

Optionally, the image data is provided based on audio variables, which are used to construct the image, derived by computing and selecting a prescribed set of Mel-Frequency Cepstral Coefficients (MFCCs), the first order derivative or the delta values in MFCCs that measures the change in audio variables from a previous frame of an audio data file to a next frame of an audio data file alongside second order derivatives of the MFCCs (also called the delta-delta MFCC values) that measures the dynamic changes in the first order derivative values (also called the delta-delta MFCC values) and ⅓rd Octave band energy components for each of the audio data files. It will be appreciated that Mel-Frequency Cepstrum (MFC) sound processing represents the short-term power spectrum of a sound based on a linear cosine transform of a log power spectrum on a non-linear Mel scale of frequency. Coefficients that collectively make up the Mel-Frequency Cepstrum are MFCCs.

Optionally, the MFCC extraction process comprises of the following steps. Firstly the audible signals within the audio data files are split into shorter sliding frames, the sliding frames optionally being 20-40 ms frames. This is followed by computation of discrete Fourier transform or short-time Fourier transforms on each frame to compute the frequency/magnitude spectrum for the audio signals within the frame. This is then followed by adding at least one Mel filter group to the frequency/magnitude spectrum and carrying out logarithm operation to obtain an output corresponding to each Mel filter. Subsequently, a discrete cosine transformation (DCT) is performed on the resulting filtered spectrum to obtain the MFCCs. The delta values and the delta-delta values of the MFCCs are then derived by computing the first and the second order derivatives from the MFCC values. An image data is thus generated based on the MFCCs, delta values and delta-delta values.

Optionally, the generated image data also includes a selected set of vectors representing the energy densities within a prescribed set of different ⅓ octave frequency bands. It will be appreciated that such octave bands offer a filtering method of splitting the audible spectrum into smaller segments often referred to as 'octaves'. Octave or a fractional octave band filters are band pass filters applied on the sound signals to obtain energy estimates within different frequency bands computed by splitting the audible spectrum into smaller unequal segments.

Still further optionally, a prescribed set of feature vectors selected from the computed MFCCs, delta values, delta-delta values and ⅓ Octave band energy vectors for each of the audible sound signals are then computed for smaller, overlapped time intervals and plotted along the vertical axis with time of the audible signal along the horizontal axis to generate an audio feature image that is truly descriptive of the characteristics of the sound captured. The resulting audio feature image thus not only includes the audio features themselves but also represents possible variations within each of the features as a function of time for each of the audible recorded signals As the still further step 956, the signal detection module saves the recorded/captured audio file. It will be appreciated that the signal detection module may instead not save the audio file following generation of an audio feature image.

As a next step s960, the predictor module 928 runs inference logic using the generated image data as an input. It will be appreciated that the predictor module runs inference logic to identify/determine/recognise any audio features within the image data that correspond with known audio features (which may originate from a known audio source). It will be appreciated that the inference logic is a computational model that is applied to the image data. Optionally, the parameters used by the inference logic(s) executed in the sound recognition module to classify the different sound types are derived from supervised machine learning based sound recognition algorithms that have been trained to identify and classify sounds using a set of one or more known or 'labelled' sounds captured under known or prescribed conditions for each sound type. Optionally, the known or 'labelled' sounds are obtained under different background noise conditions to enable robust sound classification under real world conditions.

It will be appreciated that the sound recognition algorithms chosen to derive the parameters used by the inference logic(s) may use a trained neural network (NN) with single or multiple hidden layers for classifying the presence of multiple sound types within the signal (for 'multi-class' classification). An artificial neural network (ANN) with a single or multiple hidden layers may thus be trained by introducing each of the sound types that are to be classified as one of a particular set of known sound classes and training the ANN with a set of labelled sounds for each of the sound types/classes. It will be appreciated that, alternatively, multiple supervised binary classifier algorithms (often referred to as 'one Vs all' classification algorithms like logistic regression) could instead be utilised to classify each of the sound types independently or simultaneously. Other supervised learning models could of course be utilised including, but not limited to, logistic regression, support vector machines, random forest based methods, other decision tree based methods, naive bayes classifiers and the like. The aforementioned techniques may be used for the purpose of building sound recognition algorithms and deriving inference logics. Any other suitable techniques may of course alternatively be utilised.

At a next step s964, the notifier module 932 sends one or more notifications listing any recognised sound types to the connected notification application using a secure network connection. It will be appreciated that the notifier module 932 includes a transceiver to facilitate transmission of such notifications. Optionally, the system is configured to send no notification or alerts from the sound recognition module if no audible sounds are captured or if no known or trained sounds exist in the audio data files received.

At a next step s968, the user notification application scans for incoming notification messages issued by the sound recognition module. At next step s972 the user notification application looks up user configured notification settings. It will be appreciated that a user of the application may desire only to be notified for a select few types of identified sounds. The user may therefore, via the application, select which sound types the user wishes to be notified. The application thus disregards, or logs but does not send a notification for, any sound types identified which do not align with the user defined criteria. At final stage s976, the application pushes notifications of identified sound types to connected computational/smart devices per predefined user configuration. It will be appreciated that the application may reside on one or more of the users computational/smart devices. Optionally the application resides on a server or on the sound recognition module and pushes notifications to a further application located on a user's computational/smart devices.

The system of the described embodiments extracts the feature vectors prior to generating the image data. Audio data per se may be voluminous to handle, store and process if treated in its raw form. Each audio file may be recorded with a sampling frequency in excess of 16,000 Hz (usually up to 24 kHz) implying that there would be at least 16,000 samples per second from each audio sensor. This would make running machine learning algorithms on the raw audio data computationally intensive. By using extracted feature vectors, the system of the described embodiments overcomes this big data challenge. Carefully selected statistical features provide a concise representation of the raw time domain audio signals as they provide a description of the characteristics of the audio signal which are directly used for classification. The described embodiments thus reduce the computing power needed for real time processing without compromising on the sound classification accuracy. As an example, if the acquired raw audio data for a certain time period such as 1 second worth of data sampled at 16 kHz=16,000 samples of data, and then compute a set of for example 10 features from that data set that describe the characteristics of the audio signal within that 1 second. This would reduce the overall volume from 16,000 to 10 in this case thereby offering a substantially reduced data set for computational purposes.

Furthermore the raw audio file is purely a time domain representation of the audio data which on its own is not sufficiently descriptive to run robust machine learning models on as they can be more readily impacted by noise. As an example, the presence of white noise or even harmonic noise may impede the signal quality substantially as they would skew the entire signal in the time domain making it hard to decipher the actual signal characteristics. With the system of the described embodiments the use of MFCC and octave bands overcomes this challenge as they enable dimensional transformation of the data, enabling to extract signal characteristics that may be difficult to otherwise ascertain directly from the time domain data. MFCC applies a cosine transformation on the data whilst octave bands are extracted by passing the raw audio data through frequency band filters to obtain an average signal amplitude for each of the frequency bands. Therefore, if there is a harmonic noise source at a specific frequency that causes a spurious signal in the raw data, this may be easily identified and isolated as its impact would be confined to a specific octave band frequency range, thereby enabling the system of the described embodiments to obtain the signal characteristics in the other bands more readily. This in turn, enables more robust signal classification.

Feature vectors represent dynamic characteristics of the sound signal. For example, a feature such as the pitch of the sound would simply indicate a value that is high when there is the presence of high pitch and a low value when there is a low pitch sound. So the output of pitch computation from 1 second of data would just be one value with no information about how the pitch may be changing within the 1 second of data. Computing static feature values would only provide an adequate description of sounds if the sounds remained stationary and do not change with time. If the audio signal does change over time, there is a need to track sound variations through time. The system of the described embodiments achieves this requirement by computing the image data. The image provides a description of how the feature vectors change through the sampling duration providing a clearer representation of the dynamics of the sound characteristics enabling far more robust sound classification than simply using static feature values that are computed from the time or frequency or cepstral domains for each of the sampled audio data sets for signal recognition.

Figure 10:
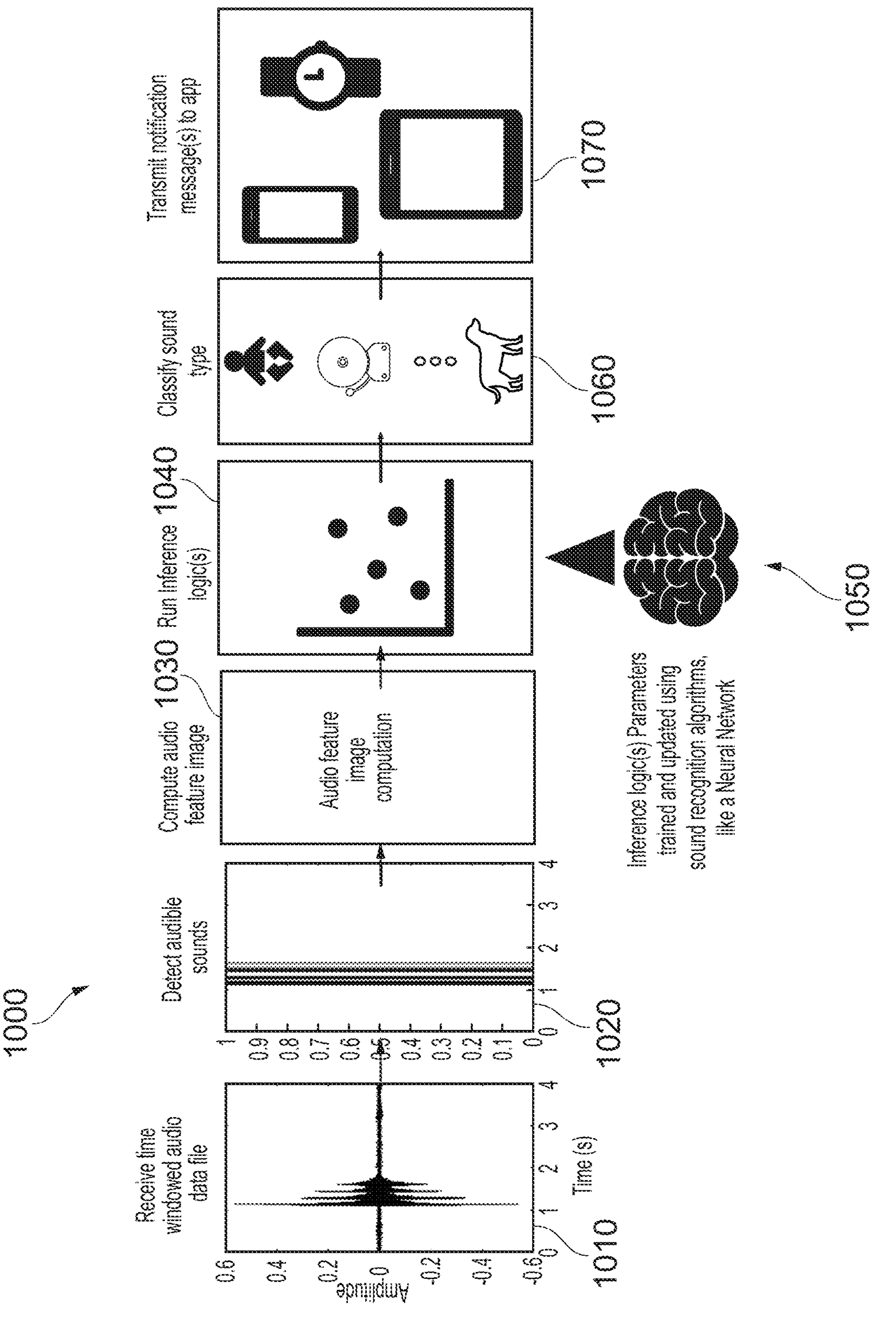
FIG. 10 illustrates a graphical representation of tasks performed by a signal recognition module part of the audio monitoring system according to the described embodiments.

FIG. 10 illustrates a graphical representation of tasks performed by the sound/signal recognition module 1000. The sound/signal recognition module 1000 may be employed with any of the audio monitoring systems according to the described embodiments. It will be appreciated that the sound/signal recognition module 1000 may be the sound/signal recognition module as described in FIG. 2, 3, 4, 5, 6, 7, 8 or 9.

The sound/signal recognition module 1000 receives a time windowed audio data file 1010. That is to say that the audio data file is taken over a specific, predetermined time period and may include embedded metadata. It will be understood that the audio data file is received from one or more sound receiving modules that may be wireless audio sensors. It will be understood that the audio data file is a packaged file including captured audio data, which may include audio signals of interest, the audio data being captured by a sound receiving module. The audio data of FIG. 10 includes time data and amplitude data of the captured audio signal. Alternatively, any other suitable data file may instead be utilised.

The sound/signal recognition module 1000 then detects if any audible sounds are present in the data 1020. That is to say that the module 1000 examines the waveform, for example, of the audio data to determine if any audio signals are present, or identifiable, in the audio data file. As illustrated in FIG. 10, such determining may involve identifying any amplitudes of a waveform using thresholding methods or the like and recording at what time in the file such amplitudes occurred, should any audible sounds be present or identifiable.

Should audio signals be detected in the audio data file, the sound/signal recognition module 1000 then generates or computes 1030 feature image data based on the audio data. It will be understood that prior to generating the image data, various data preparation steps may be carried out on the audio data file, for example noise reduction processing. It will be understood that generation of the image data follows a substantially similar process as is described with reference to FIG. 9. Optionally, any other suitable feature vectors may be chosen for image generation.

It will be appreciated that a user may configure the system to transmit a notification to one or more other users and/or to an emergency service when a specific type of audio signal has been identified, such as an alarm sound.

The sound/signal recognition module 1000 subsequently runs inference logic 1040, or logics, on the generated image. The inference logic applied to the image is substantially the same as that described with referenced to FIG. 9. It will be understood that the inference logic is a machine learning model usable to recognise or identify patterns in the image that correspond to specific sound types. The model is optionally trained using training data 1050 and further optionally is a neural network. It will be appreciated that any other types of image pattern recognition model or supervised learning based recognition algorithms may instead be utilised to generate inference logics.

The sound/signal recognition module 1000 uses the trained model to recognise or identify known patterns within the images 1060. That is to say, the model classifies what type of sound an audio signal identified in the image data is. For example, the machine learning model may determine that an audio signature in the audio file is a baby crying or an alarm ringing or the like.

At a final step, the sound/signal recognition module 1000 transmits notification messages based on the identified audio signal type to a notification application running on a smart device. That is to say that the sound recognition reports that a particular sound type has been identified and optionally provides metadata, such as a time of the captured sound, to the application. Optionally the application runs on any suitable computational device.

Figure 11:
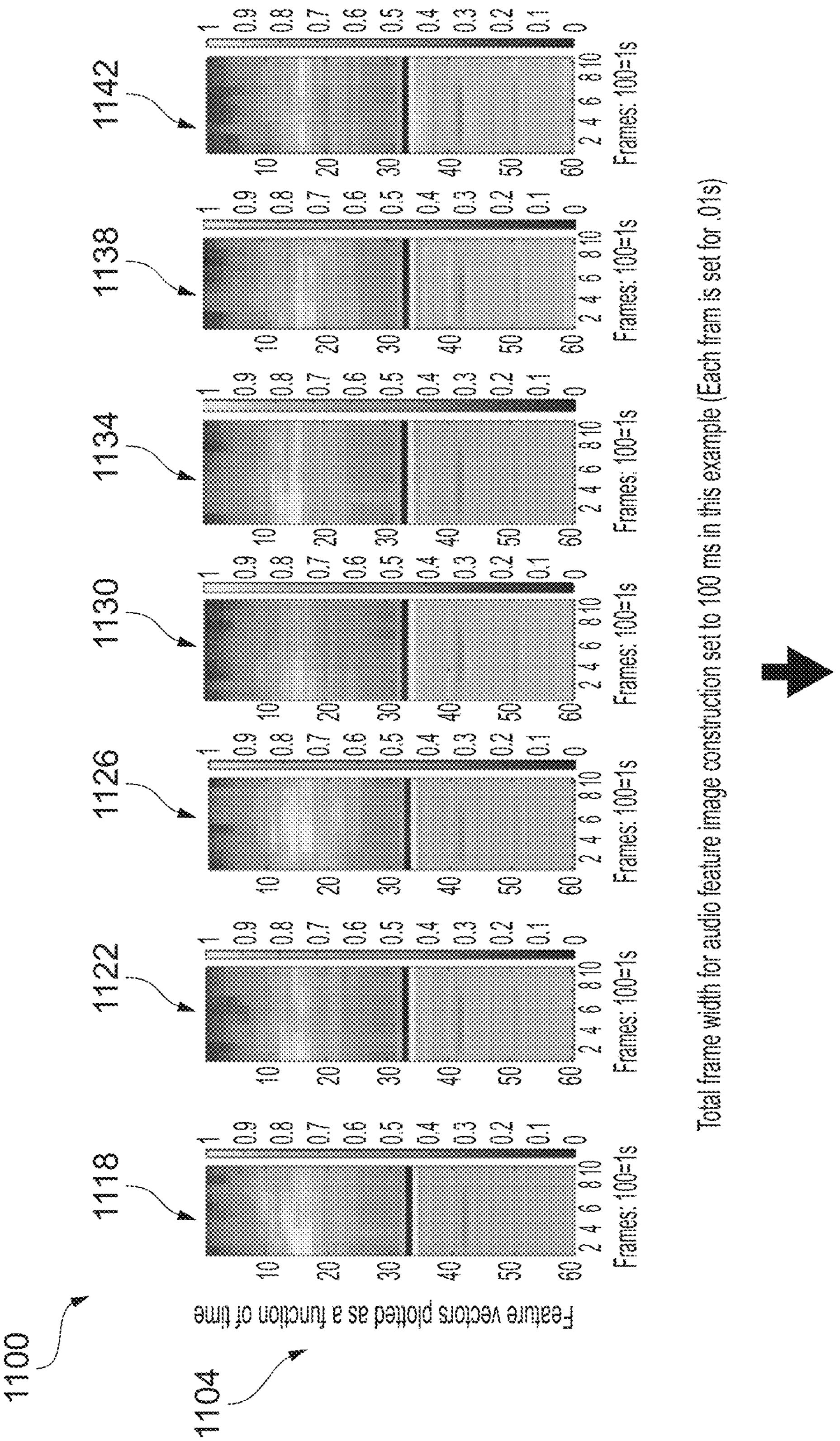
FIG. 11 illustrates examples of generated audio feature image data.
Figure 11:
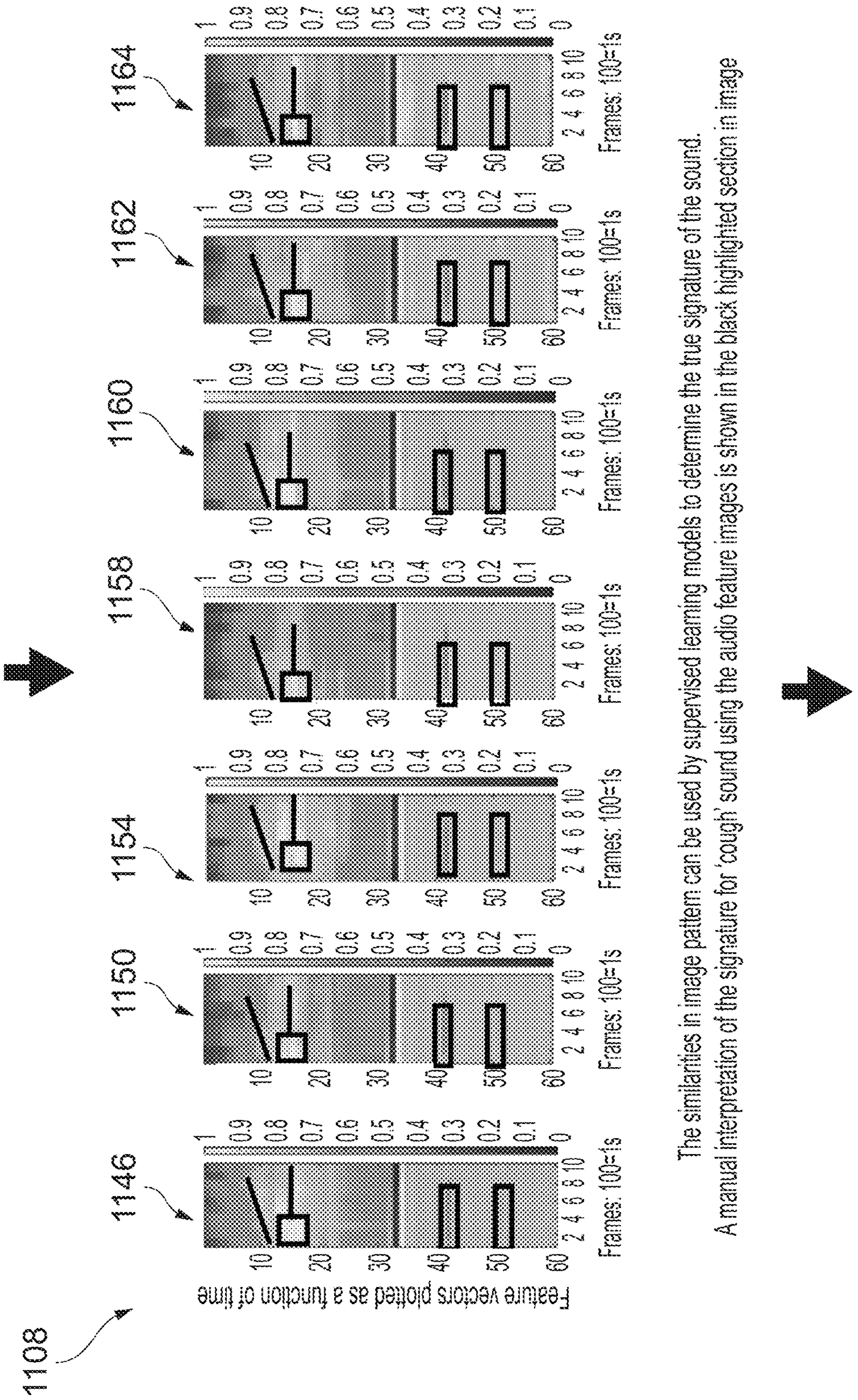
Figure 11:
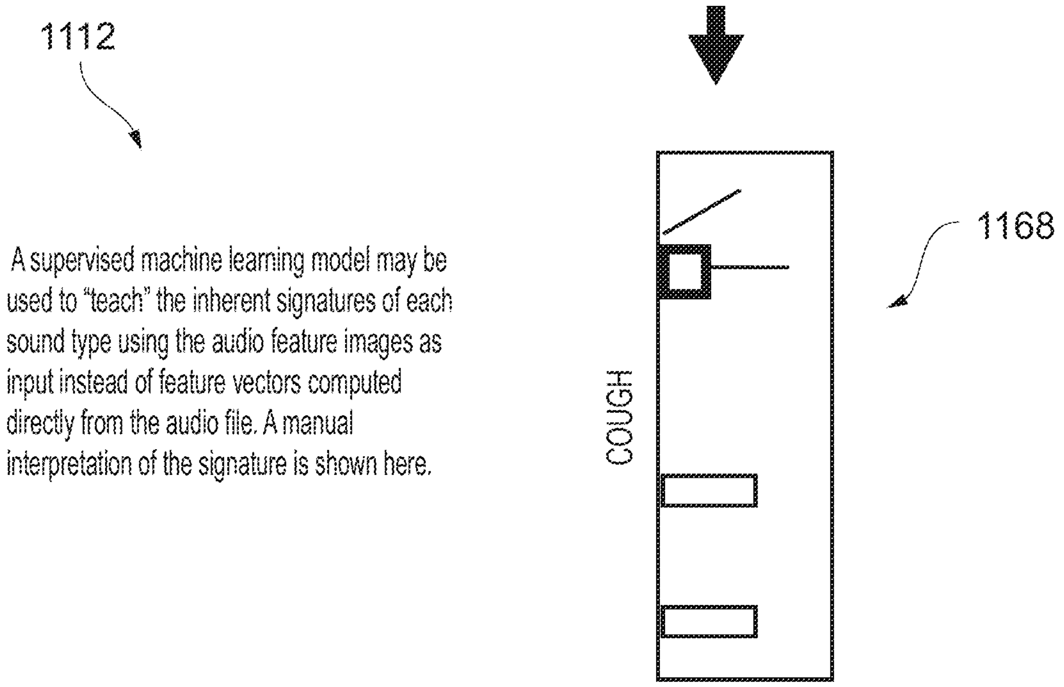

FIG. 11 illustrates examples of generated image data 1100 used with an audio monitoring system according to the described embodiments. In this case the image data 1100 represents a cough sound. It will be appreciated that the image data 1100 of FIG. 11 may be generated by the sound/signal recognition module of FIGS. 2, 3, 4, 5, 6, 7, 8, 9 and 10. FIG. 11 illustrates a variety of images 1104, the variety of images with an indicative illustration of the characteristic sound signature identified 1108, and an image with a representative example of the identified characteristic signature in more detail 1112.

The variety of images 1104 includes seven two-dimensional images 1118, 1122, 1126, 1130, 1134, 1138, 1142 generated for the same sound type but under seven different environmental, or optionally synthetic, conditions. The images 1118, 1122, 1126, 1130, 1134, 1138, 1142 each correspond to a person coughing. As illustrated in FIG. 11, a common characteristic signature is present in each of the images. It will be understood that different characteristic signatures are represented in the images for different sound types. FIG. 11 illustrates that, while each image represents a different instance of a sound type or origin (a cough), a similar signature representing this particular sound type is observable in each of the images.

FIG. 11 also illustrates the same seven images with the signature for a cough being identified 1146, 1150, 1154, 1158, 1162, 1164. This particular signature also becomes apparent in the frame width of the image computed for the captured audible signal. The frame width of FIG. 11 is set to 100 ms. Alternatively, any other suitable frame width could be utilised.

It will also be understood however that variabilities/inconsistencies in the characteristics/signatures observed for the same sound type. Images may therefore be used to determine both the characteristic signature and the variabilities in the signature under differing background conditions using supervised machine learning algorithms like artificial neural networks, support vector machines, logistic regression or other suitable methods to accurately recognise different sound types, and different varieties of the same sound type. FIG. 11 illustrates the components of cough sound signature 1168 in an image 1112 in more detail.

It will be appreciated that, upon generation of an image similar to the seven exemplary images 1104, the inference logic/model identifies the cough signature to facilitate real time sound recognition. It will be appreciated that the classification model used is a machine learning model that has been trained to recognise the particular audio signature in the images representative of a cough. Optionally the method of developing sound recognition algorithms/machine learning models for multiple monitoring applications includes collecting a plurality of sound samples for each of the sound types of potential interest (such as a cough), computing multiple images using the procedure as described in FIG. 9 (or any other suitable mechanism) for each of the sound types relating to the applications/sound types of interest. Optionally the training data audio files are obtained in both quiet and noisy background conditions to allow the training sound recognition algorithms to recognise particular audio signatures in different environments. That is to say that images generated from data files in different audio environments are input into the machine learning algorithms so as to ascertain a characteristic sound signature for each of the sound types is obtained in each of the conditions and also to ensure any time variability in the sound is also captured in the signature for each of the sound types.

Figure 12:
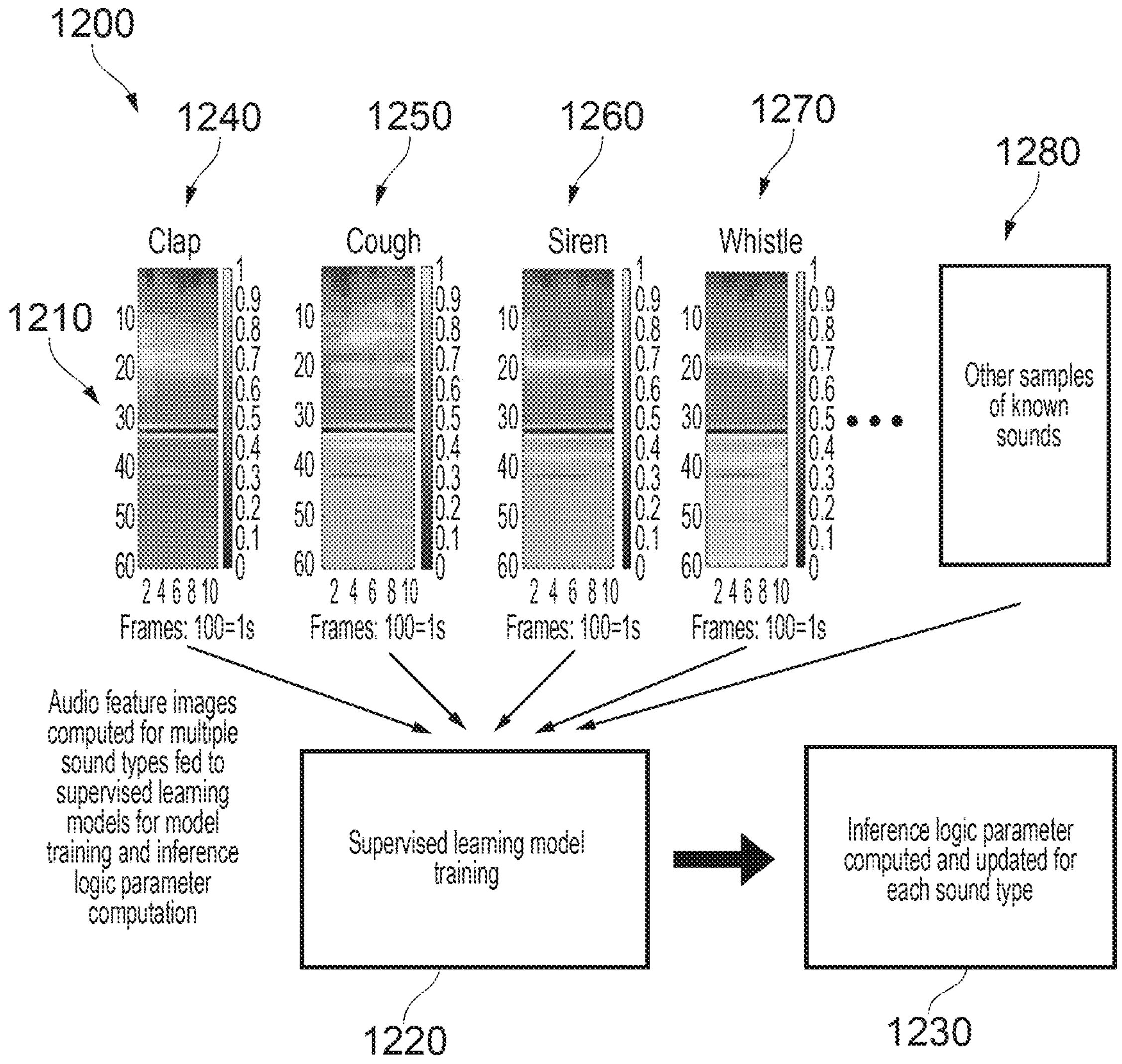
FIG. 12 illustrates examples of audio feature image data for multiple sound types in use in the audio monitoring system according to the described embodiments.

FIG. 12 illustrates a variety of examples of images constructed for multiple sound types 1200. It will be appreciated that the images are generated by any of the sound/signal recognition modules described in FIG. 2, 3, 4, 5, 6, 7, 8, 9 or 10. FIG. 12 illustrates four images 1210 generated in response to captured sounds, via an audio data file, of a person clapping 1240, coughing 1250, the sound of a siren from an emergency vehicle 1260 and the sound of a person whistling 1270. It will be appreciated that images may be generated for a wide variety of other known sounds 1280. It will be understood that each of the images are captured using a wireless audio sensor, for example the sensor of FIGS. 2, 3, 4, 5, 6, 7, 8 and 9. It will be appreciated that, in the first instance of capture, the audio files are captured under known conditions. As a recognition model develops, the sounds may be captured under a variety of unknown conditions.

Following audio capture, each respective audio data file is transmitted to a sound/signal recognition module where the audio files are then processed using audible sound detection models to detect the presence of the sound signal. It will be appreciated that the sound/signal recognition module of FIG. 12 alongside an associated models or inference logic, are the same as described with respect to FIGS. 1, 2, 3, 4, 5, 6, 7, 8, 9 and 10. The detected sounds are then further processed to generate the feature images 1240, 1250, 1260, 1270, each image having with a set time window of 100 ms in the example. Optionally any other suitable time period can be utilised.

As illustrated in FIG. 12 each sound type has a distinct characteristic 'image' signature within the respective image. It will be appreciated that subtle variabilities resulting from variabilities in the sound characteristics themselves and changes in the background noise conditions may vary further obtained signatures for further captured audio data of the same sound type. The images are then computed/processed repeatedly for the same sound type under varying background conditions to get a sufficient volume of feature images for each sound class/type to ensure robust recognition of the sound type using supervised learning algorithms 1220. It will be appreciated that both multi-class supervised learning models can be used to classify multiple sound types using a single algorithm, or multiple single class binary classification algorithms may be used. Alternatively, any other suitable types of machine learning models may be utilised. Training parameters derived from the supervised learning models are then used to build an inference logic 1230 that compares the signatures of incoming sound signals with those 'learnt' or 'known' from the training models. Optionally the sounds used for training the models are further processed to include artificial noise, which may be achieved by layering audio signals on a captured audio file and the like, for example those resulting from signals that are irrelevant to the signal being captured. The addition of such synthetic noise allows for more robust model parameter training and sound recognition under real world test conditions. It is also to be noted that whilst FIG. 12 shows the image signatures for a few common sound types, the same approach may be used to classify other non-speech sound types as well, enabling robust recognition of multiple sound types using a single audio monitoring system. Optionally, the system may be utilised for speech and/or verbal sound types.

Images, such as those illustrated in FIG. 12, may also be used to recognise the signatures of multiple sound types by training a multi-class supervised machine learning model or multiple single class binary classifier models using 'known' or 'labelled' sounds of each of the sound types as input under different background noise conditions. This is to enhance the robustness of sound recognition under real world conditions. Such background noise conditions may be synthetic sound signals computed by artificially producing noise from known noise sources like those resulting from electronic components, for example white noise/flicker noise, sound of background noise scenes such a person or many people talking amongst others, and the like.

Figure 13:
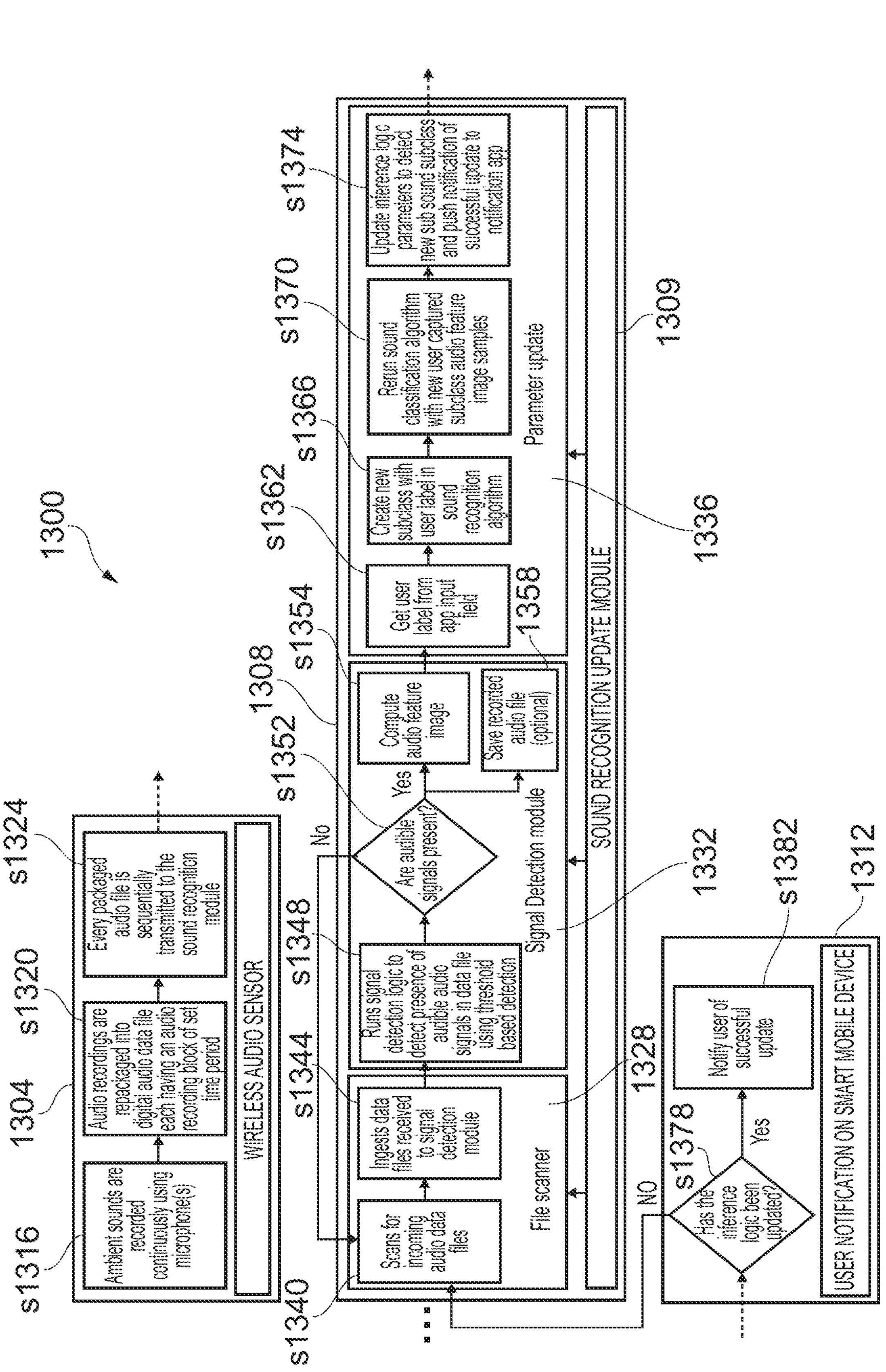
FIG. 13 illustrates the operational steps of the audio monitoring system according to the described embodiments when operating in a learning mode.

FIG. 13 illustrates the operational steps of an audio monitoring system according to the described embodiments when operating in a learning mode 1300. It will be understood that the audio monitoring system of FIG. 13 is substantially the same as the systems described in relation to FIGS. 1, 2, 3, 4, 5, 6, 7, 8, 9. 10, 11 and 12. The system includes at least one wireless audio sensor 1304, a sound/signal recognition module 1308 and a notification application 1312. It will be understood that these system components are similar to those described previously with reference to FIGS. 1, 2, 3, 4, 5, 6, 7, 8, 9. 10, 11 and 12.

It will be appreciated that, as illustrated in FIG. 13, the system can be configured in a learning mode that enables the user to teach new sound types to the system which has not previously been specifically trained to detect. Training the system based on images allows for supervised learning models to effectively detect non-speech sounds accurately and using smaller number of training samples when compared with conventional methods. This is due to sound characteristics/signatures being better captured/represented using feature images when compared with audio-based analysis. Using a feature image based system allows for an effective and fast learning approach where a user can teach new (not currently known) sounds to the system with a limited number of 'sample' sounds without needing the user to supply the system with hundreds of training data sets to learn the new sound type. This functionality can be achieved via the method illustrated in FIG. 13 where the system operates in a learning mode. It will be appreciated that the system can be switched to the learning mode through the notification application which optionally resides on the smart device, or other computational device. Switching the system into learning mode via the app proceeds to executes one or more programs to undertake the following steps.

At a first step s1316 ambient sounds are captured, and recorded, by the wireless audio sensor 1304. At a next step s1320, at the wireless audio sensor, the audio recordings are packed into digital audio data each having an audio recording block of a set time period. At a next step s1324, at the wireless audio sensor, each package of audio file is sequentially transmitted to the sound/signal recognition module.

The sound/signal recognition module includes the subcomponents of a file scanner 1328, a signal detection module 1332 and a parameter update module 1336. At a next step s1340, at the file scanner, the sound/signal recognition module scans for incoming audio data files from any of the wireless sensors. At a next step s1344, at the file scanner, the sound/signal recognition module ingests data files received by the signal detection module of the sound recognition module. At a next step s1348, at the signal detection module, the sound recognition module runs signal detection logic to detect a presence of any audible audio signals in the data file, optionally using threshold based detection. At a next step s1352, the signal detection module determines if any audio signals are present in the data file. If no signals are present, the sound recognition module reverts back to scanning for incoming audio files via the file scanner s1340. If audio signals are determined to be present, the signal detection module generates feature image data based on the audio data files s1354 and optionally saves any recorded audio files containing audio signals s1358.

At the parameter update module of the sound recognition module, responsive to determining an audio signal is present in the audio data file, the system obtains a user provided label for an unknown (not previously defined) sound type present in the audio data file s1362. It will be appreciated that the label is a label for the knew sound type, for example person coughing. It will be appreciated that the label is provided to the system via the notification application by the user. At a next step, at the parameter update module, the system creates a new subclass of sound types with the user label. The subclass is created in the sound recognition algorithm that recognises signatures of particular sound types in audio feature images such that, once trained, the algorithm is able to determine a signature of the sound type with the new label. That is to say that the algorithm, once trained, is able to recognise the new sound type defined by the new label.

At a next step s1370, at the parameter update module, the system reruns the sound classification algorithm including the new user captured subclass/label and generates audio feature image samples for the new sound type subclass/label. At a next step s1374, at the parameter update module, the system updates inference based logic parameters, detecting a signature of the audio feature image samples, to detect the new sound subclass and subsequently sends a notification, optionally a push notification, to indicate a successful update of the inference logic to the notification application.

At a next step s1378, at the notification application, the system determines that the inference logic has been updated. If not, the system reverts back to scanning for incoming audio data files at the file scanner or the sound recognition module s1340. If the system determines the inference logic has been updated, the notification application proceeds to notify a user of a successful update of the inference logic s1382.

Optionally, the system when operated in learning mode will request the user to 'teach' the system with a minimum number of sound samples to ensure robust classification of the sound type. This may be any number of samples depending on the type of sound being 'taught' by the user. Optionally, the system embeds subroutines to check for sufficient user training input automatically and request the user through the app if the data used for training is insufficient for accurate sound prediction.

Optionally, the audio capture system used to capture sounds that are used to teach the audio monitoring system could be the microphone(s) in the user's smart device on which the notification application is installed and operable.

Optionally, the smart device application may be set to run in the background, even when the user interface of the notification application is closed by the user, and/or in the foreground when the applications user interface is opened and in use by the user based on the notification settings selected by the user in the application.

It will be appreciated that the audio monitoring system as illustrated in FIG. 2, 3, 4, 5, 6, 7, 8, 9, 10, 11, 12 or 13 is configured to operate in personalised listening mode. That is to say that, in the listening mode, the system is configured to capture new ambient sound types that the sound recognition algorithms have not been trained to recognise. In listening mode, the system is configured to capture and feed sound signals to automatically train a new, user-defined model class instead of its normal operating mode. This stops the sound recognition module from classifying sounds captured and begins creating a data subset for learning the new sound class instead, the type of which is labelled by the user through the app interface. This labelled data class is then used for future sound classifications once sufficient training data is obtained for robust classification.

The system of the described embodiments including the time varying vectors computed from octave band filtering and MFCC techniques is particularly suited for non-speech sound identification. It has been found that the use of MFCC and the octave band vectors for the purpose of image computation provides an enhanced representation of signal characteristics than alternative frequency or time domain feature vectors. The use of MFCC and the octave bands have lesser impact from spurious/environmental noise. The use of features from two transformations provides redundancy in the feature image data, so similar sounding audio files may be robustly segregated with limited datasets. With the system of the described embodiments the feature image is generated with feature vectors extracted using different data transformation methods, including the Discrete Cosine transformations for the MFCC feature vector computation and band pass filtering method for the octave band energy vector computation.

Figure 14:
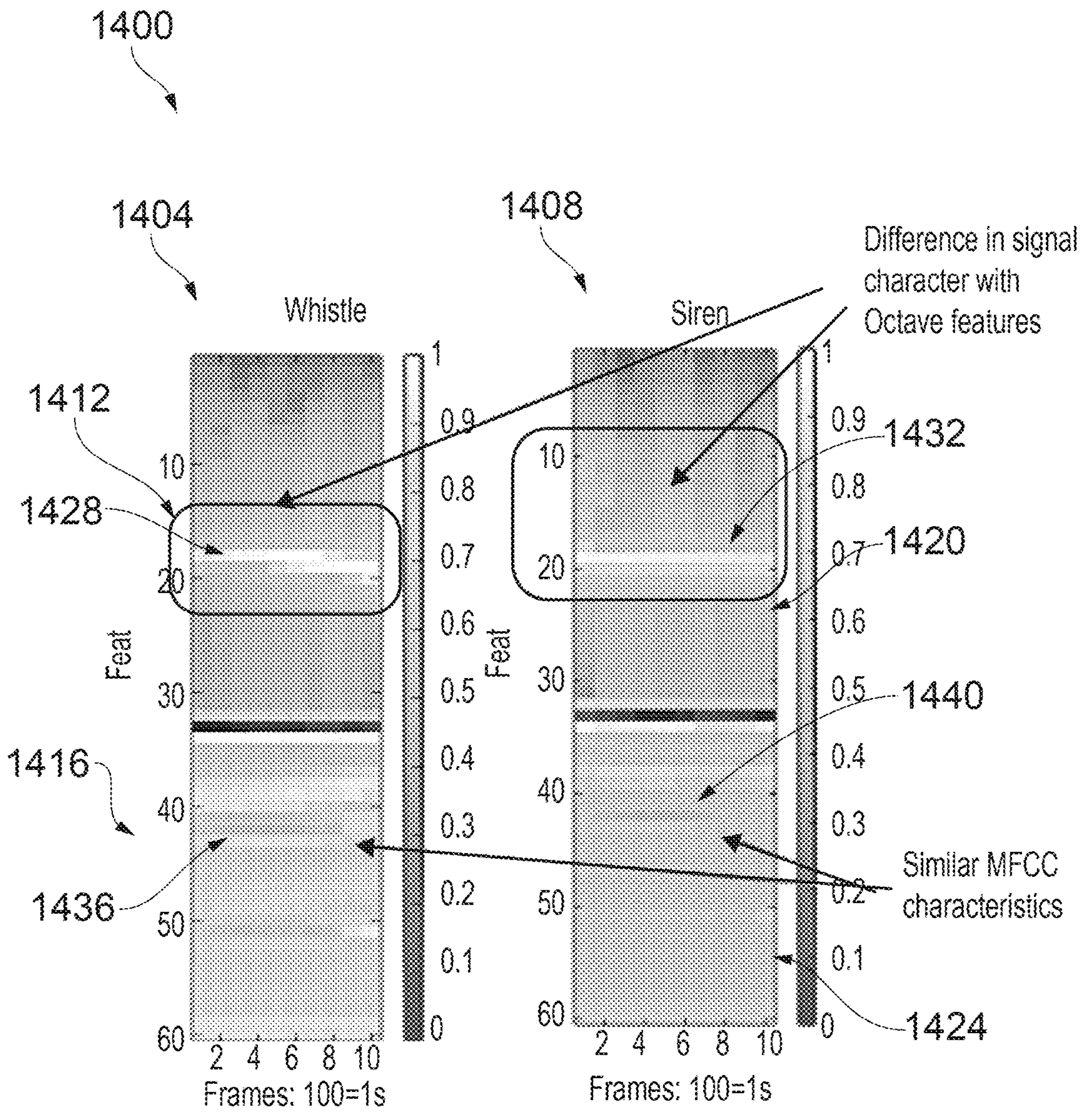
FIG. 14 illustrates a comparison between whistle feature image data and siren feature image data.

As an example with reference to FIG. 14 a test 1400 was run using two sounds that if listened to in isolation for 1 second may be considered to sound the same—the whistle 1404 and the sound of a Siren 1408. Features 1 to 32 in the image are computed from octave band energies 1412, 1420 whilst the remaining are computed from MFCC 1416, 1424. While the MFCC features 1436, 1440 appear to be similar, the octave features 1428, 1432 appear sufficiently different for the machine learning models to create a robust prediction. The opposite may be true in other instances. This usage of both transforms results in superior classification capability.

The system of the described embodiments provides information about dynamic changes in the feature values and signal characteristics through time within each of the captured audible signal frames making the recognition algorithms more accurate. This reduces the need for training data.

The system of the described embodiments creates the feature image by combining octave bands with MFCC into a feature image for faster and more robust non-speech signal classification.

Figure 15A:
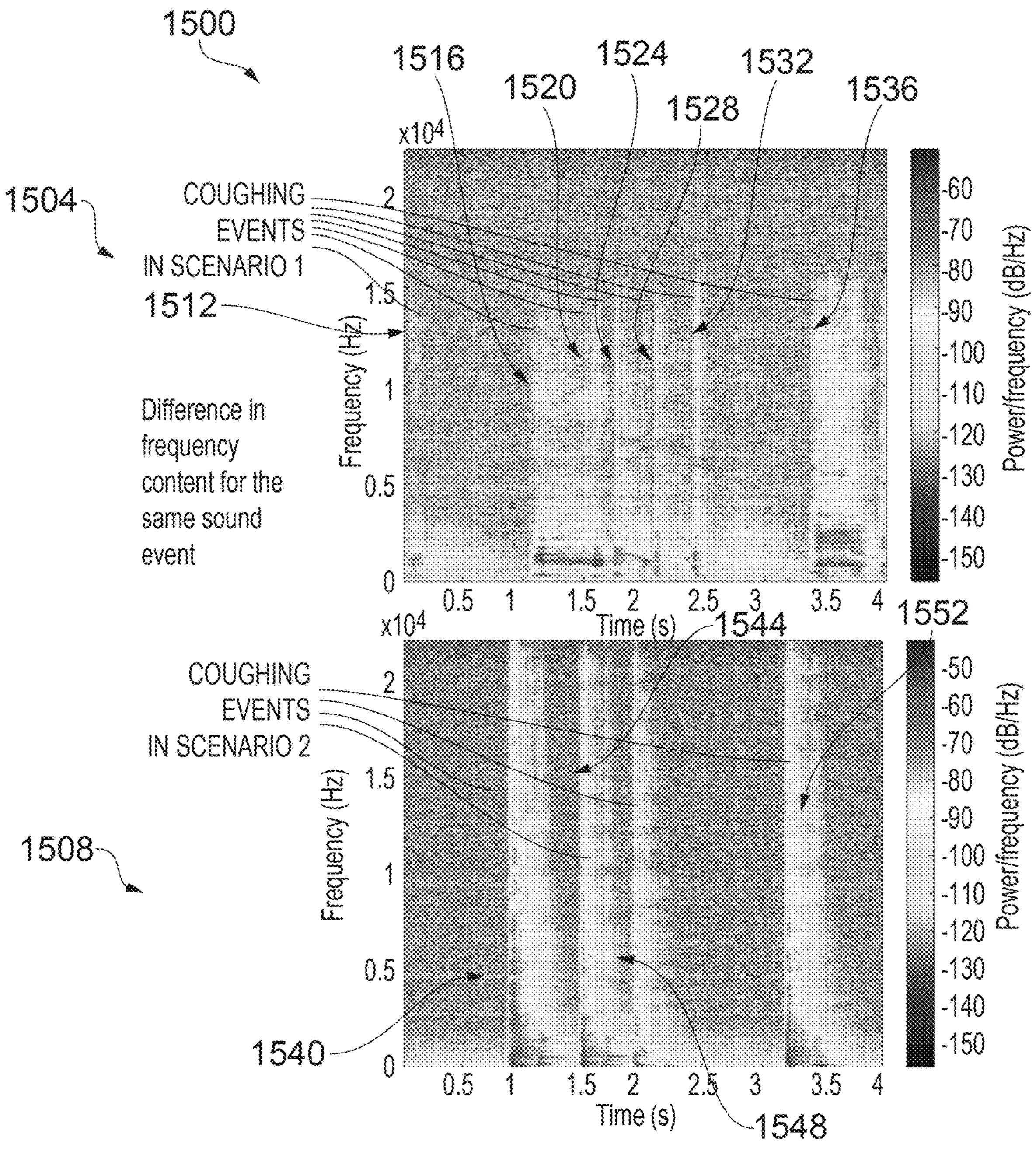
FIG. 15*a* illustrates a frequency spectrogram computation for two coughing sounds.
Figure 15B:
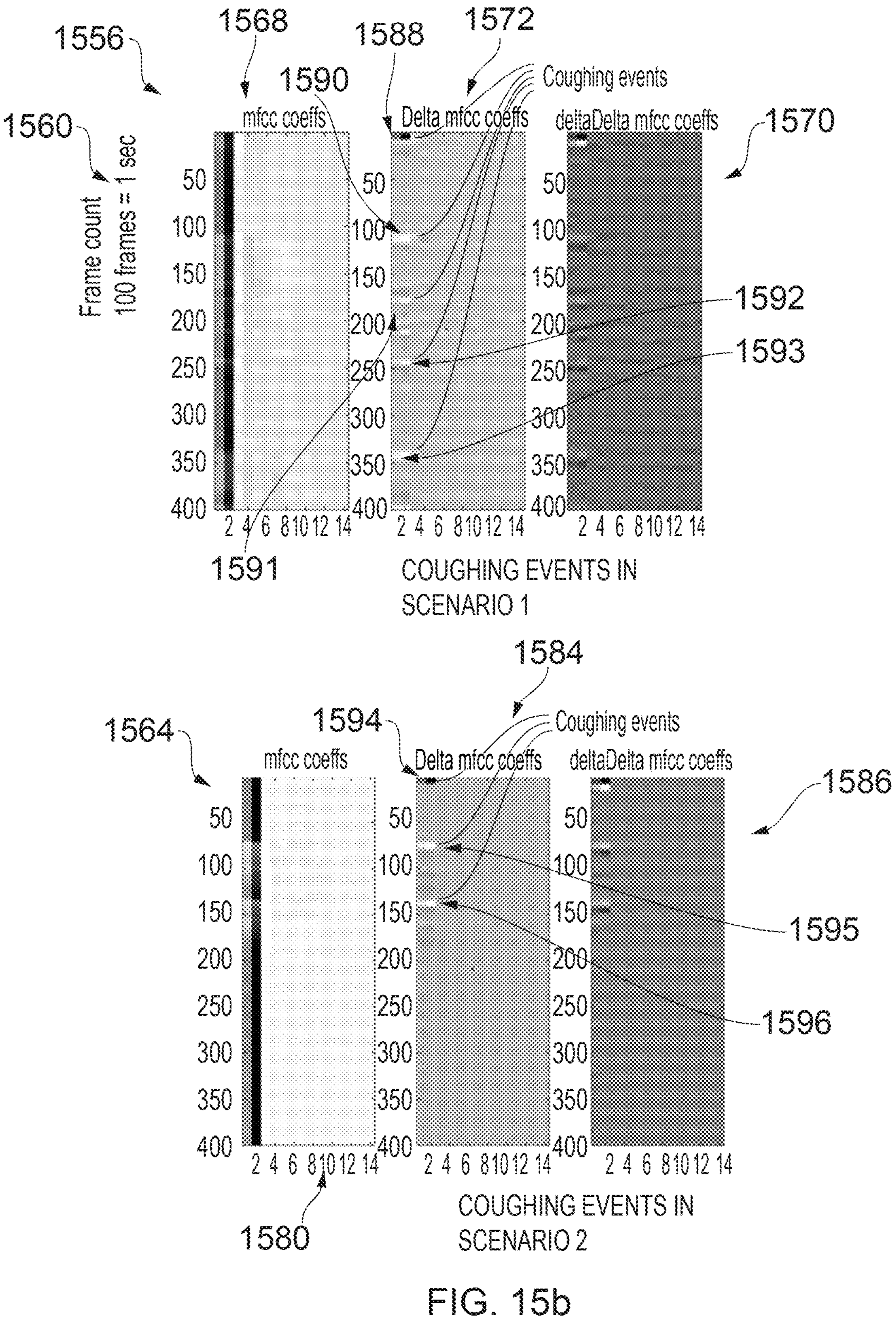
FIG. 15*b* illustrates audio feature image data computed from MFCC feature sets for the coughing sounds of FIG. 15*a;*

FIGS. 15*a* and 15*b* illustrate another example to further explain the advantage of combining MFCC with band energy vectors for robust recognition. In the example in FIG. 15*a* a Fast Fourier Transform (FFT) was run on raw time domain audio data captured for two similar coughing sounds 1500 and produce two frequency domain spectrogram plots 1504, 1508, showing amplitude across the frequency range as a function of time. Comparing the two graphs, it is clear that for similar coughing sounds, the frequency content 1512, 1516, 1520, 1524, 1528, 1532, 1536, 1540, 1544, 1548, 1552 is significantly different. Firstly, the frequency content especially above 500 Hz appears significantly different at the times of coughing. Secondly, if this data was used in isolation, this may result in inaccurate predictions. This may mandate the need for more training data to better understand the signal variabilities. Looking at the MFCC 1556, 1560, 1568, 1572, 1576, 1580, 1584, 1586 feature vectors 1588, 1590, 1591, 1592, 1593 1594, 1595, 1596 on the other hand in FIG. 15*b*, it is possible to identify a more similar output for the two events 1560, 1564. Thus using MFCC vectors alone in this instance may result in a better prediction with lesser training data required. Whilst this is the case in this specific scenario, the converse may apply in others circumstances.

Figure 16:
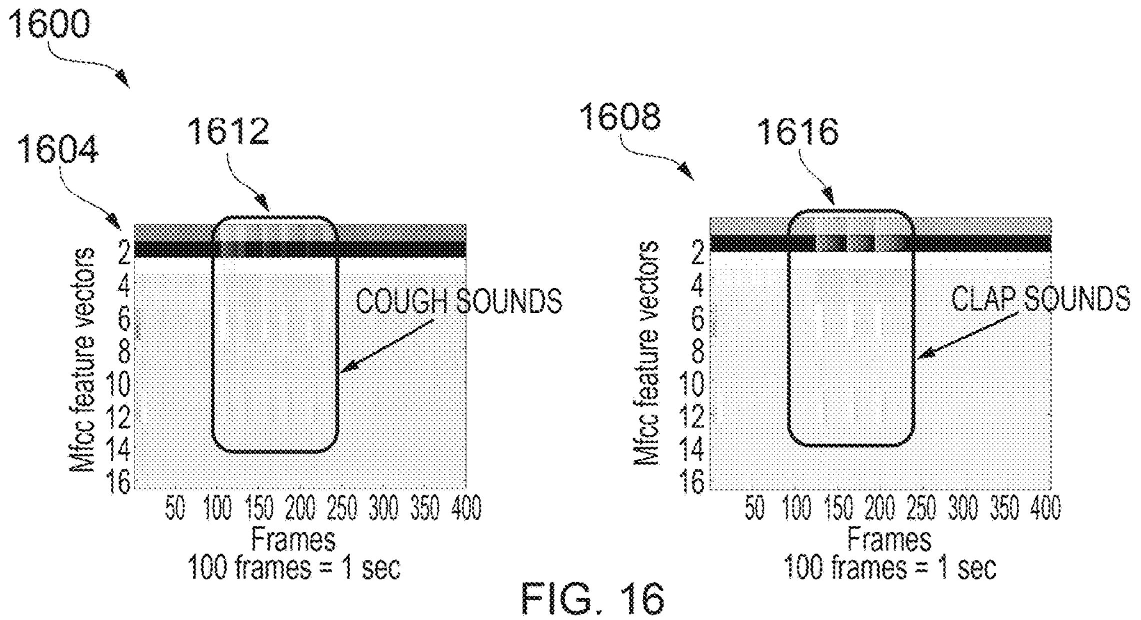
FIG. 16 illustrates audio feature image data computed with MFCC feature vectors for a cough sound and for a clap sound.
Figure 17:
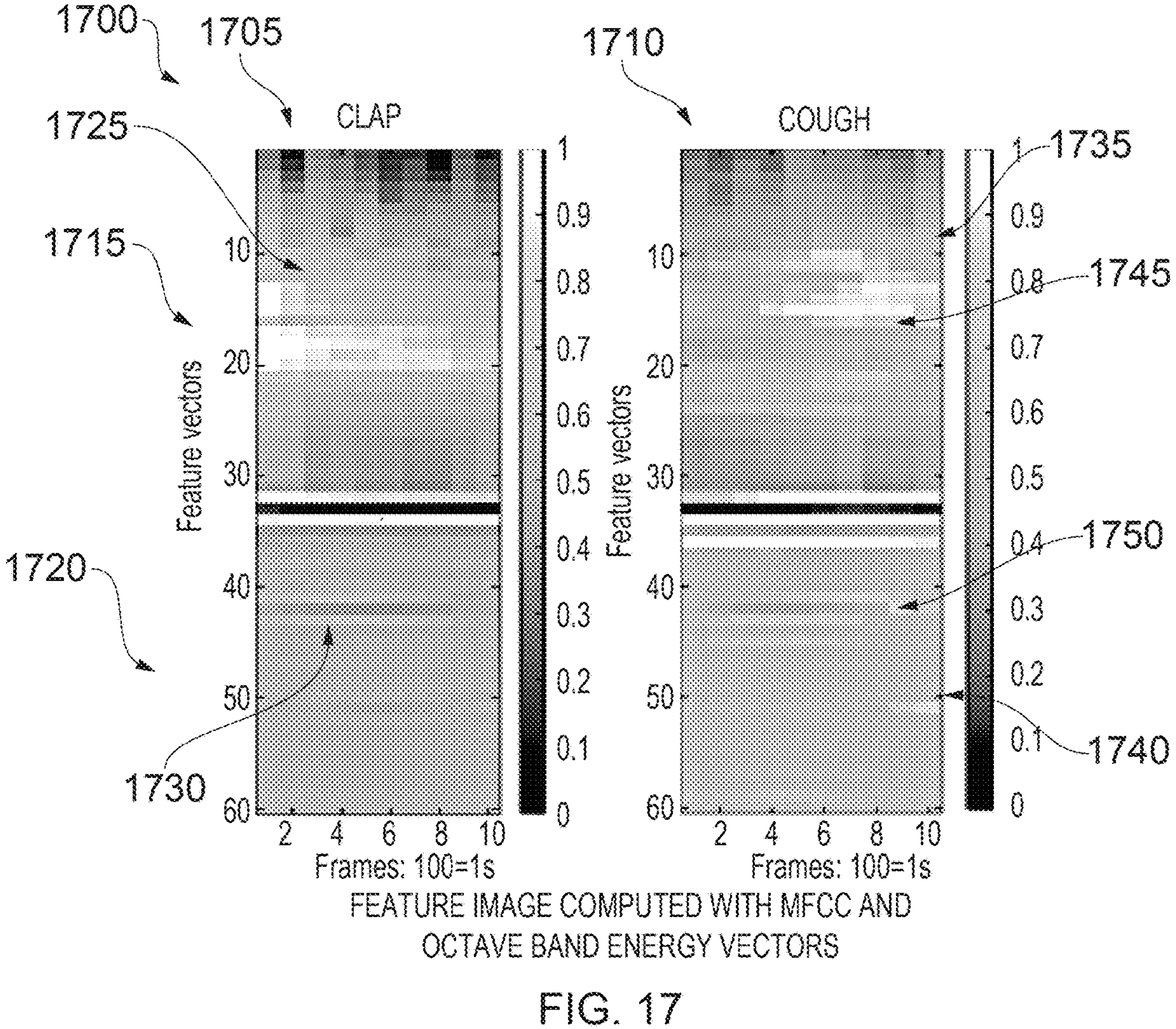
FIG. 17 illustrates audio feature image data computed for a cough sound and for a clap sound using MFCC and octave band energy feature vectors.

In FIG. 16 an example 1600 is illustrated with coughing sounds 1604, 1705 and clapping sounds 1608, 1710. If MFCC vectors were only used, the images appear similar which would make it difficult for supervised learning models to robustly differentiate the events 1612, 1616 with the MFCC data only. By combining 1700 octave energy 1715, 1735 feature vectors 1725, 1745 with the MFCC 1720, 1740 feature vectorss 1730, 1750, this would provide sufficient information to start training a supervised learning model as illustrated in FIG. 17. By using both of these transformations applied on the data, this would provide redundancy in the feature image to achieve robust classification with lesser training sets being required.

Figure 18:
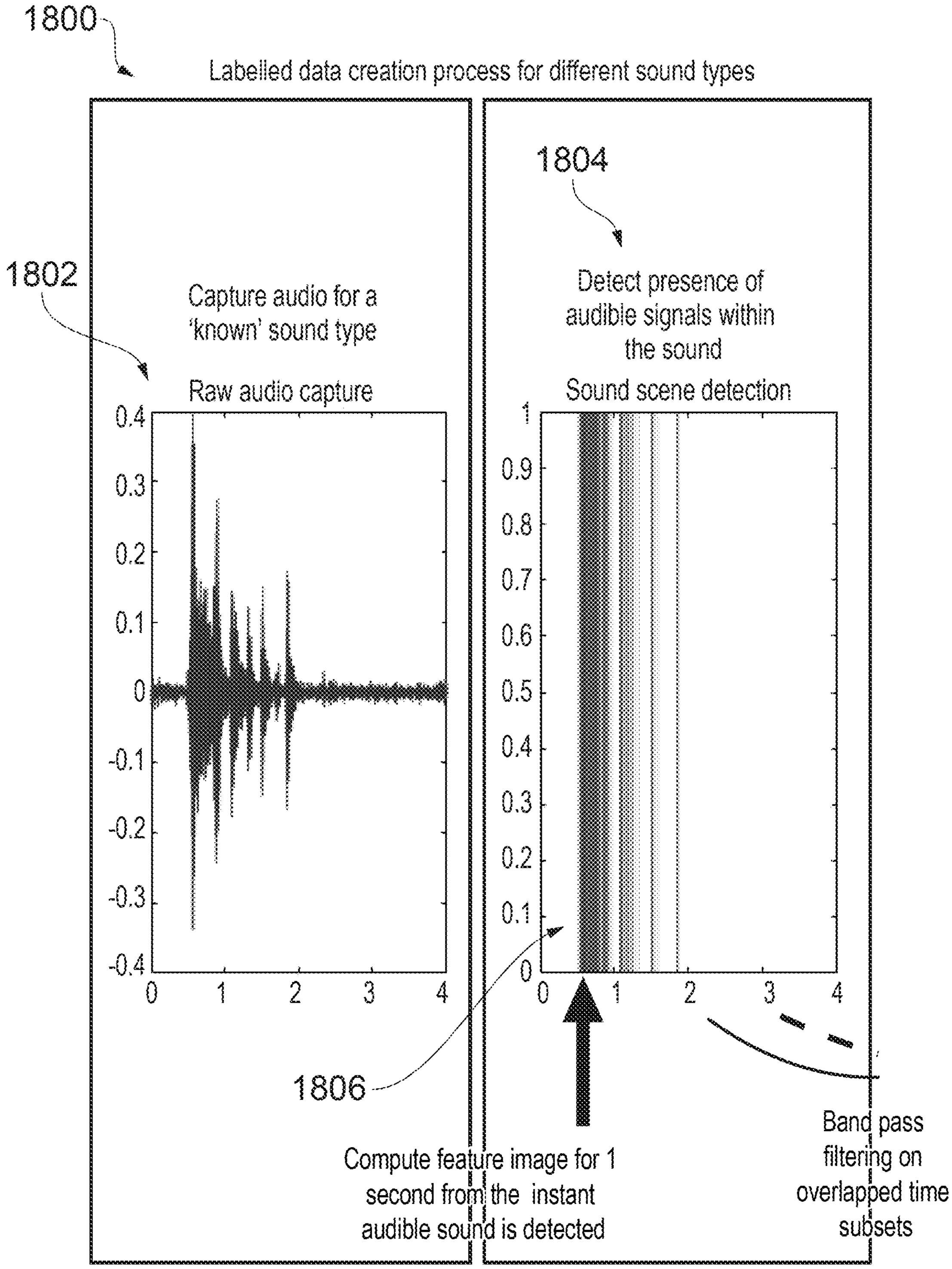
FIG. 18 illustrates creation of labeled data for known sound types to train a signal recognition module of the audio monitoring system according to the described embodiments.
Figure 18:
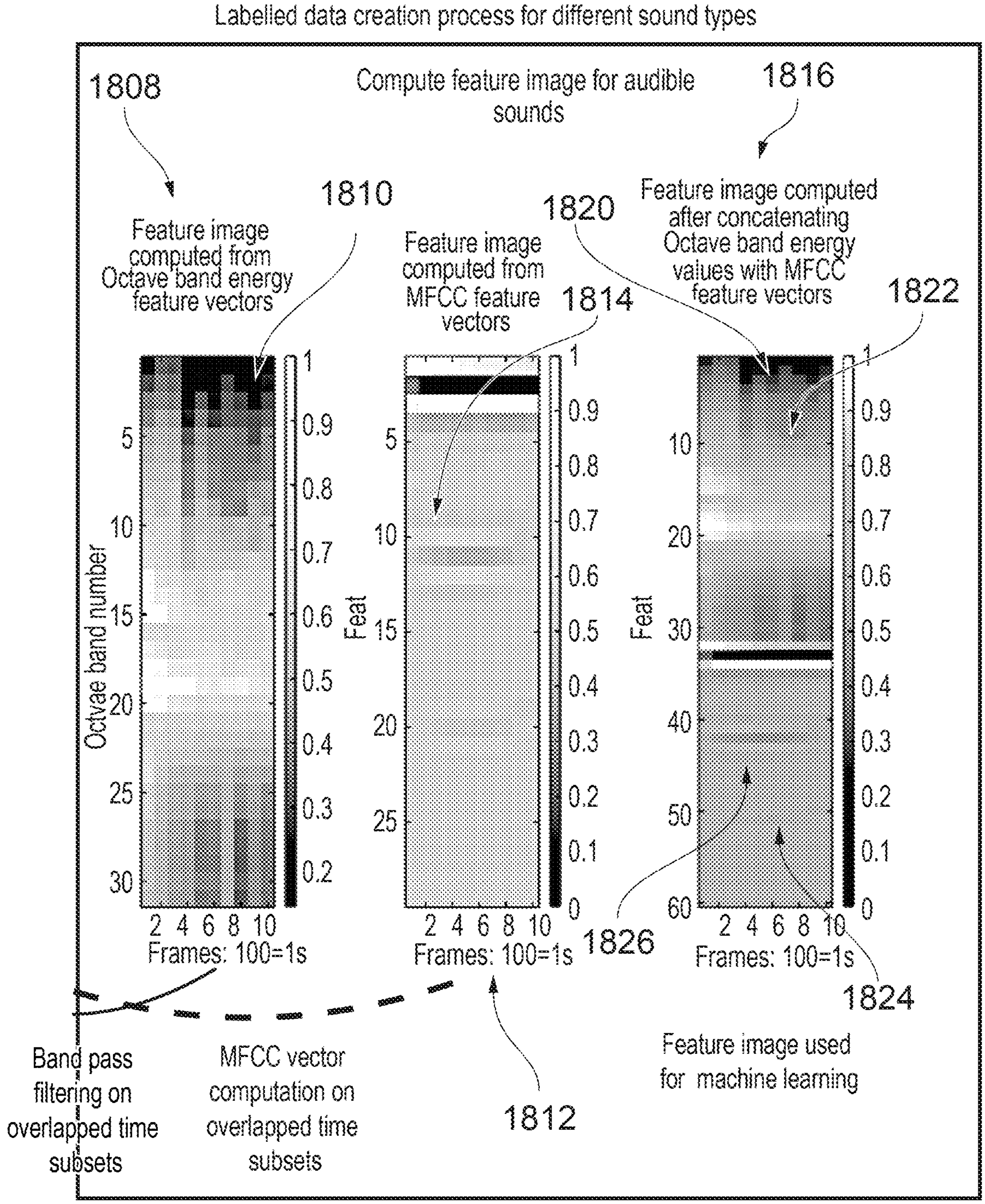
Figure 18:
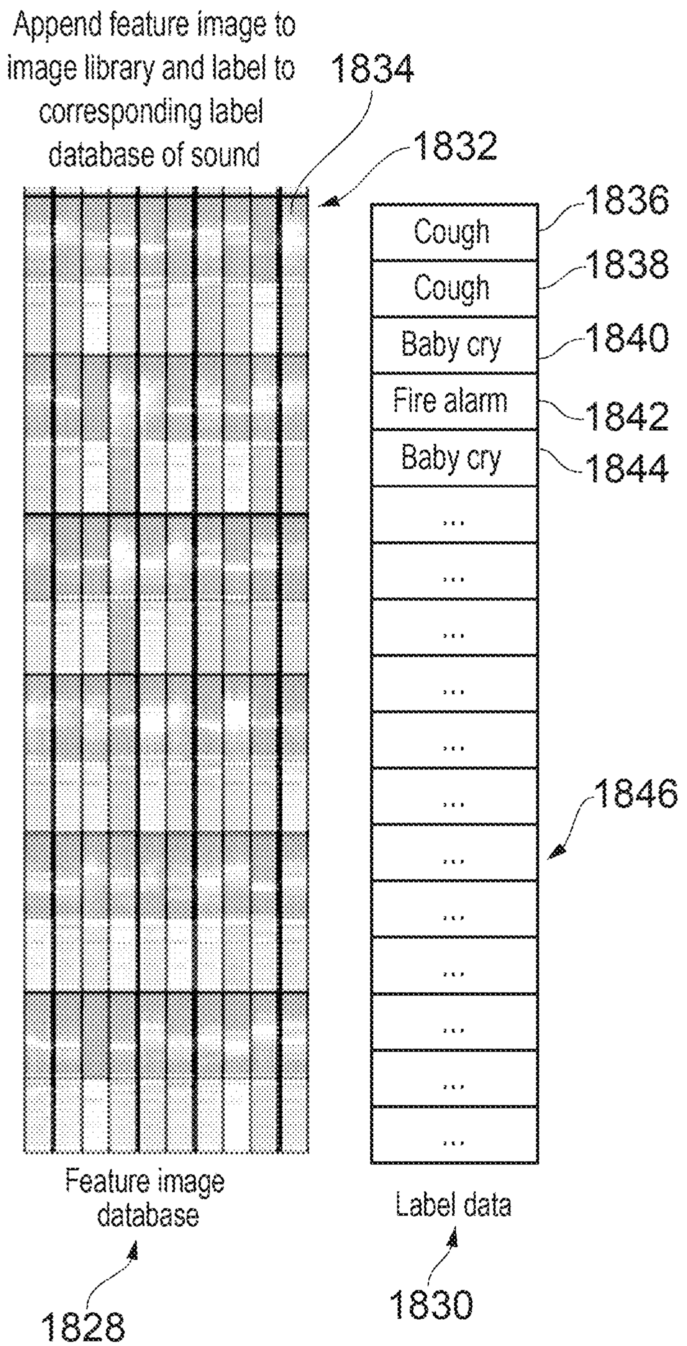

FIG. 18 illustrates further detail on how the system of the described embodiments generates the image data 1800. In particular FIG. 18 represents the process for creation of labelled data for the purposes of training the machine learning model. The first step in the process is to capture the sounds to train the algorithm 1802. This may be achieved using the wireless audio sensors, as described earlier. The audio data is then passed through a sound detection algorithm to detect the presence of any audio signals 1804. The sound detection algorithm may be implemented using direct thresholding methods which check if the audio signal amplitudes in the received audio data file exceed a predefined threshold. Alternatively, these methods may also include additional pre-processing on the audio data to help better isolate signals from noise. This is achieved by normalising the data using a normalisation procedure, such as Z-score normalization, to rescale the audio data within the received data file. A moving variance of the normalised sound file is then computed. The system determines if there is any signal within the audio data file transmitted where the amplitude of the moving variance in the captured audio data exceeds a certain threshold. The method of the described embodiments ensures that a normalised signal is used for identifying the presence of signal as opposed to absolute data values that may be more impacted by noise.

If an audible signal is detected, the audio feature image computation algorithm is executed when the audible signal is identified. The feature image is computed for data captured for a defined time period, such as 1 sec in the example of FIG. 18. The feature image is computed by windowing the data and computing time varying vectors of the $1/3^{rd}$ octave band energy 1808, 1820 and MFCC 1812, 1824 features 1810, 1814, 1820, 1826 for overlapped windows 1816 throughout the 1 sec duration. These are then concatenated into a single matrix that contains the vector values of both octave band energies and the MFCC, its Delta and Delta-Delta feature vectors throughout the 1 sec duration. This is represented as the image data when graphically plotted with feature values along the vertical axis and time along the horizontal axis. An image thus computed is shown in FIG. 18 for the sound of a cough. The computed image 1834 is then appended to a database 1828 of images 1832 along with a corresponding label 1836, 1838, 1849, 1842, 1844, 1846 for the sound in line with the labelling schema used for model training.

Figure 19:
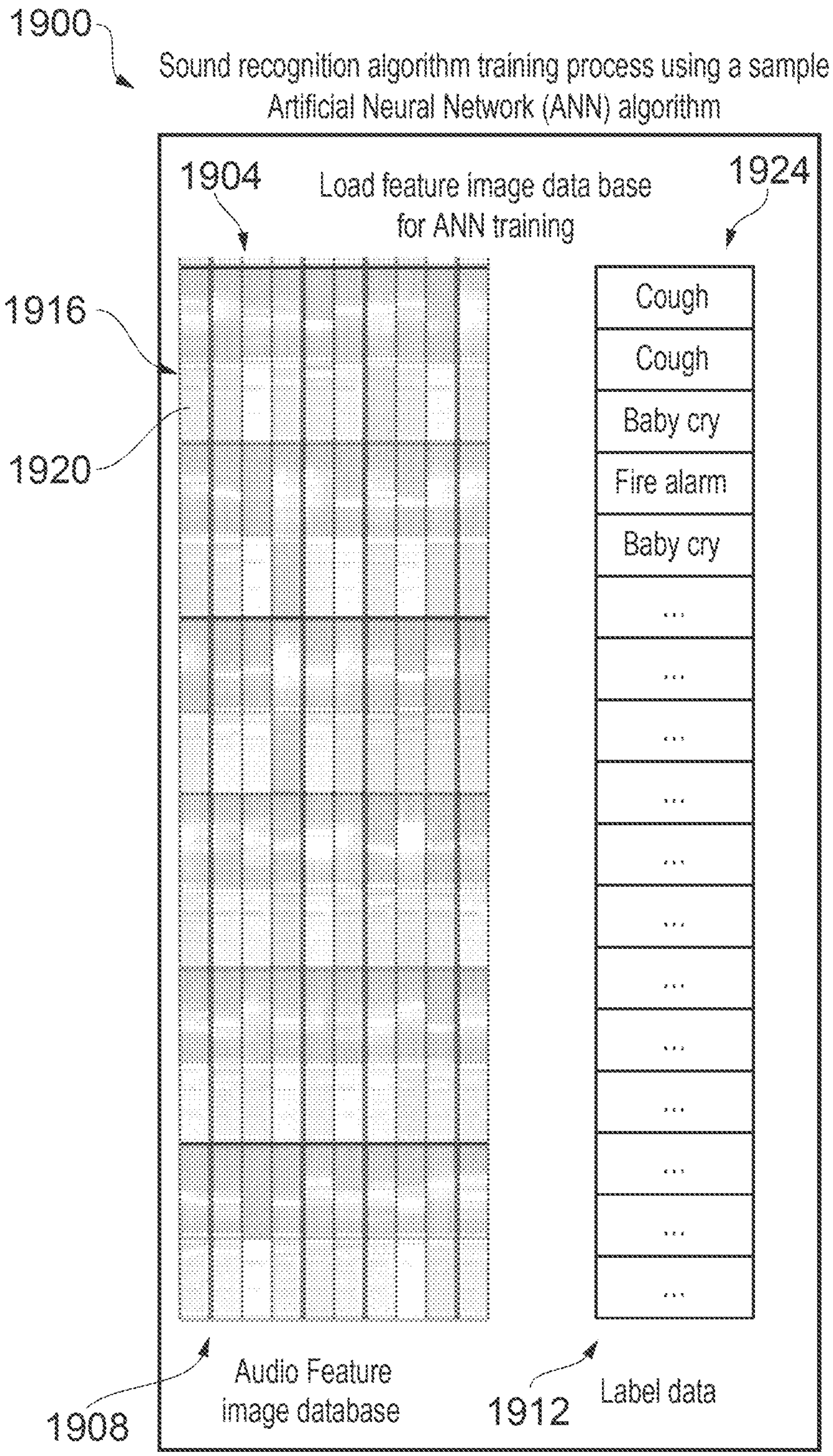
FIG. 19 illustrates training of an inference model.
Figure 19:
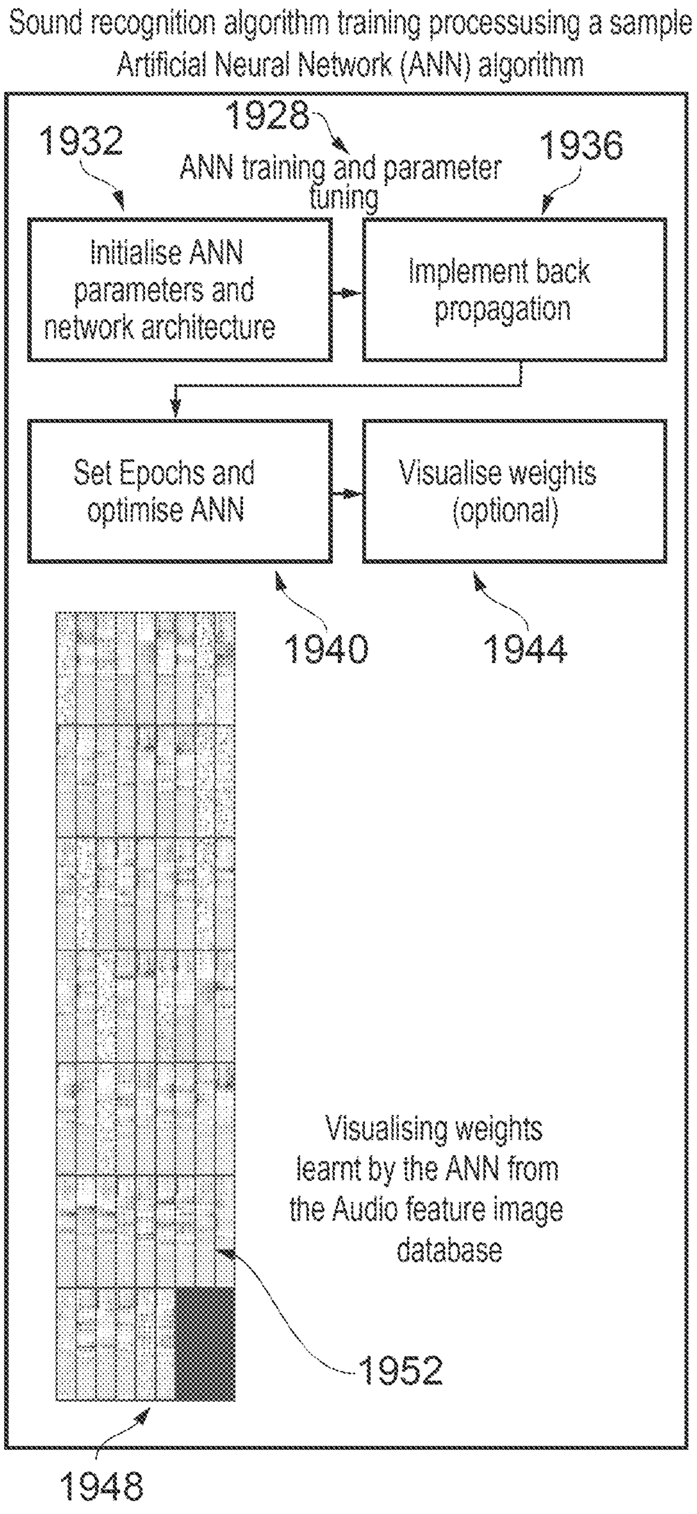
Figure 19:
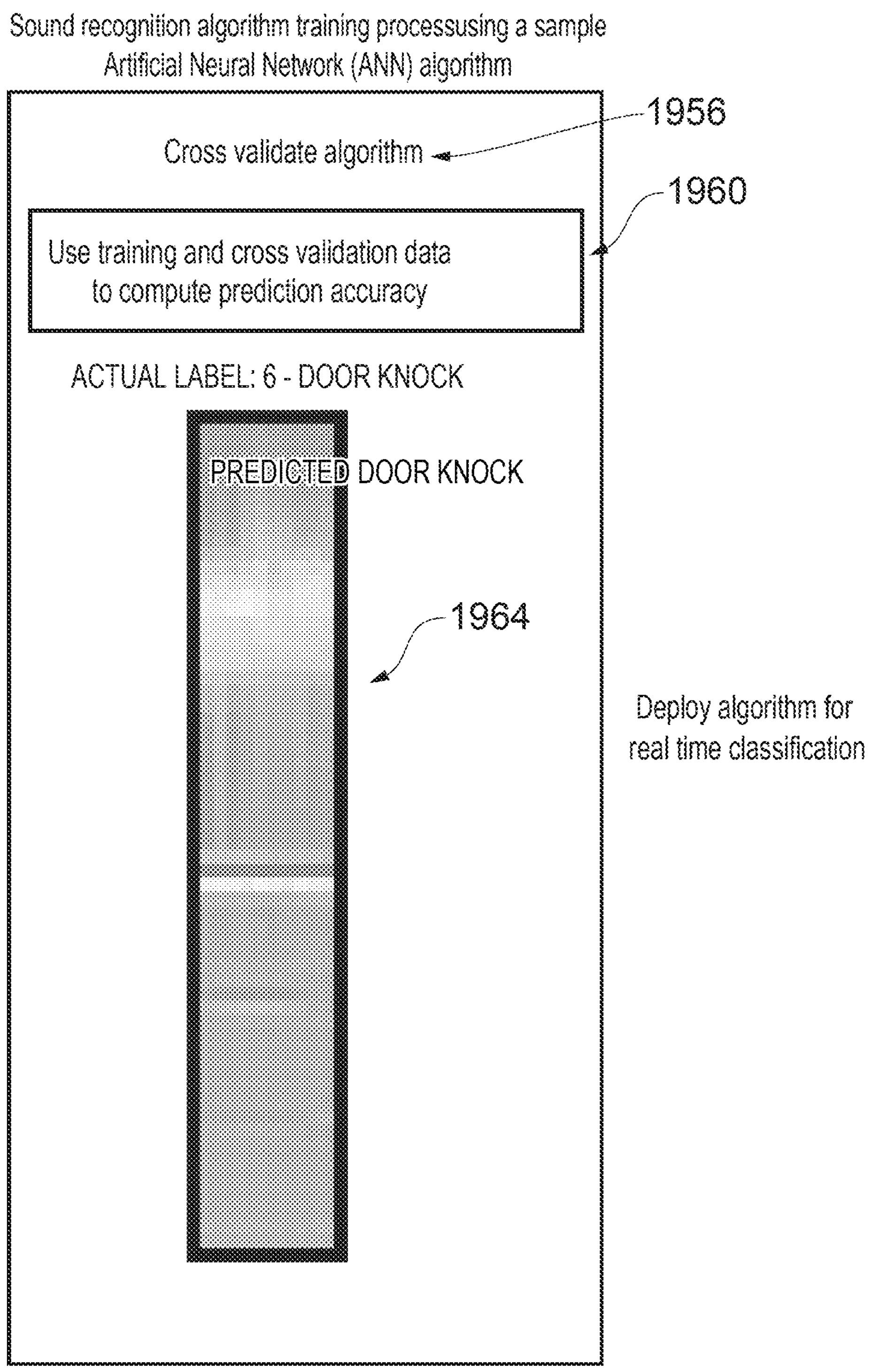
Figure 20:
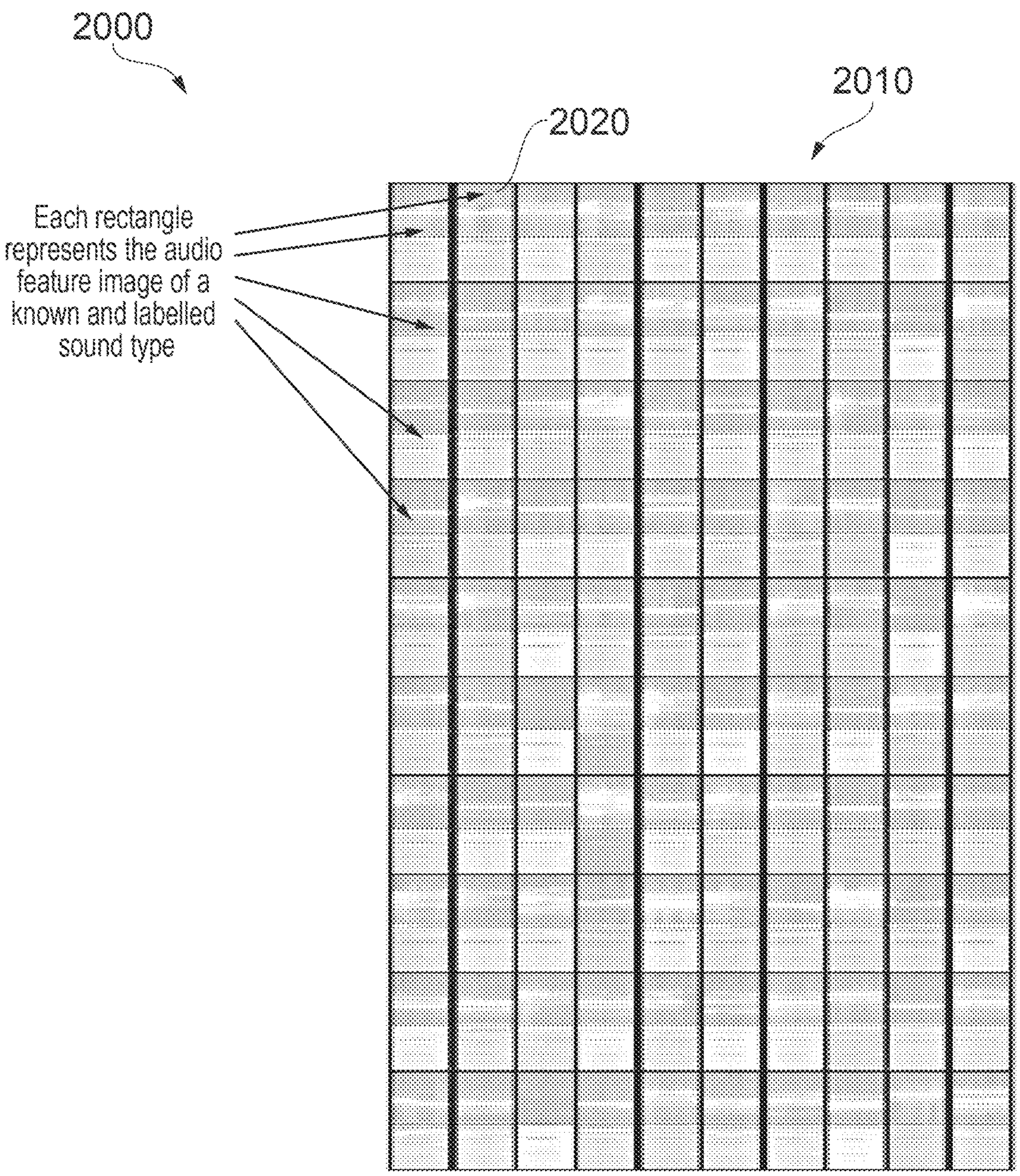
FIG. 20 illustrates an audio feature image database.
Figure 21:
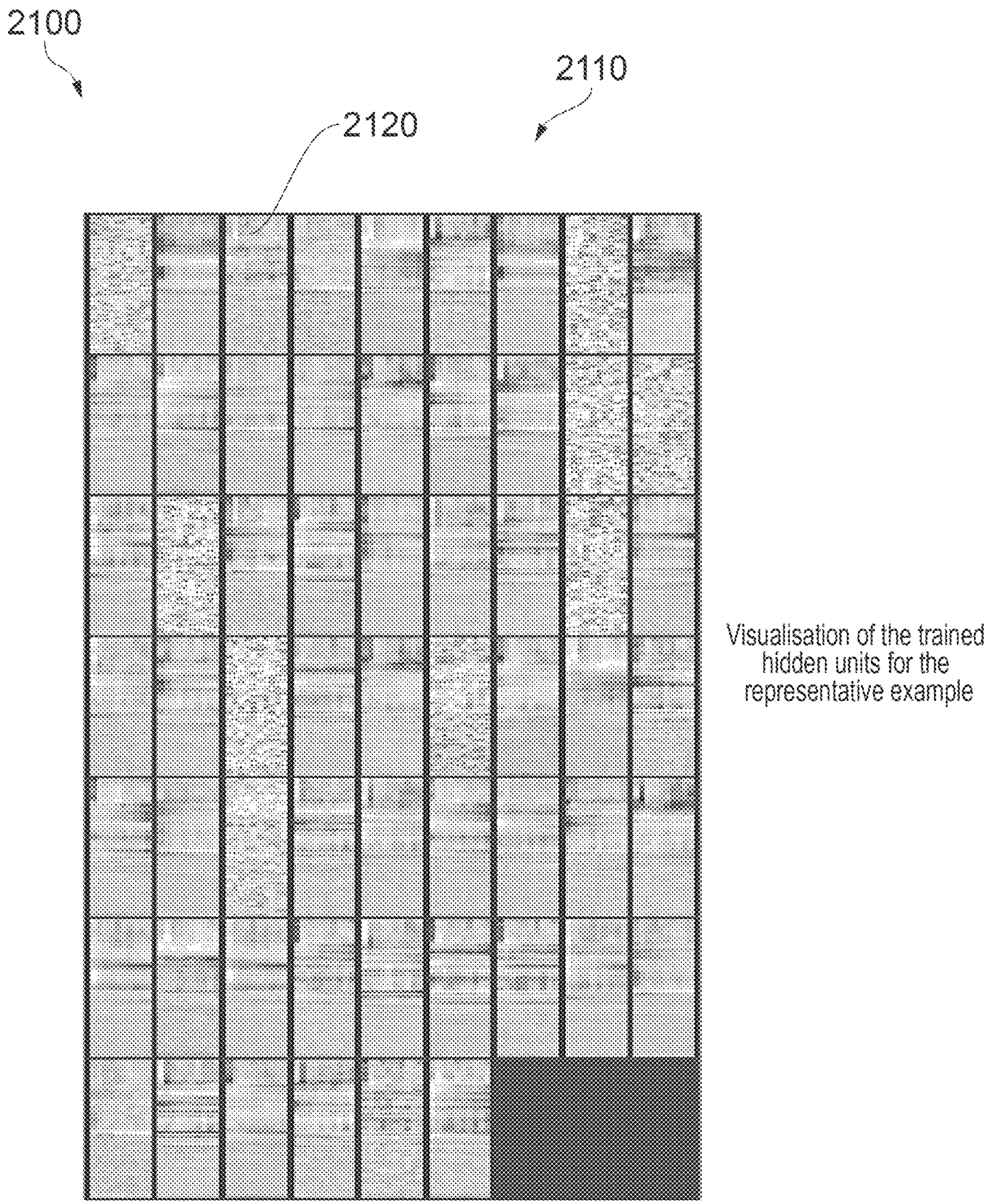
FIG. 21 illustrates visualisation of hidden units for sound classes using audio feature image data as input.

With reference to FIGS. 19 to 21, the following provides further detail on how the inference logic recognises the pattern signatures in the image data.

FIG. 19 illustrates the process of training the inference logic 1900. In this case the inference logic is provided in the form of an Artificial Neural Network (ANN). The image database 1908, a representative example of which is illustrated in FIG. 20, contains feature images 1920 that correspond to known sounds. The image database is initially used as the training data for the neural network along with their corresponding labels. Each rectangle 1916 in FIG. 20 corresponds to an image computed using the method described above for a 1 sec time frame from when the sound was detected by the audio monitoring system. This database 1908 of feature images is then fed along with their corresponding labels 1924 to a supervised machine learning model to ascertain the image pattern fingerprint and the variabilities in the fingerprints for each of the labelled sound classes 1904. This may be achieved using any suitable multi-class supervised machine learning algorithm or by training independent single class algorithms for each of the labelled sound types. Some examples of supervised learning models that may be used for this purpose include but are not limited to logistic regression, Support Vector Machines, Neural Networks, decision tree based classification algorithms amongst several others. FIG. 19 illustrates the use of an Artificial Neural Network (ANN) that facilitates multi-class classification based on the database of images and their corresponding labels.

The ANN algorithm is trained by first initiating the model parameters along with an assumed network architecture which in this case happens to be a single hidden layer neural network 1932. It is to be noted that deeper neural networks that have more complex architectures including multiple hidden layers may also be employed for more complex sound types if so desired. Back propagation is then implemented to train the neural network by minimising the cost function using optimisation algorithms 1936. These could include algorithms like stochastic gradient descent or similar methods. The epochs are set and the ANN is optimised 1940. The weights may then be visualised 1944. This will help train the neural network and optimise the representations captured by the hidden layer that understands the image features that differentiate the different classes. FIG. 21 2100 and FIG. 19 illustrate the representations 1948, 2110 captured by the hidden layer in the single layer neural network trained in the example. The set 1948 in FIG. 19 includes a plurality of weights 1952. The set 2110 in FIG. 21 includes a plurality of weights 2120.

The learnt parameters are then used to understand the decision boundaries. The decision boundary is the boundary within the feature image that signifies the pattern and any variabilities in the pattern that correlate closest to each of the sound types. These parameters are then used in an inference logic to classify unforeseen feature images by comparing the similarity in the patterns learnt with new feature images that are introduced to the model through probabilistic classifiers 1956. The accuracy of the inference logic may be tested 1960 with unseen data both from the labelled dataset 1964 by splitting the labelled data into training and cross-validation datasets and with previously unforeseen data.

FIG. 20 illustrates an aspect 2000 of the described embodiments where the audio feature image database 2010 comprises one hundred samples created for known or labelled sounds. Each rectangle 2020 in the image corresponds to the feature image of a specific labelled sound type computed using the method of the described embodiments.

To update the inference logic with new sound types when the system is in learning mode, a similar sequence of steps as that illustrated in FIGS. 18 and 19 may be performed to learn new parameters and weights that include feature images that correspond to new sound classes.

Referring to FIGS. 22 to 26 there is illustrated another data processing system 1 according to the described embodiments for identifying an audio signal and a source of the audio signal.

The system 1 comprises an audio sensor 4, a receiver module 7, a signal recognition module 5, and a receiver device 6.

The receiver module 7 receives audio data from the audio sensor 4. In this case the receiver module 7 may be provided in the form of an application on a computational device or a mobile device.

The signal recognition module 5 is located remotely from the receiver module 7. The receiver module 7 transmits the audio data to the signal recognition module 5 by a wireless communication connection.

Figure 22:
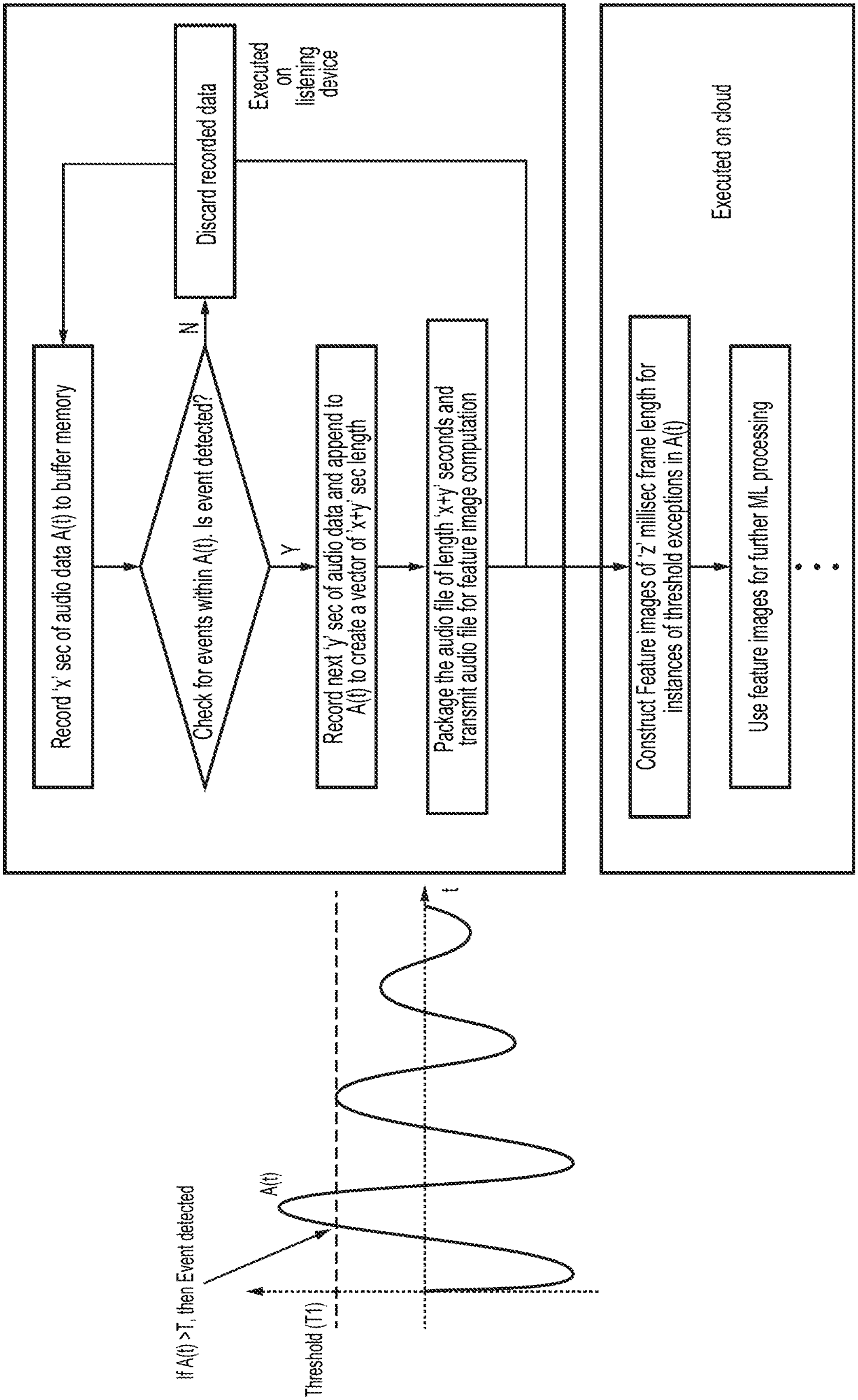
FIG. 22 is a flow diagram illustrating another audio monitoring system according to the described embodiments identifying an audible sound event.

The signal recognition module 5 identifies if an audible sound event has occurred based on the received audio data. For example the audible sound event may be triggered when an amplitude value of the received audio data exceeds a pre-defined threshold, or when an anomaly in the received audio data is detected, as illustrated in FIG. 22.

In response to the audible sound event being identified, the signal recognition module 5 processes the audio data.

In particular the signal recognition module 5 calculates a series of time-varying vector arrays of octave band energies, and/or of fractional octave band energies. In this case the signal recognition module 5 calculates the series of time-varying vector arrays of octave/fractional octave band energies by generating a plurality of data segments by splitting the received audio data into smaller segments in time. For each data time segment, the signal recognition module 5 calculates a series of octave bands/fractional octave bands. The signal recognition module 5 calculates an average power value over each of the octave bands/fractional octave bands by integrating the power spectral density (PSD) of the signal within the band. This average power of an octave band/fractional octave band represents the energy at the band centre frequency for each octave filter/fractional octave filter.

It will be appreciated that the signal recognition module 5 may calculate a series of time-varying vector arrays of octave band energies only. Alternatively the signal recognition module 5 may calculate a series of time-varying vector arrays of fractional octave band energies only. Alternatively the signal recognition module 5 may calculate both a series of time-varying vector arrays of octave band energies and a series of time-varying vector arrays of fractional octave band energies.

The fractional octave bands may be for example 1:1 or 1:3 or 1:8 or 1:12 or any combinations of these ratios.

The signal recognition module 5 calculates a series of time-varying vector arrays of Mel-Frequency Cepstral Coefficients (MFCC) values based on the received audio data. In this case the signal recognition module 5 calculates the series of time-varying vector arrays of MFCC values by generating a plurality of data segments based on the received audio data by segmenting the time domain audio signal into overlapping or non-overlapping frames. The signal recognition module 5 computes the log energy of each frame. For each data segment, the signal recognition module 5 performs a Fourier transform of the received audio data to obtain a frequency spectrum representation of the audio data. The signal recognition module 5 filters the frequency spectrum representation of the audio data using a series of Mel filter groups. The signal recognition module 5 calculates a sum energy value for the filtered frequency spectrum representation of the audio data. The signal recognition module 5 applies a logarithmic or other non-linear transformation(s) or rectification(s) on the filtered spectra. The signal recognition module 5 performs a cosine transform of the filtered frequency spectrum representation of the audio data to generate the series of vector arrays of MFCC values. The signal recognition module 5 uses a set of discrete cosine transform coefficients to then build the MFCC vectors. The log energy of each frame may be appended to its cepstral coefficients.

The signal recognition module 5 calculates a first order derivative of the series of vector arrays of MFCC values, and calculates a second order derivative of the series of vector arrays of MFCC values.

The signal recognition module 5 generates audio feature image data based on the series of vector arrays of MFCC values, the first order derivative of the vector arrays of MFCC values, the second order derivative of the vector arrays of MFCC values, and the series of vector arrays of octave band/fractional octave band energies. The system 1 uses time aligned vectors of MFC coefficients and fractional octave band energies to construct audio feature images that are used for sound recognition. The MFCC vectors and fractional octave band energy vectors are combined within a feature matrix which is the audio feature image which is then used for sound recognition.

The signal recognition module 5 includes a first machine learning model to identify the audio signal based on the generated audio feature image data.

In this case the first machine learning model includes a series of binary classifier machine learning models 2. Each binary classifier machine learning model 2 is configured to identify a different type of audio signal. A user may input a sound type selection using the receiver device 6 to indicate one or more types of audio signal of interest to the user. The signal recognition module 5 selects one or more of the binary classifier machine learning models 2 based on the user selection.

The first machine learning model also includes a series of inference models 3.

The selected binary classifier machine learning model 2 and the associated inference model 3 identify the audio signal based on the audio feature image data.

When the audio signal has been identified, the signal recognition module 5 transmits a notification message by a wireless communication connection to the receiver device 6 to notify a user that the audio signal has been identified. In this case the receiver device 6 is provided in the form of an application on a computational device or a mobile device. The receiver device 6 checks if the identified audio signal satisfies a user-defined criterion. The receiver device 6 generates an alert if it is determined that the identified audio signal satisfies the user-defined criterion. The alert may be provided in the form of an image or text displayed on the receiver device 6, or in the form of a sound alert emitted by the receiver device 6, or in any other suitable form.

The series of binary classifier machine learning models 2 and the series of inference models 3 may be trained using training data. In particular a user may input user-defined label data using the receiver device 6. The signal recognition module 5 associates the audio feature image data with the user-defined label data. The signal recognition module 5 updates the series of binary classifier machine learning models 2 and the series of inference models 3 using the audio feature image data and the associated user-defined label data for training. The user defined label data may be feedback provided by the user for sounds identified. The user defined label data may be sounds captured and labelled by the user.

The system 1 may generate synthetic training data using synthetic image data and historical image data. The system 1 may train the series of binary classifier machine learning models 2 and the series of inference models 3 using the synthetic training data. Alternatively synthetic training data may be generated by superimposing audio feature images computed from noise onto the actual historical audio feature images to create a larger set of training data for the models 2, 3.

The generated audio feature image data is a compressed representation of the fingerprint of the audio data. In particular the generated audio feature image data is a normalised matrix of feature vectors constructed from a selected set of time varying feature coefficients that in combination best describe the signature of the non-speech sounds to be recognised. The generated audio feature image data more accurately represents the characteristic attributes required to accurately recognise each sound signature, and thus allows for a simpler training of the models 2, 3. The generated audio feature image data includes feature vectors derived from applying multiple transformations of the time domain data, all laid out as time aligned vectors and combined together to form a feature matrix. These include a select set of MFCC coefficients and its delta/delta-delta derivatives and a select set of octave band filtered energies. The generated audio feature image data thus provides a compressed representation of the signature of the sound rather than the sound itself making it far smaller in size and footprint, for example 10 to 100 times smaller in size, than the original time domain data. The raw signal information is not included within the audio feature image. This enables faster computation time for both model training and classification. When the feature images are constructed, it is not possible to reconstruct the raw audio data, adding privacy protection to users.

In further detail FIG. 22 illustrates the event detection to isolate an audible signal before computing the feature image. This facilitates defined start and end points to the feature image computation which enables computation of feature images for each sound signal. The inclusion of event detection as a precursor processing step facilitates real time computation. The audio feature image computation is thus able to identify when to start and end the image computation for each feature image, rendering the entire system 1 usable for automated and real time sound recognition.

The event detection algorithm is used to identify audible sound events. This may be achieved using a number of different approaches including but not limited to amplitude threshold checks to anomaly detection models.

For example the event detection may use a threshold exception check preceding the audio feature image computation. This event detection may include recording the audio data from the listening device for a limited time duration, such as 1 second but may alternatively be shorter or longer, in a temporary storage buffer. The amplitudes of the sound signals, or of any features extracted from the sound signals, within the time duration in the recorded time varying audio signal array A(t), are then checked to see if any amplitude value has exceeded a set threshold (T1). If there has been an exception within the time duration of recorded audio, then the next block of the incoming audio data is recorded for a set duration, this block of data is appended to the previous audio record to create a longer audio data vector. This new audio vector is then packaged and sent to the cloud for audio feature image computation and further processing. On successful transmission, the stored data is cleared and the device continues to listen for the next incoming audio packet. In the event that no exception was detected in the initial time duration record of A(t), the audio data in buffer is discarded and the device is configured to continue with listening for the next audio packet.

In the cloud, once the data files are received and the integrity of the files checked, the feature images are constructed by running a second threshold exception algorithm with a preset threshold (T2), to identify all instances of threshold exceptions within the recorded time varying audio signal array A(t). The feature image is constructed from the instant of threshold (T2) exception for a time window, for example 330 ms but may alternatively be longer or shorter, for all instances of threshold exceptions without overlap between the frames. The feature images thus computed are then either fed to the inference logic execution steps when the device is in operational mode or appended to the training database for model training purposes.

Figure 23:
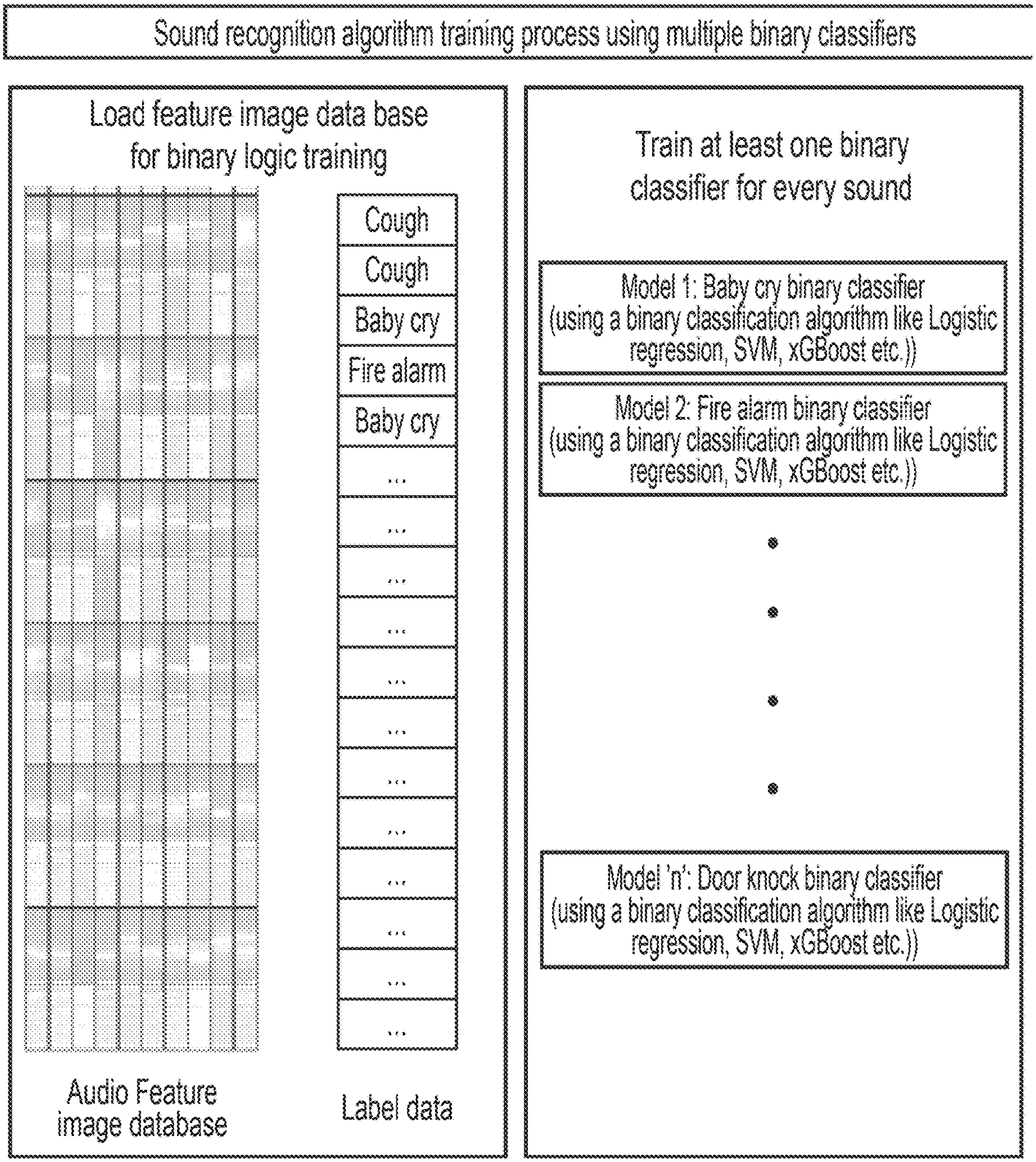
FIG. 23 is a schematic illustration of inference models and binary classifier models of the audio monitoring system of FIG. 22.
Figure 23:
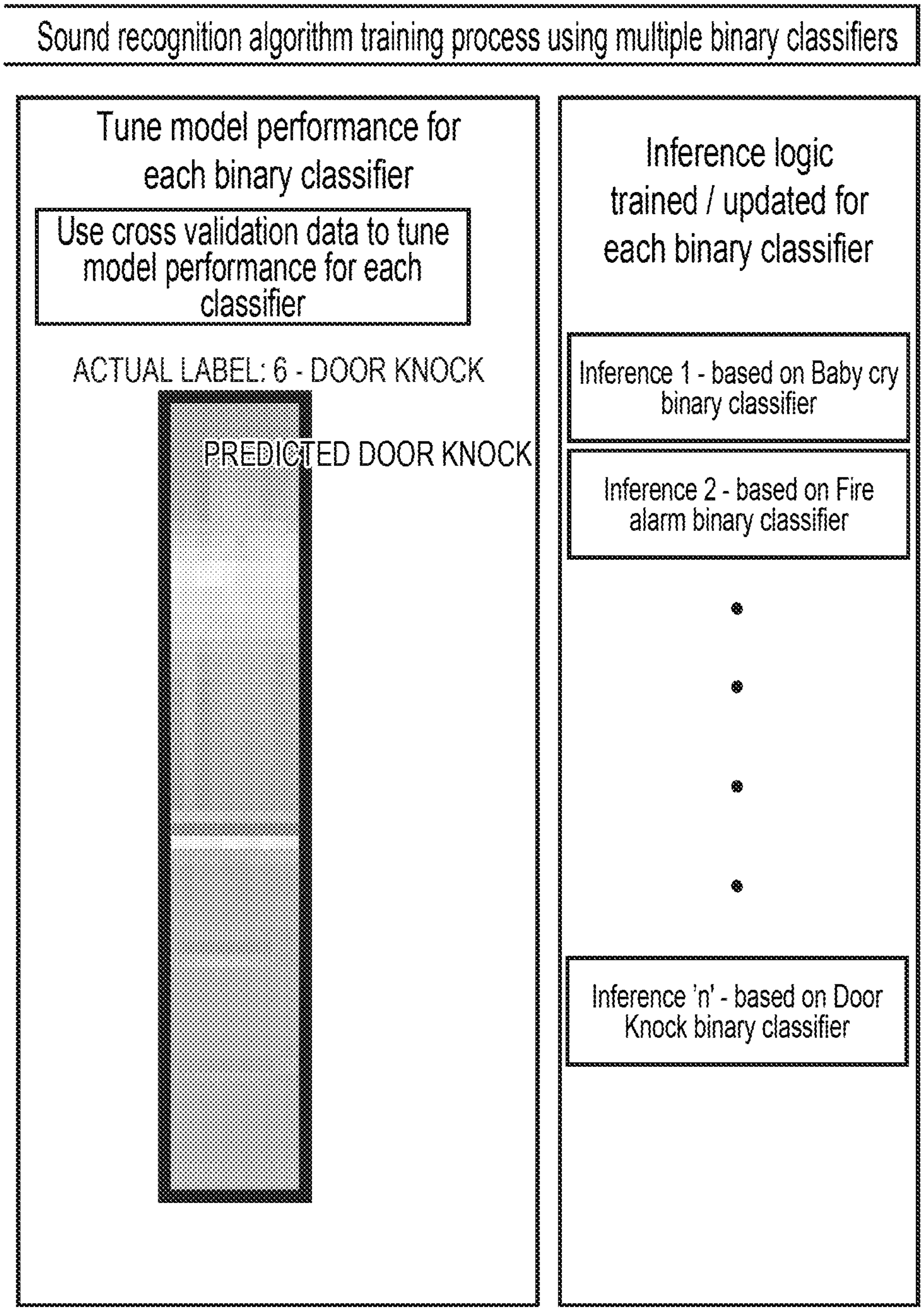

As illustrated in FIG. 23, the first machine learning model includes multiple binary classifier machine learning models 2 for more accurate simultaneous multi-sound recognition. The smaller data footprint of the audio feature image computed makes it possible to train and use different binary models 2 simultaneously for more accurate sound classification. At least one binary (Yes/No) classifier 2 is used for each sound type to be recognised. This arrangement enables identification of multiple sounds even when they happen simultaneously. This arrangement provides more accurate classifications of sounds as there are trained binary classifiers 2 for each sound label that work simultaneously.

When the user selects the sounds of interest, the binary models 2 specific to the selected sounds are invoked for classification. The inference model 3 is not classifying against sounds that are not of interest to the user, reducing the possibility for false classifications.

The training involves using the labelled database of audio feature images to train multiple binary (Yes/no) models 2 for each sound.

Figure 24:
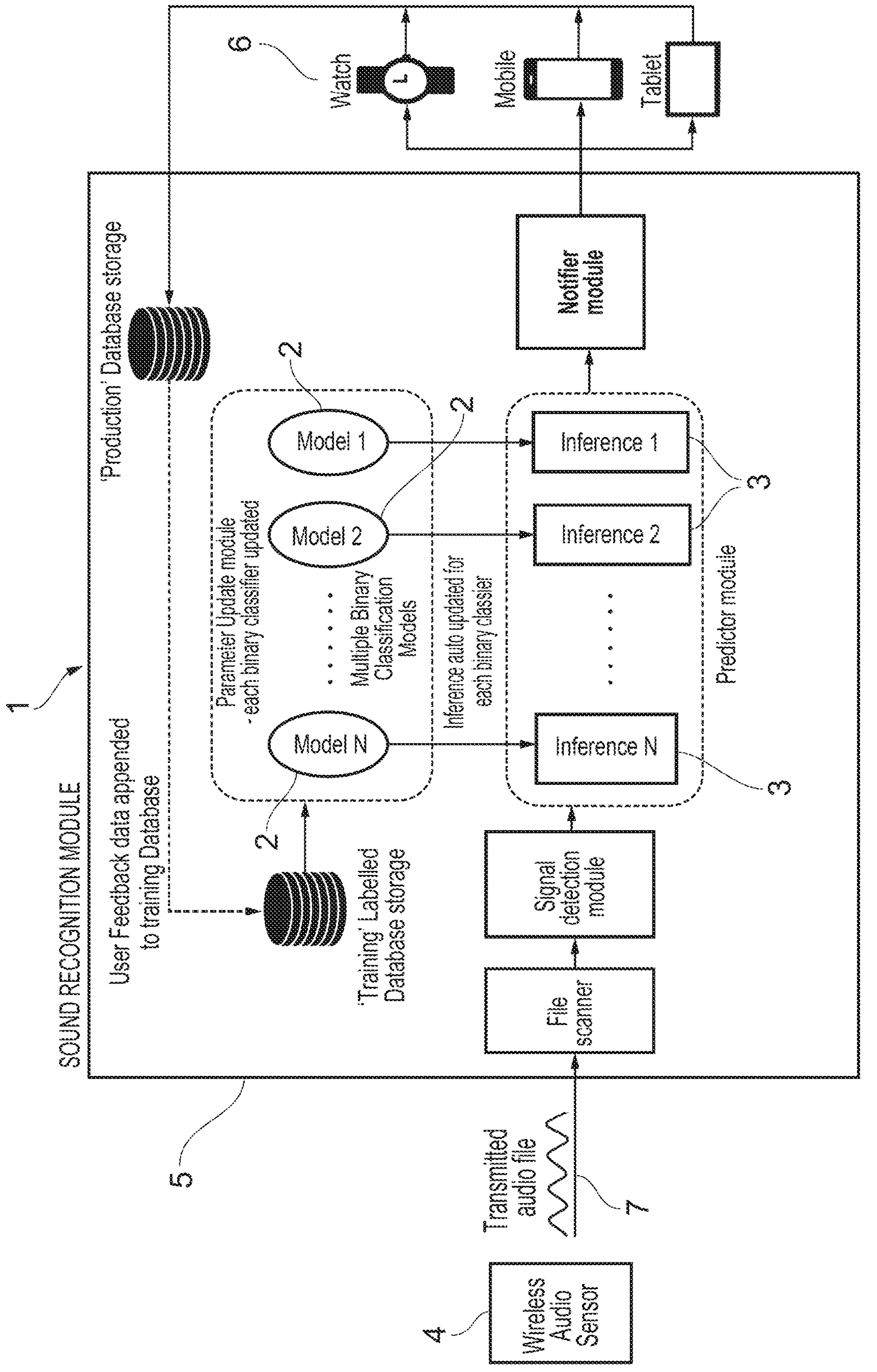
FIG. 24 is a schematic illustration of the audio monitoring system of FIG. 22.

As illustrated in FIG. 24, the system 1 facilitates real time model training. The system 1 enables user feedback to be embedded and used for simultaneous model training and optimisation. Therefore improvement and optimisation of the models 2, 3 may be performed online with real time feedback from the users of the system 1.

Figure 25:
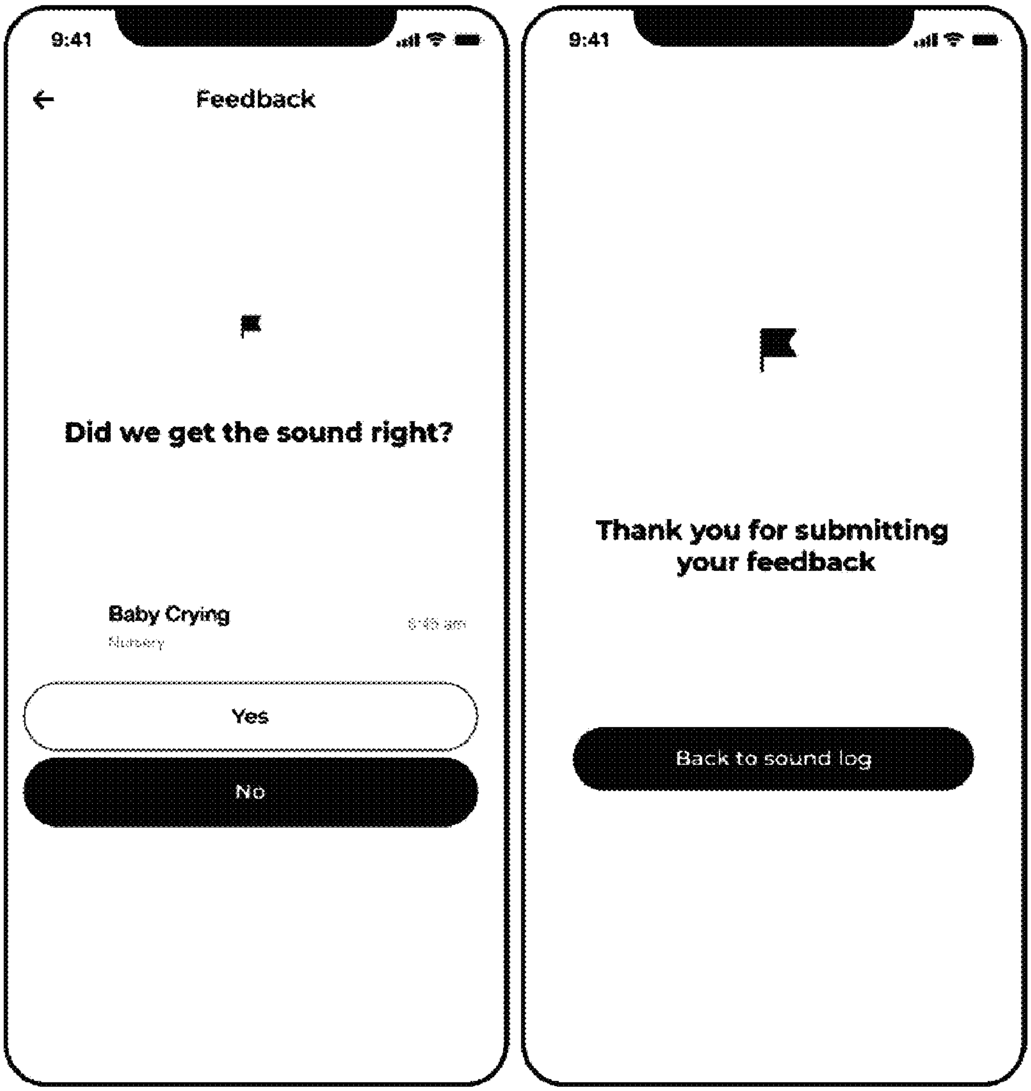
FIG. 25 is an illustration of a receiver of the audio monitoring system of FIG. 22 displaying an alert.

As illustrated in FIG. 25, the system 1 enables the user to provide feedback on classifications in real time for every sound label through the device 6, such as a phone, or tablet, or smartwatch. Feedback provided by the user may then be stored in the 'Production' database storage along with other metadata information required for sound classification and notification, with the feedback information and the relevant feature images being copied from the production environment and appended to the 'training' database as shown in FIG. 26. When the new information is loaded into the training database, a model update cycle may be triggered either manually or automatically. This update may involve using the new feedback information provided by the user along with the relevant audio feature image to facilitate a model optimisation update. The update may scrutinise or retrain the models 2, 3 depending on the feedback to improve the model accuracy. This may be implemented for a specific user or globally to improve the model performance for all users.

It will be appreciated that the inference model 3 may be provided in the form of a machine learning model.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the described embodiments are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The described embodiments extend to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method for identifying at least one audio signal, the method comprising the steps of:
- receiving audio data at a receiver module from at least one audio sensor; and
- processing the audio data using a signal recognition module;
- wherein processing the audio data using the signal recognition module comprises:
- based on the received audio data, determining at least one of:
  - one or more time-varying vector arrays of octave band energies, and
  - one or more time-varying vector arrays of fractional octave band energies;
- determining one or more time-varying vector arrays of Mel-Frequency Cepstral Coefficients (MFCC) values based on the received audio data;
- generating audio feature image data based on the one or more time-varying vector arrays of MFCC values, and at least one of:
  - the one or more time-varying vector arrays of octave band energies, and
  - the one or more time-varying vector arrays of fractional octave band energies;
- wherein the audio feature image data is generated by combining vector values of the one or more time-varying vector arrays of MFCC values and at least one of:

vector values of the one or more time-varying vector arrays of octave band energies, and vector values of the one or more time-varying vector arrays of fractional octave band energies into a single matrix; and identifying at least one audio signal using a first model based on the audio feature image data;

wherein the first model comprises an image recognition model to identify a pattern in the audio feature image data to identify the at least one audio signal.

2. The method as claimed in claim 1 wherein at least one of the one or more vector arrays of octave band energies and the one or more vector arrays of fractional octave band energies are determined by:

generating a plurality of data segments based on the received audio data;

for each data segment, determining at least one of:

one or more octave bands; and one or more fractional octave bands;

and determining at least one of:

an average power value for each of the one or more octave bands; and an average power value for each of the one or more fractional octave bands.

3. The method as claimed in claim 1 wherein the one or more vector arrays of MFCC values are determined by:

generating a plurality of data segments based on the received audio data;

for each data segment, performing a Fourier transform of the received audio data to obtain a frequency spectrum representation of the audio data;

filtering the frequency spectrum representation of the audio data using one or more Mel filter groups;

determining an energy value for the filtered frequency spectrum representation of the audio data; and performing a cosine transform of the filtered frequency spectrum representation of the audio data to generate the one or more vector arrays of MFCC values.

4. The method as claimed in claim 1 wherein the method comprises the step of determining a first order derivative of the one or more vector arrays of MFCC values, and the audio feature image data is generated based on the one or more vector arrays of MFCC values, the first order derivative of the vector arrays of MFCC values, and at least one of:

the one or more vector arrays of octave band energies, and the one or more vector arrays of fractional octave band energies.

5. The method as claimed in claim 4 wherein the method comprises the step of determining a second or higher order derivative of the one or more vector arrays of MFCC values, and the audio feature image data is generated based on the one or more vector arrays of MFCC values, the first order derivative of the vector arrays of MFCC values, the second or higher order derivative of the vector arrays of MFCC values, and at least one of:

the one or more vector arrays of octave band energies, and the one or more vector arrays of fractional octave band energies.

6. The method as claimed in claim 1 wherein the method comprises the step of identifying an audible sound event based on the received audio data, and the one or more time-varying vector arrays are determined responsive to the audible sound event being identified.

7. The method as claimed in claim 6 wherein the audible sound event comprises at least one of an amplitude value of the received audio data exceeding a pre-defined threshold, or an anomaly in the received audio data.

8. The method as claimed in claim 1 wherein the first model comprises one or more binary classifier models, each binary classifier model being configured to identify a different type of audio signal.

9. The method as claimed in claim 8 wherein the method comprises the steps of:

receiving user selection data indicating one or more types of audio signal of interest; and selecting one or more of the binary classifier models based on the user selection data;

the at least one audio signal being identified using the selected one or more binary classifier model based on the audio feature image data.

10. The method as claimed in claim 1 wherein the method comprises the steps of:

receiving user-defined label data;

associating the audio feature image data with the user-defined label data; and updating the signal recognition module based on the audio feature image data and the associated user-defined label data to train the first model.

11. The method as claimed in claim 1 wherein the method comprises the steps of:

generating a set of synthetic training data based on synthetic image data and historical image data; and training the first model using the synthetic training data.

12. The method as claimed in claim 1 wherein the method comprises the step of transmitting the audio data from the receiver module to the signal recognition module.

13. The method as claimed in claim 12 wherein the receiver module comprises an application on one of a first computational device and a first mobile device, the signal recognition module being located remotely from the receiver module, at least one of the first computational device and the first mobile device being connected to the signal recognition module by a wireless communication connection.

14. The method as claimed in claim 1 wherein the method comprises the step of:

responsive to identifying the at least one audio signal, transmitting one or more notification messages from the signal recognition module to one or more receivers to notify that the at least one audio signal has been identified.

15. The method as claimed in claim 14 wherein the receiver comprises an application on one of a second computational device and a second mobile device, at least one of the second computational device and the second mobile device being connected to the signal recognition module by a wireless communication connection.

16. The method as claimed in claim 14 wherein the method comprises the steps of:

the receiver determining if the identified at least one audio signal satisfies at least one user-defined criterion; and the receiver generating an alert responsive to determining that the identified at least one audio signal satisfies the at least one user-defined criterion.

17. The method as claimed in claim 1 wherein the method comprises the step of:

identifying a source of the identified audio signal.

18. A data processing system for identifying at least one audio signal, the system comprising:

a receiver module to receive audio data from at least one audio sensor; and a signal recognition module to process the audio data;

wherein the signal recognition module is configured to:

based on the received audio data, determine at least one of:

one or more time-varying vector arrays of octave band energies; and one or more time-varying vector arrays of fractional octave band energies;

determine one or more time-varying vector arrays of Mel-Frequency Cepstral Coefficients (MFCC) values based on the received audio data;

generate audio feature image data based on the one or more time-varying vector arrays of MFCC values, and at least one of:

the one or more time-varying vector arrays of octave band energies; and the one or more time-varying vector arrays of fractional octave band energies; and wherein the signal recognition module is configured to generate the audio feature image data by combining vector values of the one or more time-varying vector arrays of MFCC values, and at least one of:

vector values of the one or more time-varying vector arrays of octave band energies, and vector values of the one or more time-varying vector arrays of fractional octave band energies into a single matrix; and identify at least one audio signal using a first model based on the audio feature image data;

wherein the first model comprises an image recognition model to identify a pattern in the audio feature image data to identify the at least one audio signal.

19. A computer program product stored on a non-transitory computer readable storage medium, the computer program product comprising computer program code capable of causing a computer system to perform a method as claimed in claim 1 when the computer program product is run on a computer system.

* * * * *